US012609226B2

(12) United States Patent
Miyata et al.

(10) Patent No.: US 12,609,226 B2
(45) Date of Patent: Apr. 21, 2026

(54) COMPOSITION, MAGNETIC PARTICLE-CONTAINING FILM, AND ELECTRONIC COMPONENT

(71) Applicant: FUJIFILM Corporation, Tokyo (JP)

(72) Inventors: Tetsushi Miyata, Haibara-gun (JP); Tatsuo Ishikawa, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 672 days.

(21) Appl. No.: 18/063,424

(22) Filed: Dec. 8, 2022

(65) Prior Publication Data

US 2023/0118791 A1 Apr. 20, 2023

Related U.S. Application Data

(63) Continuation of application No. PCT/JP2021/021672, filed on Jun. 8, 2021.

(30) Foreign Application Priority Data

Jun. 9, 2020 (JP) ................................ 2020-100096

(51) Int. Cl.

| | |
|---|---|
| ***H01F 1/20*** | (2006.01) |
| ***C08J 5/18*** | (2006.01) |
| ***C08K 3/08*** | (2006.01) |
| ***C08K 5/09*** | (2006.01) |
| ***C08K 5/20*** | (2006.01) |

(52) U.S. Cl.

CPC .................. *H01F 1/20* (2013.01); *C08J 5/18* (2013.01); *C08K 3/08* (2013.01); *C08K 5/09* (2013.01); *C08K 5/20* (2013.01); *C08J 2335/02* (2013.01); *C08J 2363/00* (2013.01); *C08J 2433/14* (2013.01); *C08J 2477/12* (2013.01); *C08K 2003/0856* (2013.01); *C08K 2003/0862* (2013.01); *C08K 2201/005* (2013.01); *C08K 2201/01* (2013.01)

(58) Field of Classification Search

CPC ........................................................ H01F 1/20

See application file for complete search history.

(56) References Cited

U.S. PATENT DOCUMENTS

| | | | | |
|---|---|---|---|---|
| 2013/0228717 A1* | 9/2013 | Harada | H01F 1/01 252/62.55 |
| 2016/0268026 A1 | 9/2016 | Matsutomi et al. | |
| 2017/0110231 A1 | 4/2017 | Matsutomi et al. | |

FOREIGN PATENT DOCUMENTS

| | | | |
|---|---|---|---|
| JP | 2004111756 | A | 4/2004 |
| JP | 2012-227406 | A | 11/2012 |
| JP | 2014029936 | A | 2/2014 |
| JP | 2015-082554 | A | 4/2015 |
| JP | 2016-006852 | A | 1/2016 |
| JP | 2017208415 | A | 11/2017 |
| JP | 2020-087939 | A | 6/2020 |

OTHER PUBLICATIONS

Yoda, English machine translation of JP 2020087939 A. (Year: 2020).*

International Search Report dated Aug. 31, 2021 from the International Searching Authority in International Application No. PCT/JP2021/021672.

Written Opinion dated Aug. 31, 2021 from the International Searching Authority in International Application No. PCT/JP2021/021672.

International Preliminary Report on Patentability with the translation of Written Opinion dated Dec. 13, 2022 from the International Bureau in International Application No. PCT/JP2021/021672.

Communication dated Aug. 13, 2024 in Taiwanese Application No. 110120933.

Office Action issued Jan. 23, 2024 in Japanese Application No. 2022-530564.

Office Action issued May 27, 2025 in Japanese application No. 2024-119371.

* cited by examiner

*Primary Examiner* — Peter F Godenschwager

(74) *Attorney, Agent, or Firm* — Sughrue Mion, PLLC

(57) ABSTRACT

An object of the present invention is to provide a composition that can form a magnetic particle-containing film having excellent magnetic isotropy and has excellent temporal stability. Another object of the present invention is to provide a magnetic particle-containing film that relates to the composition, and an electronic component that includes the magnetic particle-containing film.

The composition according to an embodiment of the present invention is a composition containing magnetic particles and a rheology control agent, in which a content of the magnetic particles having an aspect ratio less than 8 is 25% by mass or more with respect to a total mass of the magnetic particles, the magnetic particles contain metal atoms, the metal atoms contain one or more kinds of specific atoms selected from the group consisting of Ni atoms and Co atoms, and a content of the specific atoms is 50% by mass or more with respect to a total mass of the metal atoms.

19 Claims, No Drawings

COMPOSITION, MAGNETIC PARTICLE-CONTAINING FILM, AND ELECTRONIC COMPONENT

CROSS-REFERENCE TO RELATED APPLICATIONS

This application is a Continuation of PCT International Application No. PCT/JP2021/021672 filed on Jun. 8, 2021, which claims priority under 35 U.S.C. § 119(a) to Japanese Patent Application No. 2020-100096 filed on Jun. 9, 2020. The above applications are hereby expressly incorporated by reference, in its entirety, into the present application.

BACKGROUND OF THE INVENTION

1. Field of the Invention

The present invention relates to a composition, a magnetic particle-containing film, and an electronic component.

2. Description of the Related Art

With the performance upgrade and further miniaturization of electronic devices, the degree of integration of electronic circuits is increasing. As one of the materials for improving the degree of integration, there is a coating-type composition containing magnetic particles. Using such a composition enables a magnetic material to be mounted in any shape, which makes it easier to achieve miniaturization and performance upgrade of electronic devices compared to the conventional method of arranging individual pieces of magnetic materials on a chip.

For example, JP2015-082554A discloses "soft magnetic resin composition containing flat soft magnetic particles, a resin component, and a rheology control agent".

SUMMARY OF THE INVENTION

Incidentally, the composition is required to have excellent temporal stability.

In addition, a magnetic film is sometimes required to have magnetic isotropy.

As a result of examining the composition (soft magnetic resin composition) described in JP2015-082554A, the inventors of the present invention have confirmed that the use of large amounts of flat soft magnetic particles can improve the temporal stability of the composition to some extent. However, the inventors have confirmed that in a case where large amounts of flat soft magnetic particles are used, a film formed of the composition is unlikely to have magnetic isotropy.

An object of the present invention is to provide a composition that can form a magnetic particle-containing film having excellent magnetic isotropy and has excellent temporal stability. Another object of the present invention is to provide a magnetic particle-containing film that relates to the composition, and an electronic component that includes the magnetic particle-containing film.

In order to achieve the above objects, the inventors of the present invention conducted intensive studies. As a result, the inventors have found that the objects can be achieved by the following constitutions.

[1]

A composition containing magnetic particles and a rheology control agent, in which a content of the magnetic particles having an aspect ratio less than 8 is 25% by mass or more with respect to a total mass of the magnetic particles, the magnetic particles contain metal atoms, the metal atoms contain one or more kinds of specific atoms selected from the group consisting of Ni atoms and Co atoms, and a content of the specific atoms is 50% by mass or more with respect to a total mass of the metal atoms.

[2]

The composition described in [1], in which the specific atoms are the Ni atoms.

[3]

The composition described in [1] or [2], in which the content of the specific atoms is 70% by mass or more with respect to the total mass of the metal atoms.

[4]

The composition described in any one of [1] to [3], in which the magnetic particles have a particle diameter of 5 μm or more.

[5]

The composition described in any one of [1] to [4], in which the rheology control agent is an organic rheology control agent.

[6]

The composition described in any one of [1] to [5], in which the rheology control agent is one or more kinds of substances selected from the group consisting of a polycarboxylic acid, a polycarboxylic anhydride, and an amide wax.

[7]

The composition described in any one of [1] to [6], further containing a curable epoxy compound as a polymerizable compound.

[8]

A magnetic particle-containing film formed of the composition described in any one of [1] to [7].

[9]

An electronic component including the magnetic particle-containing film described in [8].

[10]

The electronic component described in [9], in which the electronic component is used as an inductor.

[11]

The electronic component described in [9], in which the electronic component is used as an antenna.

According to an aspect of the present invention, it is possible to provide a composition that can form a magnetic particle-containing film having excellent magnetic isotropy and has excellent temporal stability. Furthermore, according to an aspect of the present invention, it is possible to provide a magnetic particle-containing film that relates to the composition and an electronic component that includes the magnetic particle-containing film.

DESCRIPTION OF THE PREFERRED EMBODIMENTS

Hereinafter, the present invention will be specifically described.

The following constituents will be described based on typical embodiments of the present invention in some cases. However, the present invention is not limited to the embodiments.

Regarding the notation of a group (atomic group) in the present specification, unless the gist of the present invention is missed, the notation without the terms "substituted" and "unsubstituted" includes both the group having no substituent and the group having a substituent. For example, “alkyl group” includes not only an alkyl group having no substituent (unsubstituted alkyl group) but also an alkyl group having a substituent (substituted alkyl group). Furthermore, in the present specification, “organic group” refers to a group having at least one carbon atom.

In the present specification, “actinic ray” or “radiation” means, for example, a bright line spectrum of a mercury lamp, a far ultraviolet ray represented by an excimer laser, extreme ultraviolet (EUV light), an X-ray, an electron beam (EB), and the like. In the present specification, “light” means an actinic ray or radiation.

Unless otherwise specified, “exposure” in the present specification means not only the exposure performed using a bright line spectrum of a mercury lamp, a far ultraviolet ray represented by an excimer laser, extreme ultraviolet, an X-ray, EUV light, and the like, but also the drawing performed using particle beams such as an electron beam and an ion beam.

In the present specification, a range described using “to” includes the numerical values listed before and after “to” as a lower limit and an upper limit.

In the present specification, (meth)acrylate represents acrylate and methacrylate, (meth)acryl represents acryl and methacryl, and (meth)acryloyl represents acryloyl and methacryloyl.

In the present specification, “solid content” of a composition means components forming a magnetic particle-containing film. In a case where the composition contains a solvent (such as an organic solvent or water), “solid content” means all components except for the solvent. In addition, a liquid component is also regarded as a solid content as long as this component forms the magnetic particle-containing film.

In the present specification, a weight-average molecular weight (Mw) is a polystyrene-equivalent value obtained by a Gel Permeation Chromatography (GPC) method.

The GPC method in the present specification is based on a method using HLC-8020GPC (manufactured by Tosoh Corporation), columns consisting of TSKgel SuperHZM-H, TSKgel SuperHZ4000, and TSKgel SuperHZ2000 (manufactured by Tosoh Corporation, 4.6 mm ID×15 cm), and tetrahydrofuran (THF) as an eluent.

In the present specification, as each component, unless otherwise specified, one kind of substance corresponding to each component may be used alone, or two or more kinds of substances corresponding to each component may be used in combination. Here, in a case where two or more kinds of substances are used in combination as each component, unless otherwise specified, the content of the component means the total content of the substances used in combination.

[Composition]

The composition according to an embodiment of the present invention is a composition containing magnetic particles and a rheology control agent,

- in which a content of the magnetic particles having an aspect ratio less than 8 is 25% by mass or more with respect to a total mass of the magnetic particles,
- the magnetic particles contain metal atoms,
- the metal atoms contain one or more kinds of specific atoms selected from the group consisting of Ni atoms and Co atoms, and
- a content of the specific atoms is 50% by mass or more with respect to a total mass of the metal atoms.

The details of reason why the objects of the present invention can be achieved by the composition having such a constitution are unclear, but are roughly assumed to be as below.

In a case where the composition contains at least a predetermined amount of magnetic particles having an aspect ratio less than 8, the magnetic particles are isotropically arranged in the magnetic particle-containing film, and the magnetic isotropy in the magnetic particle-containing film can be improved. On the other hand, the magnetic particles having an aspect ratio less than 8 are more likely to be deposited as sediments compared to magnetic particles having an aspect ratio of 8 or more, and in a case where the content of the magnetic particles having an aspect ratio less than 8 increases, temporal stability is likely to be negatively affected. In order to improve such problems, sometimes a rheology control agent is used in the composition. However, simply using the rheology control agent is not enough to fully improve the temporal stability. Therefore, in the present invention, in addition to the incorporation of magnetic particles and a rheology control agent to the composition, the incorporation of at least predetermined amounts of one or more kinds of specific atoms selected from the group consisting of Ni atoms and Co atoms into the magnetic particles is also stipulated. Compared to atoms of iron and the like, the specific atoms are less likely to be ionized. Therefore, the magnetic particles having the above characteristics can have an appropriate interaction with the rheology control agent instead of having an excessive interaction. Accordingly, a part of the rheology control agent that interacts with the magnetic particles interacts with the magnetic particles, and the other part of the rheology control agent is likely to be incorporated into a network between the rheology control agents or to form an appropriate steric hindrance structure, which allows the rheology control agent to carry out its action to the fullest. It is considered that consequently, the sedimentation suppressing effect that the rheology control agent exerts on the aforementioned magnetic particles may be better than usual, and temporal stability may be sufficiently improved.

In addition, because the magnetic particle-containing film is mounted in the composition application process, compared to the magnetic materials that are mounted in the form of individual pieces later in the process, the magnetic particle-containing film is exposed to more processes during the electronic circuit manufacturing process. Therefore, it is preferable that the magnetic particle-containing film have various types of durability. Particularly, considering that the magnetic particle-containing film contains metal atoms, it is preferable that the magnetic particle-containing film to exhibit chemical resistance to chemicals such as acids. It has been found that in a case where the composition according to an embodiment of the present invention is used, the chemical resistance of the magnetic particle-containing film to be formed can also be improved. It is considered that this is because the standard oxidation-reduction potential of the specific atoms in the magnetic particles contained in the composition is within an appropriate range.

Hereinafter, further improving at least one or more properties among the temporal stability of the composition, the magnetic isotropy of the magnetic particle-containing film to be formed, and the chemical resistance of the magnetic particle-containing film to be formed will be also described as “further improving the effects of the present invention”.

[Magnetic Particles]

The composition contains magnetic particles.

The magnetic particles contain metal atoms.

In the present specification, the metal atoms also include metalloid atoms such as boron, silicon, germanium, arsenic, antimony, and tellurium.

The metal atoms may be contained in the magnetic particles, as an alloy containing a metal element (preferably a magnetic alloy), a metal oxide (preferably a magnetic oxide), a metal nitride (preferably a magnetic nitride), or a metal carbide (preferably a magnetic carbide).

The content of the metal atoms with respect to the total mass of the magnetic particles is preferably 50% to 100% by mass, more preferably 75% to 100% by mass, and even more preferably 95% to 100% by mass.

The magnetic particles contain, as metal atoms, one or more kinds of specific atoms selected from the group consisting of Ni atoms and Co atoms.

The specific atoms may be either Ni atoms or Co atoms, or both the Ni atoms and Co atoms. In view of further improving the effects of the present invention, the specific atoms are preferably Ni atoms.

The content of the specific atoms with respect to the total mass of the metal atoms in the magnetic particles is 50% by mass or more, preferably 60% by mass or more, and more preferably 70% by mass or more. The upper limit of the content is not limited, and is 100% by mass or less, preferably 98% by mass or less, and more preferably 95% by mass or less.

In a case where the magnetic particles contain Ni atoms, the content of the Ni atoms with respect to the total mass of the metal atoms is preferably 50% to 100% by mass, more preferably 60% to 95% by mass, and even more preferably 70% to 90% by mass.

In a case where the magnetic particles contain Co atoms, the content of the Co atoms with respect to the total mass of the metal atoms is preferably 40% to 100% by mass, more preferably 50% to 95% by mass, even more preferably 60% to 90% by mass, and particularly preferably 70% to 90% by mass.

The magnetic particles may contain both of the specific atoms, or may contain substantially only one of the specific atoms. In a case where the magnetic particles substantially contain only one of the specific atoms, the content of either Ni atoms or Co atoms with respect to the total mass of the specific atoms is, for example, 98% to 100% by mass, preferably 99% to 100% by mass, and more preferably 99.5% to 100% by mass.

In a case where the magnetic particles contain both of the specific atoms, either of the content of Ni atoms or the content of Co atoms may be greater, or the content of Ni atoms may be the same as the content of Co atoms.

In a case where the magnetic particles contain both of the specific atoms, the content of one of the specific atoms (Ni atoms or Co atoms) is, for example, 50% by mass or more and less than 98% by mass with respect to the total mass (total content of Ni atoms and Co atoms) of the specific atoms.

Examples of materials other than the specific atoms constituting the magnetic particles include Fe, Mo, Al, Si, S, Sc, Ti, V, Cu, Y, Mo, Rh, Pd, Ag, Sn, Sb, Te, Ba, Ta, W, Re, Au, Bi, La, Ce, Pr, Nd, P, Zn, Sr, Zr, Mn, Cr, Nb, Pb, Ca, B, C, and N.

The magnetic particles preferably contain metal atoms other than the specific atoms constituting the magnetic particles, and more preferably contain one or more kinds of metal atoms selected from the group consisting of Fe, Si, Cr, B, and Mo.

In the magnetic particles, the content of metal atoms other than the specific atoms with respect to the total mass of metal atoms is preferably 0% to 50% by mass, more preferably 5% to 40% by mass, and even more preferably 10% to 30% by mass.

In the magnetic particles, the content of Fe (Fe atoms) with respect to the total mass of metal atoms is preferably 0% to 50% by mass, more preferably 0% to 35% by mass, and even more preferably 0% to 25% by mass.

In the magnetic particles, the content of Si (Si atoms) with respect to the total mass of metal atoms is preferably 0% to 20% by mass, more preferably 0% to 15% by mass, and even more preferably 0% to 8% by mass.

In the magnetic particles, the content of Cr (Cr atoms) with respect to the total mass of metal atoms is preferably 0% to 20% by mass, more preferably 0% to 15% by mass, and even more preferably 0% to 8% by mass.

In the magnetic particles, the content of B (B atoms) with respect to the total mass of metal atoms is preferably 0% to 15% by mass, more preferably 0% to 8% by mass, and even more preferably 0% to 5% by mass.

In the magnetic particles, the content of Mo (Mo atoms) with respect to the total mass of metal atoms is preferably 0% to 50% by mass, more preferably 0% to 35% by mass, and even more preferably 0% to 25% by mass.

Specific examples of the magnetic particles include alloys such as an Fe—Co-based alloy (preferably permendur), an Fe—Ni-based alloy (for example, permalloy), an Ni—Mo-based alloy (preferably supermalloy), an Fe—Ni—Cu—Cr-based alloy (preferably μ-metal), an Fe—Ni—Co-based alloy, an Fe—Co—Si—B-based alloy, and a Co-based amorphous alloy, and an Ni—Zn-based ferrite. The above alloys may be amorphous.

Among the above, in view of further improving the effects of the present invention, permalloy is preferable as the magnetic particles. Examples of the permalloys include supermalloy and μ-metal. Among these, supermalloy is preferable.

Permalloy refers to a ferromagnetic alloy containing, for example, Fe and Ni as main components. The permalloy may be an alloy containing one kind or two or more kinds of metal atoms among Cr, Cu, and Mo other than Fe and Ni. Supermalloy refers to a ferromagnetic alloy containing, for example, Fe, Ni, and Mo as main components, and is a sort of permalloy. μ-Metal refers to a ferromagnetic alloy or the like containing, for example, Fe, Ni, Cu, and Cr as main components, and is a sort of permalloy.

The makeup of the magnetic particles is confirmed by high-frequency inductively coupled plasma (ICP) emission spectroscopy.

Specifically, a pressure-resistant container containing 12 mg of sample particles and 10 mL of a 4 mol/L (liter, the same shall be applied hereinafter) aqueous hydrochloric acid solution is kept in an oven at a set temperature of 120° C. for 12 hours, thereby obtaining a solution. Then, 30 mL of pure water is added to the obtained solution, and the solution is filtered using a 0.1 μm membrane filter. For the filtrate obtained in this way, elemental analysis is performed using a high-frequency inductively coupled plasma (ICP) emission spectrophotometer. Based on the obtained results of the elemental analysis, the content of each metal atom is determined. Based on the obtained content, the makeup is confirmed.

As the measurement device, a high-frequency inductively coupled plasma (ICP) emission spectrophotometer (model number: ICPS-8100) manufactured by Shimadzu Corporation can be suitably used. However, the measurement device is not limited to this.

The surface of each of the magnetic particles may be provided with a surface layer. In a case where the magnetic particles have a surface layer, it is possible to add functions to the magnetic particles according to the material of the surface layer.

Examples of the surface layer include an inorganic layer or an organic layer.

As a compound for forming an inorganic layer, in view of making it possible to form a surface layer excellent in at least one of the insulating properties, gas barrier properties, and chemical stability, a metal oxide, a metal nitride, a metal carbide, a phosphoric acid metal salt compound, a boric acid metal salt compound, or a silicic acid compound (for example, a silicic acid ester such as tetraethyl orthosilicate or a silicate such as sodium silicate) is preferable. Specific examples of elements contained in these compounds include Fe, Al, Ca, Mn, Zn, Mg, V, Cr, Y, Ba, Sr, Ge, Zr, Ti, Si, and rare earth elements.

Examples of the material constituting the inorganic layer obtained using the compound for forming an inorganic layer include silicon oxide, germanium oxide, titanium oxide, aluminum oxide, zirconium oxide, magnesium oxide, and the like. The inorganic layer may be a layer that contains two or more kinds of these materials.

Examples of a compound for forming an organic layer include an acrylic monomer. Specific examples of the acrylic monomer include the compounds described in paragraphs 0022 and 0023 of JP2019-67960A.

Examples of the material constituting the organic layer obtained using the compound for forming an organic layer include an acrylic resin.

The thickness of the surface layer is not particularly limited. In view of enabling the surface layer to more effectively function, the thickness of the surface layer is preferably 3 to 1,000 nm.

The particle diameter of the magnetic particles is preferably 0.1 μm or more, more preferably 1 μm or more, and even more preferably 5 μm or more.

Particularly, in a case where the particle diameter is 5 μm or more (especially, in a case where the magnetic particles contain Ni atoms as the specific atoms, in a case where the magnetic particles contain Ni atoms as the specific atoms of the highest content, or in a case where the magnetic particles substantially contain only Ni atoms as the specific atoms), the chemical resistance of the magnetic particle-containing film obtained from the composition is likely to be further improved.

Furthermore, in a case where the particle diameter is 20 μm or more (especially in a case where the magnetic particles contain Co atoms as the specific atoms, in a case where the magnetic particles contain Co atoms as the specific atoms of the highest content, or in a case where the magnetic particles substantially contain only Co atoms as the specific atoms), the chemical resistance of the magnetic particle-containing film obtained from the composition is likely to be further improved.

The particle diameter of the magnetic particles is preferably 100 μm or less, more preferably 50 μm or less, and even more preferably 30 μm or less.

In the present specification, the particle diameter of the magnetic particles means the average primary particle diameter of the particles.

The particle diameter of primary particles of the magnetic particles can be measured by imaging the magnetic particles by using a transmission electron microscope at 100,000× photographing magnification, printing the image on printing paper at total magnification of 500,000× so as to obtain an image of the particles, tracing the contour of the particles (primary particles) with a digitizer, and calculating the diameter of circles having the same area as the area of the traced regions (equivalent circular area diameter). Here, the primary particles refer to independent particles not being aggregated. The imaging using a transmission electron microscope is performed by a direct method by using a transmission electron microscope at an acceleration voltage of 300 kV. The observation and measurement with the transmission electron microscope can be performed using, for example, a transmission electron microscope H-9000 manufactured by Hitachi, Ltd. and image analysis software KS-400 manufactured by Carl Zeiss AG.

The aspect ratio of the magnetic particles is preferably from 1 to 8, more preferably 1 or more and less than 8, even more preferably 1 to 5, and particularly preferably 1 to 3.

In a case where the composition contains one kind of magnetic particles, the aspect ratio of the magnetic particles is 1 or more and less than 8.

In a case where there are two or more kinds of magnetic particles in the composition, at least one kind of magnetic particles among the two or more kinds of magnetic particles are the aforementioned magnetic particles having an aspect ratio less than 8 (preferably 1 to 5, and more preferably 1 to 3).

The content of the magnetic particles having an aspect ratio less than 8 (preferably 1 to 5, and more preferably 1 to 3) with respect to the total mass of the magnetic particles is at least 25% by mass or more, preferably 50% by mass or more, more preferably 75% by mass or more, and even more preferably 90% by mass or more. The upper limit of the content is not limited, and is, for example, 100% by mass or less.

In the present specification, the aspect ratio of particles is determined as follows. That is, the particles for which the aspect ratio is to be determined are observed with a transmission electron microscope (TEM), 200 particles are randomly extracted from the observed image, and the value of longest width A of each particle/shortest width B of each particle (A/B) is calculated for each of the 200 particles. The average of values of "A/B" calculated for the 200 particles is adopted as the aspect ratio of the particles.

The composition may contain only one kind of the magnetic particles or two or more kinds of the magnetic particles.

One or more kinds of the magnetic particles may be flat, elliptical, spherical, or amorphous, as long as the magnetic particles in the composition as a whole meet the requirements relating to the aforementioned aspect ratio.

The content of the magnetic particles with respect to the total mass of the composition is preferably 30% to 99% by mass, more preferably 35% to 97% by mass, and even more preferably 40% to 95% by mass.

The content of the magnetic particles with respect to the total solid content of the composition is preferably 50% to 99% by mass, more preferably 60% to 97% by mass, and even more preferably 70% to 95% by mass.

Suitable Aspect of Formulation Adjustment of Magnetic Particles in Composition According to Embodiment of the Present Invention The composition according to the embodiment of the present invention is preferably a composition which is formed of raw materials of magnetic particles including at least magnetic particles X having an aspect ratio less than 8 and a rheology control agent and in which the content of the magnetic particles X is 25% by mass or more with respect to the total mass of magnetic particles in the composition (in other words, the total mass of raw materials of magnetic particles in the composition).

The magnetic particles X preferably contain metal atoms, the metal atoms preferably contain one or more kinds of specific atoms selected from the group consisting of Ni atoms and Co atoms, and the content of the specific atoms is preferably 50% by mass or more with respect to a total mass of the metal atoms.

The metal atoms contained in the magnetic particles X have the same definition as the metal atoms described above in the section of [Magnetic particles], and the suitable aspects thereof are also the same.

The content of metal atoms with respect to the total mass of the magnetic particles X is preferably 50% to 100% by mass, more preferably 75% to 100% by mass, and even more preferably 95% to 100% by mass.

The specific atoms contained in the magnetic particles X have the same definition as the specific atoms described above in the section of [Magnetic particles], and the suitable aspects thereof are also the same.

The content of the specific atoms with respect to the total mass of the metal atoms in the magnetic particles X is preferably 50% by mass or more, more preferably 60% by mass or more, and even more preferably 70% by mass or more. The upper limit of the content is not limited, and is 100% by mass or less, preferably 98% by mass or less, and more preferably 95% by mass or less.

In a case where the magnetic particles X contain Ni atoms, the content of the Ni atoms with respect to the total mass of metal atoms in the magnetic particles X is preferably 50% to 100% by mass, more preferably 60% to 95% by mass, and even more preferably 70% to 90% by mass.

In a case where the magnetic particles X contain Co atoms, the content of the Co atoms with respect to the total mass of the metal atoms in the magnetic particles X is preferably 40% to 100% by mass, more preferably 50% to 95% by mass, even more preferably 60% to 90% by mass, and particularly preferably 70% to 90% by mass.

The magnetic particles X may contain both of the specific atoms, or may contain substantially only one of the specific atoms. In a case where the magnetic particles substantially contain only one of the specific atoms, the content of either Ni atoms or Co atoms with respect to the total mass of the specific atoms is, for example, 98% to 100% by mass, preferably 99% to 100% by mass, and more preferably 99.5% to 100% by mass.

In a case where the magnetic particles X contain both of the specific atoms, either of the content of Ni atoms or the content of Co atoms may be greater, or the content of Ni atoms may be the same as the content of Co atoms.

In a case where the magnetic particles X contain both of the specific atoms, the content of one of the specific atoms (Ni atoms or Co atoms) is, for example, 50% by mass or more and less than 98% by mass with respect to the total mass of the specific atoms (total content of Ni atoms and Co atoms).

The materials that constitute the magnetic particles X and are other than the specific atoms have the same definition as the materials described above in the section of [Magnetic particles], and the suitable aspects thereof are also the same.

The magnetic particles X preferably contain metal atoms other than the specific atoms, and more preferably contain one or more kinds of metal atoms selected from the group consisting of Fe, Si, Cr, B, and Mo.

In the magnetic particles X, the content of metal atoms other than the specific atoms with respect to the total mass of metal atoms in the magnetic particles X is preferably 0% to 50% by mass, more preferably 5% to 40% by mass, and even more preferably 10% to 30% by mass.

In the magnetic particles X, the content of Fe (Fe atoms) with respect to the total mass of metal atoms in the magnetic particles X is preferably 0% to 50% by mass, more preferably 0% to 35% by mass, and even more preferably 0% to 25% by mass.

In the magnetic particles X, the content of Si (Si atoms) with respect to the total mass of metal atoms in the magnetic particles X is preferably 0% to 20% by mass, more preferably 0% to 15% by mass, and even more preferably 0% to 8% by mass.

In the magnetic particles X, the content of Cr (Cr atoms) with respect to the total mass of metal atoms in the magnetic particles X is preferably 0% to 20% by mass, more preferably 0% to 15% by mass, and even more preferably 0% to 8% by mass.

In the magnetic particles X, the content of B (B atoms) with respect to the total mass of metal atoms in the magnetic particles X is preferably 0% to 15% by mass, more preferably 0% to 8% by mass, and even more preferably 0% to 5% by mass.

In the magnetic particles X, the content of Mo (Mo atoms) with respect to the total mass of metal atoms in the magnetic particles X is preferably 0% to 50% by mass, more preferably 0% to 35% by mass, and even more preferably 0% to 25% by mass.

Specific examples of the magnetic particles X are the same as the specific examples of the magnetic particles described above in the section of [Magnetic particles]. Among the above, in view of further improving the effects of the present invention, permalloy is preferable as the magnetic particles X. Examples of the permalloys include supermalloy and μ-metal. Among these, supermalloy is preferable.

The method of confirming the makeup of the magnetic particles X and the particle diameter of the magnetic particles is the same as the method of confirming the makeup of the magnetic particles and the particle diameter of the magnetic particles described above in the section of [Magnetic particles], and the suitable aspects thereof are also the same.

The surface of each of the magnetic particles X may be provided with a surface layer. The surface layer of the magnetic particles X is the same as the surface layer of the magnetic particles described above in the section of [Magnetic particles], and the suitable aspects thereof are also the same.

The aspect ratio of the magnetic particles X is preferably from 1 to 8, more preferably 1 or more and less than 8, even more preferably 1 to 5, and particularly preferably 1 to 3.

The content of the magnetic particles X having an aspect ratio less than 8 (preferably 1 to 5, and more preferably 1 to 3) with respect to the total mass of the magnetic particles in the composition (in other words, the total mass of the raw materials of magnetic particles in the composition) is at least 25% by mass or more, preferably 50% by mass or more, more preferably 75% by mass or more, and even more preferably 90% by mass or more. The upper limit of the content is not limited, and is, for example, 100% by mass or less.

The definition of the aspect ratio is as described above.

As the aforementioned raw materials of magnetic particles, at least the magnetic particles X having an aspect ratio less than 8 may be used, or the magnetic particles X and magnetic particles Y having an aspect ratio of 8 or more may be used in combination.

One kind of magnetic particles X may be used alone, or two or more kinds of magnetic particles X may be used.

The magnetic particles X may have any of flat, elliptical, spherical, and amorphous shapes.

In preparing the composition, the total content of the magnetic particles (in other words, the total content of the raw materials of the magnetic particles in the composition) with respect to the total mass of the composition is preferably 30% to 99% by mass, more preferably 35% to 97% by mass, and even more preferably 40% to 95% by mass. Furthermore, the total content of the magnetic particles (in other words, the total content of the raw materials of the magnetic particles in the composition) with respect to the total solid content of the composition is preferably 50% to 99% by mass, more preferably 60% to 97% by mass, and even more preferably 70% to 95% by mass.

[Rheology Control Agent]

The composition contains a rheology control agent.

The rheology control agent is a component that imparts thixotropy to the composition such that the composition exhibits high viscosity in a case where shearing force (shear rate) is low and exhibits low viscosity in a case where shearing force (shear rate) is high.

The content of the rheology control agent with respect to the total mass of the composition is preferably 0.1% to 35% by mass, more preferably 0.5% to 30% by mass, and even more preferably 1% to 27% by mass.

The content of the rheology control agent with respect to the total solid content of the composition is preferably 0.1% to 35% by mass, more preferably 0.5% to 30% by mass, and even more preferably 1% to 27% by mass.

Examples of the rheology control agent include an organic rheology control agent and an inorganic rheology control agent. Among these, an organic rheology control agent is preferable.

<Organic Rheology Control Agent>

The content of the organic rheology control agent with respect to the total mass of the composition is preferably 0.1% to 35% by mass, more preferably 0.5% to 30% by mass, and even more preferably 1% to 25% by mass.

The content of the organic rheology control agent with respect to the total solid content of the composition is preferably 0.1% to 35% by mass, more preferably 0.5% to 30% by mass, and even more preferably 1% to 25% by mass.

One kind of organic rheology control agent may be used alone, or two or more kinds of organic rheology control agents may be used.

Examples of the organic rheology control agent include a compound that has one or more (preferably two or more) adsorptive groups and also has a steric repulsive structural group.

The adsorptive groups interact with the surface of the magnetic particles to make the organic rheology control agent adsorbed onto the surface of the magnetic particles.

Examples of the adsorptive groups include an acid group, a basic group, and an amide group.

Examples of the acid group include a carboxy group, a phosphoric acid group, a sulfo group, a phenolic hydroxyl group, and acid anhydride groups of these (such as an acid anhydride group of a carboxy group). In view of further improving the effects of the present invention, a carboxy group is preferable.

Examples of the basic group include an amino group (a group obtained by removing one hydrogen atom from ammonia, a primary amine, or a secondary amine) and an imino group.

As the adsorptive group, among these, a carboxy group or an amide group is preferable, and a carboxy group is more preferable.

Having a sterically bulky structure, the steric repulsive structural group introduces steric repulsion into the magnetic particles onto which the organic rheology control agent is adsorbed and maintains an appropriate space between the magnetic particles. As the steric repulsive structural group, for example, a chain-like group is preferable, a long-chain fatty acid group is more preferable, and a long-chain alkyl group is even more preferable.

The organic rheology control agent preferably has a hydrogen bonding unit.

The hydrogen bonding unit is a partial structure that functions to establish a hydrogen bonding network between the organic rheology control agents and between the organic rheology control agent and another component. The organic rheology control agent that contributes to the formation of the network may or may not be adsorbed onto the surface of the magnetic particles.

The hydrogen bonding unit may be the same as or different from the adsorptive group described above. In a case where the hydrogen bonding units are the same as the aforementioned adsorptive groups, some of the adsorptive groups are bonded to the surface of the magnetic particles and the others function as hydrogen bonding units.

As the hydrogen bonding units, carboxy groups or amide groups are preferable. Carboxy groups as the hydrogen bonding units are preferable because the carboxy groups readily take part in a curing reaction during the preparation of the magnetic particle-containing film. Amide groups as the hydrogen bonding units are preferable because the amide groups further improve the temporal stability of the composition.

In a case where the organic rheology control agent is a resin, the organic rheology control agent as a resin may have or substantially may not have a repeating unit having a graft chain that will be described later. In a case where the organic rheology control agent as a resin substantially does not have a repeating unit having a graft chain that will be described later, the content of the repeating unit having a graft chain that will be described later with respect to the total mass of the organic rheology control agent as a resin is preferably less than 2% by mass, more preferably 1% by mass or less, and even more preferably less than 0.1% by mass. The lower limit of the content of the repeating unit having a graft chain is 0% by mass or more.

The organic rheology control agent is preferably one or more kinds of substances selected from the group consisting of a polycarboxylic acid (compound having two or more carboxy groups), a polycarboxylic anhydride (compound having two or more acid anhydride groups consisting of carboxy groups), and an amide wax.

These may or may not be a resin.

In addition, these may correspond to an aggregation control agent and/or an anti-aggregation dispersant that will be described later.

Examples of organic rheology control agent include modified urea, a urea-modified polyamide, a fatty acid amide, polyurethane, a polyamide amide, a polymeric urea derivative, salts of these (such as carboxylates), and the like.

The modified urea is a reactant of an isocyanate monomer or an isocyanate monomer adduct and an organic amine. The modified urea is modified with a polyoxyalkylene polyol (such as polyoxyethylene polyol or polyoxypropylene polyol) and/or an alkyd chain, or the like. The urea-modified polyamide is, for example, a compound containing a urea bond and a compound obtained by introducing a medium-polarity group or a low-polarity group into the terminal of the compound containing a urea bond. Examples of the medium-polarity group or the low-polarity group include a polyoxyalkylene polyol (such as a polyoxyethylene polyol or polyoxypropylene polyol) and an alkyd chain. The fatty acid amide is a compound having a long-chain fatty acid group and an amide group in the molecule.

These may or may not be a resin.

In addition, these may correspond to an aggregation control agent and/or an anti-aggregation dispersant that will be described later.

The molecular weight of the organic rheology control agent (weight-average molecular weight in a case where the organic rheology control agent has a molecular weight distribution) is preferably in a range of 200 to 50,000.

In a case where the organic rheology control agent has an acid value, the acid value is preferably 5 to 400 mgKOH/g.

In a case where the organic rheology control agent has an amine value, the amine value is preferably 5 to 300 mgKOH/g.

(Aggregation Control Agent)

Examples of the organic rheology control agent also include an aggregation control agent. The aggregation control agent may or may not be a resin.

The aggregation control agent has functions of being bonded to aggregates having a relatively high density, such as the magnetic particles, and dispersing optionally added other components (for example, a polymerizable compound and the like) in the composition such that bulky aggregates can be formed.

In a case where the composition contains an aggregation control agent, the magnetic particles in the composition are inhibited from forming a hard cake, and bulky aggregates are formed. Therefore, redispersibility can be improved.

Examples of the aggregation control agent include a cellulose derivative.

Examples of the cellulose derivative include carboxymethyl cellulose, methyl cellulose, hydroxyethyl cellulose, hydroxypropyl cellulose, hydroxypropyl methyl cellulose, hydroxypropyl ethyl cellulose, salts of these, and the like.

In a case where the composition contains an aggregation control agent, the content of the aggregation control agent with respect to the total mass of the composition is preferably 0.1% to 20% by mass, more preferably 0.3% to 15% by mass, and even more preferably 0.5% to 10% by mass.

The content of the aggregation control agent with respect to the total solid content of the composition is preferably 0.1% to 20% by mass, more preferably 0.3% to 15% by mass, and even more preferably 0.5% to 10% by mass.

(Anti-Aggregation Dispersant)

Examples of the organic rheology control agent also include an anti-aggregation dispersant.

The anti-aggregation dispersant may or may not be a resin.

The anti-aggregation dispersant comprises a function of being adsorbed onto the surface of the magnetic particles so that the magnetic particles remain spaced apart from each other by at least a certain distance due to the interaction between the dispersants and that the magnetic particles are prevented from being directly aggregated with each other. As a result, the aggregation of the magnetic particles is suppressed, and even in a case where aggregates are formed, the density of the formed aggregates is relatively low. Furthermore, other components (for example, a polymerizable compound and the like) optionally added to the composition can be dispersed in the composition, and bulky aggregates can be formed. Therefore, redispersibility can be improved.

As the anti-aggregation dispersant, an alkylolammonium salt of a polybasic acid is preferable.

The polybasic acid may have two or more acid groups. Examples thereof include an acidic polymer containing a repeating unit having an acid group (for example, polyacrylic acid, polymethacrylic acid, polyvinylsulfonic acid, polyphosphoric acid, and the like). Examples of polybasic acids other than the above include a polymer obtained by polymerizing an unsaturated fatty acid such as crotonic acid. The alkylolammonium salt of a polybasic acid is obtained by reacting these polybasic acids with alkylolammonium. The salt obtained by such a reaction usually contains the following partial structure.

$$-C(=O)-N(-R^1)(-R^2-OH)$$

Here, $R^1$ is an alkyl group, and $R^2$ is an alkylene group.

The alkylolammonium salt of a polybasic acid is preferably a polymer containing a plurality of partial structures described above. In a case where the alkylolammonium salt of a polybasic acid is a polymer, the weight-average molecular weight thereof is preferably 1,000 to 100,000, and more preferably 5,000 to 20,000. The polymer of the alkylolammonium salt of a polybasic acid is bonded to the surface of the magnetic particles and forms a hydrogen bond with molecules of other anti-aggregation dispersants, so that the main chain structure of the polymer goes in between the magnetic particles and the magnetic particles are spaced apart from each other.

Examples of one of the suitable aspects of the anti-aggregation dispersant include amide wax which is a condensate formed by dehydrocondensation of (a) saturated aliphatic monocarboxylic acids and hydroxy group-containing aliphatic monocarboxylic acids, (b) at least any acids among polybasic acids, and (c) at least any amines among diamines and tetramines.

It is preferable that aforementioned (a) to (c) be used so that (a):(b):(c)=1 to 3:0 to 5:1 to 6 in terms of molar ratio.

The saturated aliphatic monocarboxylic acids preferably have a carbon number of 12 to 22. Specific examples thereof include lauric acid, myristic acid, pentadecyl acid, palmitic acid, margaric acid, stearic acid, nonadecanoic acid, arachidic acid, behenic acid, and the like.

The hydroxy group-containing aliphatic monocarboxylic acids preferably have a carbon number of 12 to 22. Specific examples thereof include 12-hydroxystearic acid and dihydroxystearic acid.

Each of the saturated aliphatic monocarboxylic acids and each of the hydroxy group-containing aliphatic monocarboxylic acids may be used alone, or a plurality of saturated aliphatic monocarboxylic acids and a plurality of hydroxy group-containing aliphatic monocarboxylic acids may be used in combination.

The polybasic acids are preferably a carboxylic acid that has a carbon number of 2 to 12 and two or more replaceable hydrogen atoms, and more preferably a dicarboxylic acid.

Examples of such a dicarboxylic acid include an aliphatic dicarboxylic acid such as oxalic acid, malonic acid, succinic acid, glutaric acid, adipic acid, pimelic acid, suberic acid, azelaic acid, sebacic acid, 1,10-decanedicarboxylic acid, or 1,12-dodecanedicarboxylic acid; an aromatic dicarboxylic acid such as phthalic acid, isophthalic acid, or terephthalic acid; and an alicyclic dicarboxylic acid such as 1,2-cyclohexanedicarboxylic acid, 1,3-cyclohexanedicarboxylic acid, 1,4-cyclohexanedicarboxylic acid, or cyclohexylsuccinic acid. Each of these polybasic acids may be used alone, or a plurality of these polybasic acids may be used in combination.

The diamines preferably have a carbon number of 2 to 14. Specifically, examples thereof include ethylenediamine, 1,3-propanediamine, 1,4-butanediamine, hexamethylenediamine, metaxylylenediamine, tolylenediamine, paraxylylenediamine, phenylenediamine, isophoronediamine, 1,10-decanediamine, 1,12-dodecanediamine, 4,4-diaminodicyclohexylmethane, and 4,4-diaminodiphenylmethane.

The tetramines preferably have a carbon number of 2 to 14. Specific examples thereof include butane-1,1,4,4-tetramine and pyrimidine-2,4,5,6-tetramine. Each of the diamines and each of the tetramines may be used alone, or a plurality of diamines and a plurality of tetramines may be used in combination.

The amount of diamines and tetramines is adjusted depending on the number of moles of the saturated aliphatic monocarboxylic acids or the hydroxy group-containing aliphatic monocarboxylic acids and the number of moles of the polybasic acids, so that the total number of carboxy groups is equivalent to the total number of amino groups. For example, in a case where the number of moles of an aliphatic dicarboxylic acid, which is polybasic acids, is n (n=0 to 5) with respect to 2 moles of the aliphatic monocarboxylic acid, by setting the number of moles of diamines to (n+1), the amount of acids is equivalent to the amount of amines.

This amide wax may be obtained as a mixture of a plurality of compounds having different molecular weights. The amide wax is preferably a compound represented by Chemical Formula (I). The amide wax may be a single compound or a mixture.

$$\text{A-C—(B—C)}_m\text{-A} \quad \text{(I)}$$

In formula (I), A is a dehydroxylated residue of a saturated aliphatic monocarboxylic acid and/or a hydroxy group-containing saturated aliphatic monocarboxylic acid, B is a dehydroxylated residue of a polybasic acid, C is a dehydrogenated residue of a diamine and/or a tetramine, and m satisfies 0≤m≤5.

Examples of one of the suitable aspects of the anti-aggregation dispersant include a compound represented by the following Formula (II).

(II)

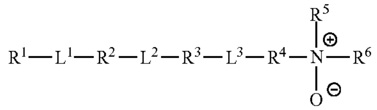

In Formula (II), $R^1$ represents a monovalent linear aliphatic hydrocarbon group with a carbon number of 10 to 25, $R^2$ and $R^3$ each independently represent a divalent aliphatic hydrocarbon group with a carbon number of 2, 4, 6, or 8, a divalent alicyclic hydrocarbon group with a carbon number of 6, or a divalent aromatic hydrocarbon group, $R^4$ represents a divalent aliphatic hydrocarbon group with a carbon number of 1 to 8, and $R^5$ and $R^6$ each independently represent a monovalent aliphatic hydrocarbon group with a carbon number of 1 to 3 or a hydroxyalkyl ether group.

In Formula (II), $L^1$ to $L^3$ each independently represent an amide bond. In a case where $L^1$ and $L^3$ each represent —CONH—, $L^2$ represents —NHCO—. In a case where $L^1$ and $L^3$ each represent —NHCO—, $L^2$ represents —CONH—.

$R^1$ is a monovalent linear aliphatic hydrocarbon group with a carbon number of 10 to 25. Examples thereof include a linear alkyl group such as a decyl group, a lauryl group, a myristyl group, a pentadecyl group, a stearyl group, a palmityl group, a nonadecyl group, an eicosyl group, or a behenyl group; a linear alkenyl group such as a decenyl group, a pentadecenyl group, an oleyl group, or an eicosenyl group; and a linear alkynyl group such as a pentadecynyl group, an octadecynyl group, or a nonadecinyl group.

Particularly, $R^1$ is preferably a monovalent linear aliphatic hydrocarbon group with a carbon number of 14 to 25, and more preferably a monovalent linear aliphatic hydrocarbon group with a carbon number of 18 to 21. The linear aliphatic hydrocarbon group is preferably an alkyl group.

Examples of the divalent aliphatic hydrocarbon group with a carbon number of 2, 4, 6, or 8 represented by $R^2$ and $R^3$ include an ethylene group, a n-butylene group, a n-hexylene group, and a n-octylene group.

Examples of the divalent alicyclic hydrocarbon group with a carbon number of 6 represented by $R^2$ and $R^3$ include a 1,4-cyclohexylene group, a 1,3-cyclohexylene group, and a 1,2-cyclohexylene group.

Examples of the divalent aromatic hydrocarbon group represented by $R^2$ and $R^3$ include an arylene group with a carbon number of 6 to 10, such as a 1,4-phenylene group, a 1,3-phenylene group, or a 1,2-phenylene group.

As $R^2$ and $R^3$, among the above, in view of an excellent thickening effect, a divalent aliphatic hydrocarbon group with a carbon number of 2, 4, 6, or 8 is preferable, a divalent aliphatic hydrocarbon group with a carbon number of 2, 4, or 6 is more preferable, a divalent aliphatic hydrocarbon group with a carbon number of 2 or 4 is even more preferable, and a divalent aliphatic hydrocarbon group with a carbon number of 2 is still more preferable. The divalent aliphatic hydrocarbon group is preferably a linear alkylene group.

$R^4$ represents a divalent aliphatic hydrocarbon group with a carbon number of 1 to 8. Among these, in view of an excellent thickening effect, a linear or branched alkylene group is preferable, and a linear alkylene group is more preferable.

The divalent aliphatic hydrocarbon group represented by $R^4$ has a carbon number of 1 to 8. In view of an excellent thickening effect, the carbon number is preferably 1 to 7, more preferably 3 to 7, even more preferably 3 to 6, and particularly preferably 3 to 5.

Therefore, $R^4$ is preferably a linear or branched alkylene group with a carbon number of 1 to 8, more preferably a linear alkylene group with a carbon number of 1 to 7, even more preferably a linear alkylene group with a carbon number of 3 to 7, particularly preferably a linear alkylene group with a carbon number of 3 to 6, and most preferably a linear alkylene group with a carbon number of 3 to 5.

Examples of the monovalent aliphatic hydrocarbon group with a carbon number of 1 to 3 represented by $R^5$ and $R^6$ include a linear or branched alkyl group with a carbon number of 1 to 3 such as a methyl group, an ethyl group, a propyl group, or an isopropyl group; a linear or branched alkenyl group with a carbon number of 2 or 3 such as a vinyl group, a 1-methylvinyl group, or a 2-propenyl group; a linear or branched alkynyl group with a carbon number of 2 or 3 such as an ethynyl group or a propynyl group.

Examples of the hydroxyalkyl ether group represented by $R^5$ and $R^6$ include a mono or di(hydroxy) $C_{1-3}$ alkyl ether group such as a 2-hydroxyethoxy group, a 2-hydroxypropoxy group, or a 2,3-dihydroxypropoxy group.

Especially, $R^5$ and $R^6$ preferably each independently represent a monovalent aliphatic hydrocarbon group with a carbon number of 1 to 3, more preferably each independently represent a linear or branched alkyl group with a carbon number of 1 to 3, even more preferably each independently represent a linear alkyl group with a carbon number of 1 to 3, and particularly preferably each independently represent a methyl group.

As the compound represented by Formula (II), the compounds represented by the following Formulas (II-1) to (II-9) are preferable.

BYK-102, DISPER BYK-180, and DISPER BYK-191 (all are trade names, manufactured by BYK-Chemie GmbH.): BYK-P105" (trade name, manufactured by BYK-Chemie GmbH.): TEGO Disper 630 and TEGO Disper 700 (all are trade names, manufactured by Evonik Degussa Japan Co., Ltd.): Taren VA-705B (trade name, manufactured by KYOEISHA CHEMICAL CO., LTD.): FLOWNON RCM-300TL and FLOWNON RCM-230 AF (trade name, manufactured by KYOEISHA CHEMICAL CO., LTD., amide wax), and the like.

In a case where the composition contains an anti-aggregation dispersant, the content of the anti-aggregation dispersant with respect to the total mass of the composition is (II-1)

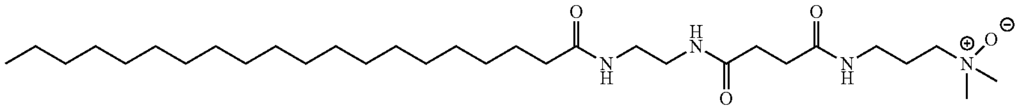

(II-2)

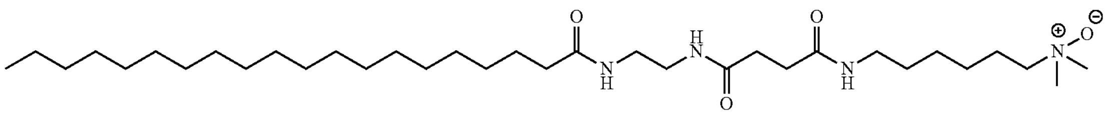

(II-3)

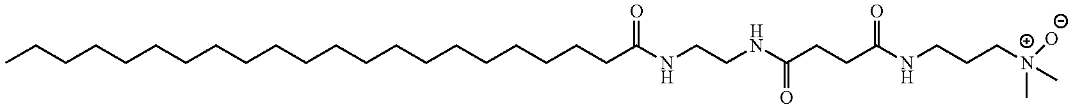

(II-4)

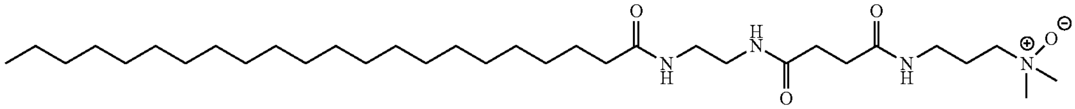

(II-5)

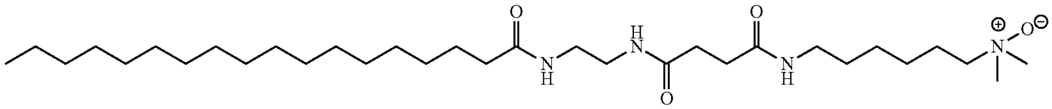

(II-6)

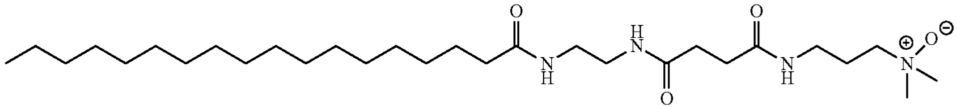

(II-7)

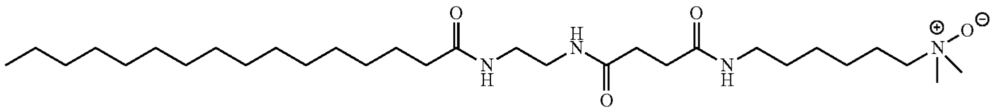

(II-8)

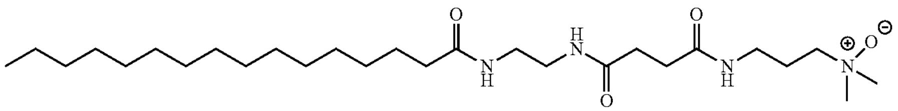

(II-9)

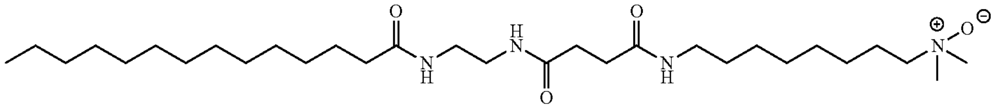

Examples of the anti-aggregation dispersant include ANTI-TERRA-203, ANTI-TERRA-204, ANTI-TERRA-206, and ANTI-TERRA-250 (all are trade names, manufactured by BYK-Chemie GmbH.): ANTI-TERRA-U (trade name, manufactured by BYK-Chemie GmbH.): DISPER preferably 0.1% to 35% by mass, more preferably 0.3% to 30% by mass, and even more preferably 0.5% to 27% by mass.

The content of the anti-aggregation dispersant with respect to the total solid content of the composition is preferably 0.1% to 35% by mass, more preferably 0.3% to 30% by mass, and even more preferably 0.5% to 27% by mass.

<Inorganic Rheology Control Agent>

Examples of the inorganic rheology control agent include bentonite, silica, calcium carbonate, and smectite.

[Other Resins]

It is also preferable that the composition contain other resins.

The aforementioned other resins mean resins that do not correspond to rheology control agents that are resins.

The weight-average molecular weight of those other resins is preferably more than 2,000.

Examples of those other resins include a (meth)acrylic resin, an epoxy resin, an ene-thiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamide imide resin, a polyolefin resin, a cyclic olefin resin, a polyester resin, a styrene resin, a phenoxy resin, and the like. One kind of each of these resins may be used alone, or two or more kinds of these resins may be used by being mixed together. As the cyclic olefin resin, from the viewpoint of improving heat resistance, a norbornene resin is preferable. Examples of commercially available products of the norbornene resin include ARTON series manufactured by JSR Corporation (for example, ARTON F4520). Examples of the epoxy resin include an epoxy resin that is a glycidyl etherification product of a phenol compound, an epoxy resin that is a glycidyl etherification product of various novolac resins, an alicyclic epoxy resin, an aliphatic epoxy resin, a heterocyclic epoxy resin, a glycidyl ester-based epoxy resin, a glycidyl amine-based epoxy resin, an epoxy resin obtained by glycidylation of halogenated phenols, a condensate of a silicon compound having an epoxy group and another silicon compound, a copolymer of a polymerizable unsaturated compound having an epoxy group and another polymerizable unsaturated compound, and the like. As the epoxy resin, MARPROOF G-0150M, G-0105SA, G-0130SP, G-0250SP, G-10055, G-1005SA, G-1010S, G-2050M, G-01100, and G-01758 (manufactured by NOF CORPORATION, epoxy group-containing polymers) and the like can also be used. In addition, as those other resins, the resins described in Examples of WO2016/088645A can also be used. In a case where those other resins have an ethylenically unsaturated group, particularly, a (meth)acryloyl group on a side chain, it is also preferable that the main chain and the ethylenically unsaturated group be bonded via a divalent linking group having an alicyclic structure.

Examples of one of the suitable aspects of those other resins include a resin having a polymerizable group such as an unsaturated double bond (for example, an ethylenically unsaturated double bond), an epoxy group, or an oxetanyl group. In a case where the polymerizable group reacts in the process of forming a magnetic particle-containing film, a magnetic particle-containing film having excellent mechanical strength is obtained.

Examples of those other resins include a polymer having an epoxy group on a side chain and a polymerizable monomer or oligomer having two or more epoxy groups in the molecule. Specific examples thereof include a bisphenol A-type epoxy resin, a bisphenol F-type epoxy resin, a phenol novolac-type epoxy resin, a cresol novolac-type epoxy resin, an aliphatic epoxy resin, and the like.

As these other resins, commercially available products may also be used. Furthermore, these resins may be obtained by introducing an epoxy group into a side chain of a polymer.

As for the commercially available products, for example, the description in paragraph 0191 of JP2012-155288A and the like can be referred to, and what are described in the paragraph are incorporated into the present specification.

Examples of the commercially available product also include ADEKA RESIN EP-40005, ADEKA RESIN EP-40035, ADEKA RESIN EP-40105, and ADEKA RESIN EP-40115 (all are manufactured by ADEKA CORPORATION), NC-2000, NC-3000, NC-7300, XD-1000, EPPN-501, and EPPN-502 (all are manufactured by ADEKA CORPORATION), JER1031S, and the like.

Examples of commercially available products of the phenol novolac-type epoxy resin include JER-157S65, JER-152, JER-154, and JER-157S70 (all are manufactured by Mitsubishi Chemical Holdings Corporation.) and the like.

Specifically, as the polymer having an oxetanyl group on a side chain and the aforementioned polymerizable monomer or oligomer having two or more oxetanyl groups in the molecule, for example, ARON OXETANE OXT-121, OXT-221, OX-SQ, and PNOX (all are manufactured by TOAGOSEI CO., LTD.) can be used.

In a case where an epoxy group is introduced into a side chain of a polymer so that those other resins having an epoxy group are synthesized, the introduction reaction is performed by causing the reaction in an organic solvent at a reaction temperature of 50° C. to 150° C. for a predetermined time by using, for example, a tertiary amine such as triethylamine or benzylmethylamine, a quaternary ammonium salt such as dodecyltrimethylammonium chloride, tetramethylammonium chloride, or tetraethylammonium chloride, pyridine, triphenylphosphine or the like as a catalyst. The amount of the alicyclic epoxy unsaturated compound to be introduced can be controlled so that the acid value of the obtained polymer falls into a range of 5 to 200 KOH·mg/g. The weight-average molecular weight can be in a range of 500 to 5,000,000, and preferably in a range of 1,000 to 500,000.

Instead of the alicyclic epoxy unsaturated compound, it is also possible to use a compound having a glycidyl group as an epoxy group, such as glycidyl (meth)acrylate or allyl glycidyl ether. As for such a compound, for example, the description in paragraph 0045 of JP2009-265518A and the like can be referred to, and what are described in the paragraph are incorporated into the present specification.

Examples of one of the suitable aspects of those other resins include other resins having an acid group, a basic group, or an amide group. In view of further improving the effects of the present invention, the aforementioned other resins having an acid group, a basic group, or an amide group are suitable because these resins are likely to function as a dispersant for dispersing the magnetic particles.

Examples of the acid group include a carboxy group, a phosphoric acid group, a sulfo group, a phenolic hydroxyl group, and the like. In view of further improving the effects of the present invention, a carboxy group is preferable.

Examples of the basic group include an amino group (ammonia, a group obtained by removing one hydrogen atom from a primary amine or a secondary amine) and an imino group.

In view of further improving the effects of the present invention, it is preferable that those other resins have a carboxy group or an amide group among the above.

In a case where those other resins have an acid group, in view of further improving the effects of the present invention, the acid value of those other resins is preferably 10 to 500 mgKOH/g, and particularly preferably 30 to 400 mgKOH/g.

In view of further improving the dispersibility of those other resins in the composition such that the effects of the present invention are further improved, as those other resins to be used, other resins having a solubility of 10 g/L or more in a solvent are preferable, and other resins having a solubility of 20 g/L or more in a solvent are more preferable.

The upper limit of the solubility of those other resins in a solvent is preferably 2,000 g/L or less, and particularly preferably 1,000 g/L or less.

The solubility of a resin in a solvent means the amount (g) of the resin dissolved in 1 L of a solvent at 25° C.

In view of further improving the effects of the present invention, the content of those other resins with respect to the total mass of the composition is preferably 0.1% to 30% by mass, more preferably 1% to 20% by mass, even more preferably 2% to 15% by mass, and particularly preferably 2.5% to 10% by mass.

The content of those other resins with respect to the total solid content of the composition is preferably 0.1% to 30% by mass, more preferably 1% to 20% by mass, even more preferably 2% to 15% by mass, and particularly preferably 2.5% to 10% by mass.

<Resin Having Repeating Unit Having Graft Chain (Resin A)>

Examples of those other resins include a resin having a repeating unit having a graft chain (hereinafter, this resin will be also called "resin A"). The resin A can assist the effect of the rheology control agent and improve the effect of improving temporal stability of the composition.

In a case where the composition contains the resin A, in view of further improving the effects of the present invention, the content of the resin A with respect to the total mass of the composition is preferably 0.1% to 30% by mass, more preferably 0.5% to 20% by mass, and even more preferably 1% to 10% by mass.

The content of the resin A with respect to the total solid content of the composition is preferably 0.1% to 30% by mass, more preferably 0.5% to 20% by mass, and even more preferably 1% to 10% by mass.

In a case where the resin A is used, the mass ratio of the content of the rheology control agent to the content of the resin A (rheology control agent/resin A) is preferably 10/90 to 90/10, more preferably 30/70 to 80/20, and even more preferably 50/50 to 70/30.

(Repeating Unit Having Graft Chain)

The longer the graft chain in the repeating unit having a graft chain, the higher the effect of steric repulsion, which improves the dispersibility of the magnetic particles. In contrast, in a case where the graft chain is too long, the adsorptive force with respect to the magnetic particles is reduced, which tends to deteriorate the dispersibility of the magnetic particles. Therefore, the number of atoms constituting the graft chain excluding a hydrogen atom is preferably 40 to 10,000, more preferably 50 to 2,000, and even more preferably 60 to 500.

The graft chain mentioned herein refers to a portion from the root of the main chain (atom bonded to the main chain in a group branching off from the main chain) to the terminal of the group branching off from the main chain.

It is preferable that the graft chain contain a polymer structure. Examples of such a polymer structure include a poly(meth)acrylate structure (for example, a poly(meth)acrylic structure), a polyester structure, a polyurethane structure, a polyurea structure, a polyamide structure, a polyether structure, and the like.

In order to improve the interactivity between the graft chain and a solvent so that the dispersibility of the magnetic particles is improved, the graft chain is preferably a graft chain containing at least one kind of structure selected from the group consisting of a polyester structure, a polyether structure, and a poly(meth)acrylate structure, and more preferably a graft chain containing at least either a polyester structure or a polyether structure.

The resin A may be a resin obtained using a macromonomer having a graft chain (a monomer that has a polymer structure and is bonded to a main chain to constitute a graft chain).

The macromonomer having a graft chain (monomer that has a polymer structure and is bonded to a main chain to constitute a graft chain) is not particularly limited. As this macromonomer, a macromonomer containing a reactive double bond-forming group can be suitably used.

As commercially available macromonomers that correspond to the aforementioned repeating unit having a graft chain and suitably used for the synthesis of the resin A, AA-6, AA-10, AB-6, AS-6, AN-6, AW-6, AA-714, AY-707, AY-714, AK-5, AK-30, and AK-32 (all are trade names, manufactured by TOAGOSEI CO., LTD.), and BLEMMER PP-100, BLEMMER PP-500, BLEMMER PP-800, BLEMMER PP-1000, BLEMMER 55-PET-800, BLEMMER PME-4000, BLEMMER PSE-400, BLEMMER PSE-1300, and BLEMMER 43PAPE-600B (all are trade names, manufactured by NOF CORPORATION.) are used. Among these, AA-6, AA-10, AB-6, AS-6, AN-6, or BLEMMER PME-4000 is preferable.

The resin A preferably contains at least one kind of structure selected from the group consisting of polymethyl acrylate, polymethyl methacrylate, and cyclic or chain-like polyester, more preferably contains at least one kind of structure selected from the group consisting of polymethyl acrylate, polymethyl methacrylate, and chain-like polyester, and even more preferably contains at least one kind of structure selected from the group consisting of a polymethyl acrylate structure, a polymethyl methacrylate structure, a polycaprolactone structure, and a polyvalerolactone structure. The resin A may contain only one kind of the aforementioned structure or a plurality of the aforementioned structures.

The polycaprolactone structure mentioned herein refers to a structure containing, as a repeating unit, a structure formed by ring opening of F-caprolactone. The polyvalerolactone structure refers to a structure containing, as a repeating unit, a structure formed by ring opening of δ-valerolactone.

In a case where the resin A contains repeating units represented by Formula (1) and Formula (2), which will be described later, where each of j and k is 5, the aforementioned polycaprolactone structure can be introduced into the resin A.

In a case where the resin A contains repeating units represented by Formula (1) and Formula (2), which will be described later, where each of j and k is 4, the aforementioned polyvalerolactone structure can be introduced into the resin A.

In a case where the resin A contains a repeating unit represented by Formula (4), which will be described later, where $X^5$ is a hydrogen atom and $R^4$ is a methyl group, the aforementioned polymethyl acrylate structure can be introduced into the resin A.

In a case where the resin A contains a repeating unit represented by Formula (4), which will be described later, where $X^5$ and $R^4$ both represent a methyl group, the aforementioned polymethyl methacrylate structure can be introduced into the resin A.

As the repeating unit having a graft chain that the resin A is to contain, a repeating unit represented by any of the following Formula (1) to Formula (4) is preferable, and a repeating unit represented by any of the following Formula (1A), the following Formula (2A), the following Formula (3A), the following Formula (3B), and the following Formula (4) is more preferable.

(1)

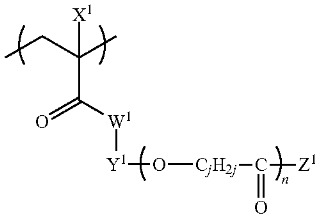

(2)

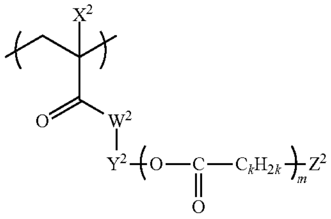

(3)

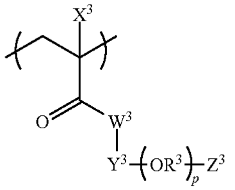

(4)

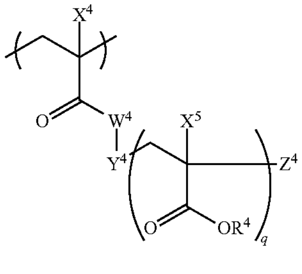

In Formulas (1) to (4), $W^1$, $W^2$, $W^3$, and $W^4$ each independently represent an oxygen atom or NH. $W^1$, $W^2$, $W^3$, and $W^4$ are preferably oxygen atoms.

In Formulas (1) to (4), $X^1$, $X^2$, $X^3$, $X^4$, and $X^5$ each independently represent a hydrogen atom or a monovalent organic group. In view of restrictions on synthesis, $X^1$, $X^2$, $X^3$, $X^4$, and $X^5$ preferably each independently represent a hydrogen atom or an alkyl group with a carbon number (the number of carbon atoms) of 1 to 12, more preferably each independently represent a hydrogen atom or a methyl group, and even more preferably each independently represent a methyl group.

In Formulas (1) to (4), $Y^1$, $Y^2$, $Y^3$, and $Y^4$ each independently represent a divalent linking group. The structure of the linking group is not particularly restricted. Specific examples of the divalent linking group represented by $Y^1$, $Y^2$, $Y^3$, and $Y^4$ include the following linking groups (Y-1) to (Y-21) and the like. In the following structures, A means a bonding site to the left terminal group in Formulas (1) to (4), and B means a bonding site to the right terminal group in Formulas (1) to (4). Among the following structures, in view of ease of synthesis, (Y-2) or (Y-13) is more preferable.

(Y-1)

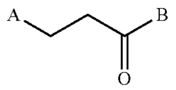

(Y-2)

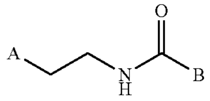

(Y-3)

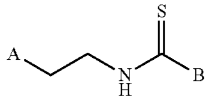

(Y-4)

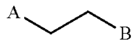

(Y-5)

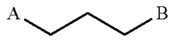

(Y-6)

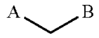

(Y-7)

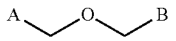

(Y-8)

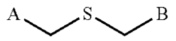

(Y-9)

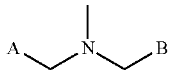

(Y-10)

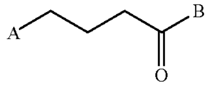

(Y-11)

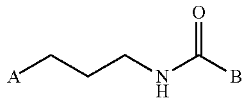

(Y-12)

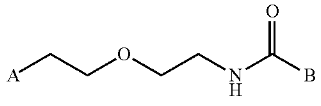

(Y-13)

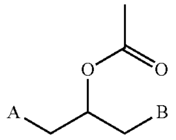

(Y-14)

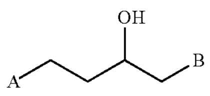

-continued (Y-15)

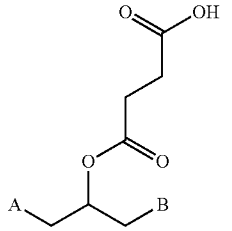

(Y-16)

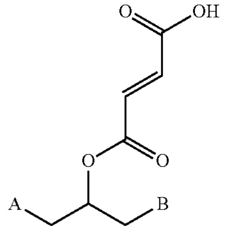

(Y-17)

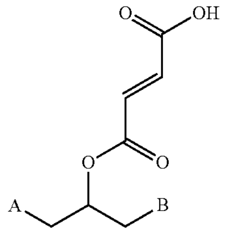

(Y-18)

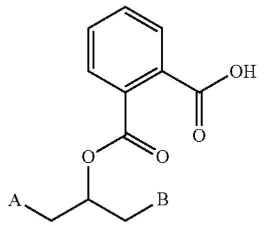

(Y-19)

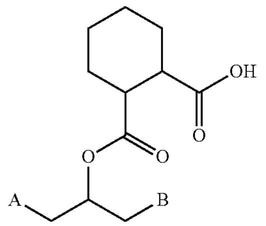

(Y-20)

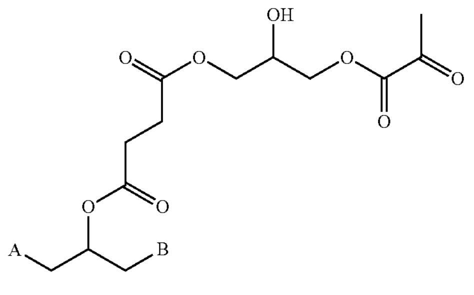

(Y-21)

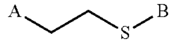

In Formulas (1) to (4), $Z^1$, $Z^2$, $Z^3$, and $Z^4$ each independently represent a hydrogen atom or a monovalent substituent. The structure of the substituent is not particularly limited. Specific examples of the substituent include an alkyl group, a hydroxyl group, an alkoxy group, an aryloxy group, a heteroaryloxy group, an alkylthioether group, an arylthioether group, a heteroarylthioether group, an amino group, and the like. Among these, as the group represented by $Z^1$, $Z^2$, $Z^3$, and $Z^4$, particularly, in view of improving dispersibility, a group that brings about a steric repulsion effect is preferable. $Z^1$, $Z^2$, $Z^3$, and $Z^4$ more preferably each independently represent an alkyl or alkoxy group with a carbon number of 5 to 24. Especially, $Z^1$, $Z^2$, $Z^3$, and $Z^4$ even more preferably each independently represent a branched alkyl group with a carbon number of 5 to 24, a cyclic alkyl group with a carbon number of 5 to 24, or an alkoxy group with a carbon number of 5 to 24. Note that the alkyl group contained in the alkoxy group may be linear, branched, or cyclic.

The substituent represented by $Z^1$, $Z^2$, $Z^3$, and $Z^4$ is also preferably a group containing a curable group such as a (meth)acryloyl group, an epoxy group, and/or an oxetanyl group. Examples of the group containing a curable group include "—O-alkylene group-(—O-alkylene group-)$_{AL}$-(meth)acryloyloxy group". AL represents an integer of 0 to 5. AL is preferably 1. The aforementioned alkylene group preferably each independently has a carbon number of 1 to 10. In a case where the alkylene group has a substituent, the substituent is preferably a hydroxyl group.

The substituent may be a group containing an onium structure.

The group containing an onium structure is a group having an anionic moiety and a cationic moiety. Examples of the anionic moiety include a partial structure containing an oxygen anion (—O—). Particularly, the oxygen anion (—O—) is preferably directly bonded to the terminal of the repeating structure having n, m, p, or q in the repeating unit represented by any of Formulas (1) to (4), and more preferably directly bonded to the terminal of the repeating structure having n in the repeating unit represented by Formula (1) (that is, the right terminal in —(—O—$C_jH_{2j}$—CO—)$_n$—).

Examples of the cation in the cationic moiety of the group containing an onium structure include an ammonium cation. In a case where the cationic moiety is an ammonium cation, the cationic moiety is a partial structure containing a cationic nitrogen atom (>$N^+$<). The cationic nitrogen atom (>$N^+$<) is preferably bonded to 4 substituents (preferably organic groups), and 1 to 4 out of the substituents are preferably an alkyl group with a carbon number of 1 to 15. One or more out of the 4 substituents (preferably one of the 4 substituents) are also preferably a group containing a curable group such as a (meth)acryloyl group, an epoxy group, and/or an oxetanyl group. Examples of the group containing a curable group that can be the substituent include "—O-alkylene group-(—O-alkylene group-)$_{AL}$-(meth)acryloyloxy group" described above.

In Formulas (1) to (4), n, m, p, and q each independently represent an integer of 1 to 500.

In Formulas (1) and (2), j and k each independently represent an integer of 2 to 8. Each of j and k in Formulas (1) and (2) is preferably an integer of 4 to 6, and more preferably 5.

In Formulas (1) and (2), each of n and m is, for example, an integer of 2 or more, preferably an integer of 6 or more, more preferably an integer of 10 or more, and even more preferably an integer of 20 or more. In a case where the resin A contains a polycaprolactone structure and a polyvalerolactone structure, the sum of the repetition number of the polycaprolactone structure and the repetition number of polyvalerolactone is preferably an integer of 10 or more, and more preferably an integer of 20 or more.

In Formula (3), $R^3$ represents a branched or linear alkylene group which is preferably an alkylene group with a carbon number of 1 to 10, and more preferably an alkylene group with a carbon number of 2 or 3. In a case where p is 2 to 500, a plurality of $R^3$'s may be the same or different from each other.

In Formula (4), $R^4$ represents a hydrogen atom or a monovalent organic group, and the structure of the monovalent substituent is not particularly limited. $R^4$ is preferably a hydrogen atom, an alkyl group, an aryl group, or a heteroaryl group, and more preferably a hydrogen atom or an alkyl group. In a case where $R^4$ is an alkyl group, the alkyl group is preferably a linear alkyl group with a carbon number of 1 to 20, a branched alkyl group with a carbon number of 3 to 20, or a cyclic alkyl group with a carbon number of 5 to 20, more preferably a linear alkyl group with a carbon number of 1 to 20, and even more preferably a linear alkyl group with a carbon number of 1 to 6. In a case where q in Formula (4) is 2 to 500, a plurality of $X^5$'s and $R^4$'s in the graft chain may be the same or different from each other.

The resin A may contain two or more kinds of repeating units having different structures and having a graft chain. That is, the molecule of the resin A may contain repeating units represented by Formulas (1) to (4) having different structures. Furthermore, in a case where n, m, p, and q in Formulas (1) to (4) each represent an integer of 2 or more, the side chains in Formulas (1) and (2) may contain structures where j and k represent different integers, and a plurality of $R^3$'s, $R^4$'s, and $X^5$'s in the molecules of Formulas (3) and (4) may be the same or different from each other.

The repeating unit represented by Formula (1) is more preferably a repeating unit represented by the following Formula (1A).

The repeating unit represented by Formula (2) is more preferably a repeating unit represented by the following Formula (2A).

(IA)

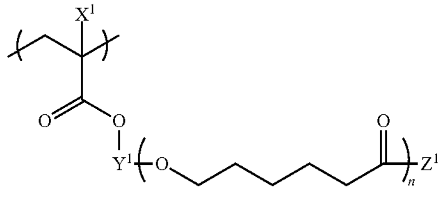

(2A)

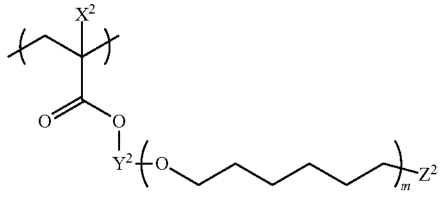

$X^1$, $Y^1$, $Z^1$, and n in Formula (1A) have the same definitions as $X^1$, $Y^1$, $Z^1$, and n in Formula (1), and preferable ranges thereof are the same as well. $X^2$, $Y^2$, $Z^2$, and m in Formula (2A) have the same definitions as $X^2$, $Y^2$, $Z^2$, and m in Formula (2), and preferable ranges thereof are the same as well.

The repeating unit represented by Formula (3) is more preferably a repeating unit represented by the following Formula (3A) or the following Formula (3B).

(3A)

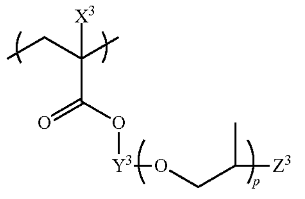

(3B)

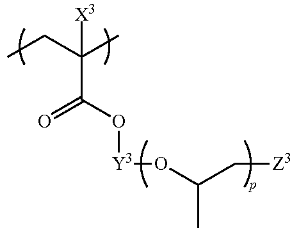

$X^3$, $Y^3$, $Z^3$, and p in Formula (3A) or (3B) have the same definitions as $X^3$, $Y^3$, $Z^3$, and p in Formula (3), and preferable ranges thereof are the same as well.

It is more preferable that the resin A contain the repeating unit represented by Formula (1A) as the repeating unit having a graft chain.

It is also preferable that the resin A contain a repeating unit containing a polyalkylene imine structure and a polyester structure. It is preferable that the repeating unit containing a polyalkylene imine structure and a polyester structure contain the polyalkylene imine structure on the main chain and contain the polyester structure as a graft chain.

The polyalkylene imine structure is a polymerization structure having two or more identical or different alkylene imine chains. Specific examples of the alkylene imine chain include alkylene imine chains represented by the following Formula (4A) and the following Formula (4B).

(4A)

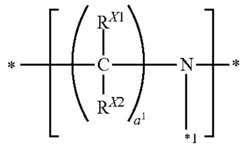

In Formula (4A), $R^{x1}$ and $R^{x2}$ each independently represent a hydrogen atom or an alkyl group. $a^1$ represents an integer of 2 or more. $*^1$ represents a bonding position to a polyester chain, an adjacent alkylene imine chain, a hydrogen atom, or a substituent.

(4B)

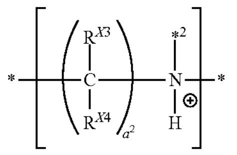

In Formula (4B), $R^{x3}$ and $R^{x4}$ each independently represent a hydrogen atom or an alkyl group. $a^2$ represents an integer of 2 or more. The alkylene imine chain represented by Formula (4B) is bonded to a polyester chain having an anionic group by the formation of a salt crosslinking group of $N^+$ shown in Formula (4B) and an anionic group contained in the polyester chain.

* in Formula (4A) and Formula (4B) and *2 in Formula (4B) each independently represent a position to be bonded to an adjacent alkylene imine chain, a hydrogen atom, or a substituent.

* in Formula (4A) and Formula (4B) particularly preferably represent a position to be bonded to an adjacent alkylene imine chain.

$R^{X1}$ and $R^{X2}$ in Formula (4A) and $R^{X3}$ and $R^{X4}$ in Formula (4B) each independently represent a hydrogen atom or an alkyl group.

The carbon number of the alkyl group is preferably 1 to 6, and more preferably 1 to 3.

It is preferable that $R^{x1}$ and $R^{x2}$ in Formula (4A) both represent a hydrogen atom.

It is preferable that $R^{x3}$ and $R^{x4}$ in Formula (4B) both represent a hydrogen atom.

$a^1$ in Formula (4A) and $a^2$ in Formula (4B) are not particularly limited as long as $a^1$ and $a^2$ each represent an integer of 2 or more. The upper limit of $a^1$ and $a^2$ is preferably 10 or less, more preferably 6 or less, even more preferably 4 or less, still more preferably 2 or 3, and particularly preferably 2.

* in Formula (4A) and Formula (4B) represents a bonding position to an adjacent alkylene imine chain, a hydrogen atom, or a substituent.

Examples of the aforementioned substituent include a substituent such as an alkyl group (for example, an alkyl group with a carbon number of 1 to 6). Furthermore, a polyester chain may be bonded thereto as a substituent.

The alkylene imine chain represented by Formula (4A) is preferably linked to the polyester chain at the position represented by *1 described above. Specifically, it is preferable that the carbonyl carbon in the polyester chain be bonded at the position represented by *1 described above.

Examples of the polyester chain include a polyester chain represented by the following formula (5A).

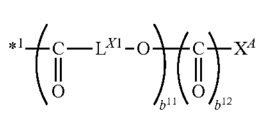

(5A)

In a case where the alkylene imine chain is an alkylene imine chain represented by Formula (4B), it is preferable that the polyester chain contain an anion (preferably an oxygen anion $O^-$), and that the anion and $N^+$ in Formula (4B) form a salt crosslinking group.

Examples of such a polyester chain include a polyester chain represented by the following Formula (5B).

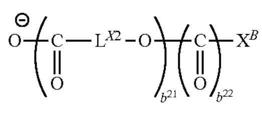

(5B)

$L^{X1}$ in Formula (5A) and $L^{X2}$ in Formula (5B) each independently represent a divalent linking group. Preferable examples of the divalent linking group include an alkylene group with a carbon number of 3 to 30.

$b^{11}$ in Formula (5A) and $b^{21}$ in Formula (5B) each independently represent an integer of 2 or more. Each of $b^{11}$ and $b^{21}$ is preferably an integer of 6 or more, and the upper limit thereof is, for example, 200 or less.

$b^{12}$ in Formula (5A) and $b^{22}$ in Formula (5B) each independently represent 0 or 1.

$X^A$ in Formula (5A) and $X^B$ in Formula (5B) each independently represent a hydrogen atom or a substituent. Examples of the substituent include an alkyl group, an alkoxy group, a polyalkyleneoxyalkyl group, an aryl group, and the like.

The carbon number of the aforementioned alkyl group (the alkyl group may be any of linear, branch, and cyclic alkyl groups) and the carbon number of an alkyl group (the alkyl group may be any of linear, branch, and cyclic alkyl groups) contained in the aforementioned alkoxy group are, for example, 1 to 30, and preferably 1 to 10. The aforementioned alkyl group may further have a substituent. Examples of the substituent include a hydroxyl group and a halogen atom (the halogen atom includes a fluorine atom, a chlorine atom, a bromine atom, an iodine atom, and the like).

The polyalkyleneoxyalkyl group is a substituent represented by $R^{X6}(OR^{X7})_p(O)_q$—. $R^{X6}$ represents an alkyl group, $R^{X7}$ represents an alkylene group, p represents an integer of 2 or more, and q represents 0 or 1.

The alkyl group represented by $R^{X6}$ has the same definition as the alkyl group represented by $X^A$. Examples of the alkylene group represented by $R^{X7}$ include a group obtained by removing one hydrogen atom from the alkyl group represented by $X^A$.

p is an integer of 2 or more, and the upper limit thereof is, for example, 10 or less, and preferably 5 or less.

Examples of the aryl group include an aryl group (which may be monocyclic or polycyclic) with a carbon number of 6 to 24.

The aforementioned aryl group may further have a substituent. Examples of the substituent include an alkyl group, a halogen atom, a cyano group, and the like.

The aforementioned polyester chain is preferably a structure established by ring opening of lactones such as ε-caprolactone, δ-caprolactone, β-propiolactone, γ-butyrolactone, δ-valerolactone, γ-valerolactone, enanthonolactone, β-butyrolactone, γ-hexanolactone, γ-octanolactone, δ-hexanolactone, δ-octanolactone, δ-dodecanolactone, α-methyl-γ-butyrolactone, and lactide (which may be L-lactide or D-lactide), and more preferably a structure established by ring opening of F-caprolactone or δ-valerolactone.

The aforementioned repeating unit containing a polyalkylene imine structure and a polyester structure can be synthesized according to the synthesis method described in JP5923557B.

In the resin A, the content of the repeating unit having a graft chain expressed in terms of mass with respect to the total mass of the resin A is, for example, 2% to 100% by mass, preferably 2% to 95% by mass, more preferably 2% to 90% by mass, and even more preferably 5% to 30% by mass. In a case where the content of the repeating unit having a graft chain is in this range, the effects of the present invention are further improved.

(Hydrophobic Repeating Unit)

The resin A may contain a hydrophobic repeating unit that is different from the repeating unit having a graft chain (that is, does not correspond to the repeating unit having a graft chain). In the present specification, the hydrophobic repeating unit refers to a repeating unit having no acid group (for example, a carboxylic acid group, a sulfonic acid group, a phosphoric acid group, a phenolic hydroxyl group, and the like).

The hydrophobic repeating unit is preferably a repeating unit derived from (corresponding to) a compound (monomer) having a C log P value of 1.2 or more, and is more preferably a repeating unit derived from a compound having a C log P value of 1.2 to 8. In a case where this hydrophobic repeating unit is used, the effects of the present invention can be more reliably expressed.

The C log P value is a value calculated by a program "C LOG P" available from Daylight Chemical Information System, Inc. This program provides a value of "calculated log P" calculated by the fragment approach (see the following documents) of Hansch and Leo. The fragment approach is based on the chemical structure of a compound. In this method, the chemical structure is divided into partial structures (fragments), and degrees of contribution to log P that are assigned to the fragments are summed up, thereby estimating the log P value of the compound. Details of the method are described in the following documents. In the present specification, a C log P value calculated by a program C LOG P v 4.82 is used.

A. J. Leo, Comprehensive Medicinal Chemistry, Vol. 4, C. Hansch, P. G. Sammnens, J. B. Taylor and C. A. Ramsden, Eds., p. 295, Pergamon press, 1990, C. Hansch & A. J. Leo. Substituent Constants For Correlation Analysis in Chemistry and Biology. John Wiley & Sons. A. J. Leo. Calculating logPoct from structure. Chem. Rev., 93, 1281-1306, 1993.

log P means a common logarithm of a partition coefficient P. log P is a value of physical properties that shows how a certain organic compound is partitioned in an equilibrium of two-phase system consisting of oil (generally, 1-octanol) and water by using a quantitative numerical value. log P is represented by the following equation.

$$\log P = \log(C\mathrm{oil}/C\mathrm{water})$$

In the formula, Coil represents a molar concentration of a compound in an oil phase, and Cwater represents a molar concentration of the compound in a water phase.

The greater the positive log P value based on 0, the higher the oil solubility. The greater the absolute value of negative log P, the higher the water solubility. The value of log P is negatively correlated with the water solubility of an organic compound, and widely used as a parameter for estimating the hydrophilicity and hydrophobicity of an organic compound.

It is preferable that the resin A contain, as the hydrophobic repeating unit, one or more kinds of repeating units selected from repeating units derived from the monomers represented by the following Formulas (i) to (iii).

(i)

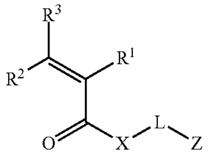

(ii)

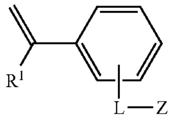

-continued (iii)

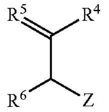

In the above Formulas (i) to (iii), $R^1$, $R^2$, and $R^3$ each independently represent a hydrogen atom, a halogen atom (for example, a fluorine atom, a chlorine atom, a bromine atom, or the like), or an alkyl group with a carbon number of 1 to 6 (for example, a methyl group, an ethyl group, a propyl group, or the like).

Each of $R^1$, $R^2$, and $R^3$ is preferably a hydrogen atom or an alkyl group with a carbon number of 1 to 3, and more preferably a hydrogen atom or a methyl group. Each of $R^2$ and $R^3$ is even more preferably a hydrogen atom.

X represents an oxygen atom (—O—) or an imino group (—NH—), and is preferably an oxygen atom.

L represents a single bond or a divalent linking group. Examples of the divalent linking group include a divalent aliphatic group (for example, an alkylene group, a substituted alkylene group, an alkenylene group, a substituted alkenylene group, an alkynylene group, or a substituted alkynylene group), a divalent aromatic group (for example, an arylene group or a substituted arylene group), a divalent heterocyclic group, an oxygen atom (—O—), a sulfur atom (—S—), an imino group (—NH—), a substituted imino group (—$NR^{31}$—, where $R^{31}$ is an aliphatic group, an aromatic group, or a heterocyclic group), a carbonyl group (—CO—), a combination of these, and the like.

The divalent aliphatic group may have a cyclic structure or a branched structure. The carbon number of the aliphatic group is preferably 1 to 20, more preferably 1 to 15, and even more preferably 1 to 10. The aliphatic group may be an unsaturated aliphatic group or a saturated aliphatic group, and is preferably a saturated aliphatic group. Furthermore, the aliphatic group may have a substituent. Examples of the substituent include a halogen atom, an aromatic group, a heterocyclic group, and the like.

The carbon number of the divalent aromatic group is preferably 6 to 20, more preferably 6 to 15, and even more preferably 6 to 10. Furthermore, the aromatic group may have a substituent. Examples of the substituent include a halogen atom, an aliphatic group, an aromatic group, a heterocyclic group, and the like.

It is preferable that the divalent heterocyclic group contain a 5-membered ring or a 6-membered ring as the heterocycle. Another heterocycle, aliphatic ring, or aromatic ring may be condensed with the heterocycle. Furthermore, the heterocyclic group may have a substituent. Examples of the substituent include a halogen atom, a hydroxyl group, an oxo group (=O), a thioxo group (=S), an imino group (=NH), a substituted imino group (=N—$R^{32}$, where $R^{32}$ is an aliphatic group, an aromatic group, or a heterocyclic group), an aliphatic group, an aromatic group, and a heterocyclic group.

L is preferably a single bond or a divalent linking group containing an alkylene group or an oxyalkylene structure. The oxyalkylene structure is more preferably an oxyethylene structure or an oxypropylene structure. Furthermore, L may contain a polyoxyalkylene structure containing two or more repeating oxyalkylene structures. As the polyoxyalkylene structure, a polyoxyethylene structure or a polyoxypropylene structure is preferable. The polyoxyethylene structure is represented by —$(OCH_2CH_2)n$-. n is preferably an integer of 2 or more, and more preferably an integer of 2 to 10.

Examples of Z include an aliphatic group (for example, an alkyl group, a substituted alkyl group, an unsaturated alkyl group, or a substituted unsaturated alkyl group), an aromatic group (for example, an aryl group, a substituted aryl group, an arylene group, or a substituted arylene group), a heterocyclic group, and a combination of these. These groups may contain an oxygen atom (—O—), a sulfur atom (—S—), an imino group (—NH—), a substituted imino group (—$NR^{31}$—, where $R^{31}$ is an aliphatic group, an aromatic group, or a heterocyclic group), or a carbonyl group (—CO—).

The aliphatic group may have a cyclic structure or a branched structure. The carbon number of the aliphatic group is preferably 1 to 20, more preferably 1 to 15, and even more preferably 1 to 10. The aliphatic group further contains a ring assembly hydrocarbon group and a crosslinked cyclic hydrocarbon group. Examples of the ring assembly hydrocarbon group include a bicyclohexyl group, a perhydronaphthalenyl group, a biphenyl group, a 4-cyclohexylphenyl group, and the like. Examples of a crosslinked cyclic hydrocarbon ring include a bicyclic hydrocarbon ring such as a pinane, bornane, norpinane, norbornane, or bicyclooctane ring (such as a bicyclo[2.2.2]octane ring or a bicyclo[3.2.1]octane ring), a tricyclic hydrocarbon ring such as a homobredane, adamantane, tricyclo[5.2.1.$0^{2,6}$]decane, or tricyclo[4.3.1.$1^{2,5}$]undecane ring, a tetracyclic hydrocarbon ring such as a tetracyclo[4.4.0.$1^{2,5}$.$1^{7,10}$]dodecane or perhydro-1,4-methano-5,8-methanonaphthalene ring, and the like. In addition, the crosslinked cyclic hydrocarbon ring also includes fused hydrocarbon rings, for example, fused rings consisting of a plurality of condensed 5- to 8-membered cycloalkane rings such as perhydronaphthalene (decalin), perhydroanthracene, perhydrophenanthrene, perhydroacenaphtene, perhydrofluorene, perhydroindene, and perhydrophenanthrene rings.

As the aliphatic group, a saturated aliphatic group is preferred over an unsaturated aliphatic group. Furthermore, the aliphatic group may have a substituent. Examples of the substituent thereof include a halogen atom, an aromatic group, and a heterocyclic group. Here, the aliphatic group does not have an acid group as a substituent.

The carbon number of the aromatic group is preferably 6 to 20, more preferably 6 to 15, and even more preferably 6 to 10. Furthermore, the aromatic group may have a substituent. Examples of the substituent include a halogen atom, an aliphatic group, an aromatic group, and a heterocyclic group. Here, the aromatic group does not have an acid group as a substituent.

It is preferable that the heterocyclic group contain a 5-membered ring or a 6-membered ring as the heterocycle. Another heterocycle, aliphatic ring, or aromatic ring may be condensed with the heterocycle. Furthermore, the heterocyclic group may have a substituent. Examples of the substituent include a halogen atom, a hydroxyl group, an oxo group (═O), a thioxo group (═S), an imino group (═NH), a substituted imino group (═N—$R^{32}$, where $R^{32}$ is an aliphatic group, an aromatic group, or a heterocyclic group), an aliphatic group, an aromatic group, and a heterocyclic group. Here, the heterocyclic group does not have an acid group as a substituent.

In the above Formula (iii), $R^4$, $R^5$, and $R^6$ each independently represent a hydrogen atom, a halogen atom (for example, a fluorine atom, a chlorine atom, a bromine atom, or the like), an alkyl group with a carbon number of 1 to 6 (for example, a methyl group, an ethyl group, a propyl group, or the like), Z, or L-Z. Here, L and Z have the same definition as the aforementioned groups represented by L and Z. Each of $R^4$, $R^5$, and $R^6$ is preferably a hydrogen atom or an alkyl group with a carbon number of 1 to 3, and more preferably a hydrogen atom.

As the monomer represented by the above Formula (i), a compound is preferably in which each of $R^1$, $R^2$, and $R^3$ is a hydrogen atom or a methyl group, L is a single bond or a divalent linking group containing an alkylene group or an oxyalkylene structure, X is an oxygen atom or an imino group, and Z is an aliphatic group, a heterocyclic group, or an aromatic group.

As the monomer represented by the above Formula (ii), a compound is preferable in which $R^1$ is a hydrogen atom or a methyl group, L is an alkylene group, and Z is an aliphatic group, a heterocyclic group, or an aromatic group. Furthermore, as the monomer represented by the above Formula (iii), a compound is preferable in which each of $R^4$, $R^5$, and $R^6$ is a hydrogen atom or a methyl group, and Z is an aliphatic group, a heterocyclic group, or an aromatic group.

Examples of typical compounds represented by Formulas (i) to (iii) include a radically polymerizable compound selected from acrylic acid esters, methacrylic acid esters, styrenes, and the like.

As examples of the typical compounds represented by Formulas (i) to (iii), the compounds described in paragraphs 0089 to 0093 of JP2013-249417A can be referred to, and what are described in the paragraphs are incorporated into the present specification.

In the resin A, the content of the hydrophobic repeating unit, expressed in terms of mass, with respect to the total mass of the resin A is preferably 10% to 90% by mass, and more preferably 20% to 80% by mass.

(Functional Group Capable of Interacting with Magnetic Particles)

The resin A may have a functional group capable of interacting with the magnetic particles.

It is preferable that the resin A further contain a repeating unit containing a functional group that is capable of interacting with the magnetic particles.

Examples of the functional group capable of interacting with the magnetic particles include an acid group, a basic group, a coordinating group, a reactive functional group, and the like.

In a case where the resin A contains an acid group, a basic group, a coordinating group, or a reactive functional group, it is preferable that the resin A contain a repeating unit containing an acid group, a repeating unit containing a basic group, a repeating unit containing a coordinating group, or a repeating unit having a reactive functional group.

The repeating unit containing an acid group may be a repeating unit that is the same as or different from the aforementioned repeating unit having a graft chain. However, the repeating unit containing an acid group is a repeating unit different from the aforementioned hydrophobic repeating unit (that is, does not correspond to the aforementioned hydrophobic repeating unit).

Examples of the acid group which is a functional group capable of interacting with the magnetic particles include a carboxylic acid group, a sulfonic acid group, a phosphoric acid group, a phenolic hydroxyl group, and the like. The acid group is preferably at least one kind of group among a carboxylic acid group, a sulfonic acid group, and a phosphoric acid group, and more preferably a carboxylic acid group. The carboxylic acid group has excellent adsorptive force with respect to the magnetic particles and has high dispersibility.

That is, it is preferable that the resin A further contain a repeating unit containing at least one kind of group among a carboxylic acid group, a sulfonic acid group, and a phosphoric acid group.

The resin A may have one kind of repeating unit containing an acid group or two or more kinds of such repeating units.

In a case where the resin A contains the repeating unit containing an acid group, the content of the repeating unit expressed in terms of mass with respect to the total mass of the resin A is preferably 5% to 80% by mass, and more preferably 10% to 60% by mass.

Examples of the basic group which is a functional group capable of interacting with the magnetic particles include a primary amino group, a secondary amino group, a tertiary amino group, a heterocycle containing a N atom, an amide group, and the like. As the basic group, in view of excellent adsorptive force with respect to the magnetic particles and high dispersibility, a tertiary amino group is preferable. The resin A may contain one kind of basic group described above or two or more kinds of basic groups described above.

In a case where the resin A contains the repeating unit containing a basic group, the content of the repeating unit expressed in terms of mass with respect to the total mass of the resin A is preferably 0.01% to 50% by mass, and more preferably 0.01% to 30% by mass.

Examples of the coordinating group and the reactive functional group which are functional groups capable of interacting with the magnetic particles include an acetylacetoxy group, a trialkoxysilyl group, an isocyanate group, an acid anhydride, an acid chloride, and the like. As these functional groups, in view of excellent adsorptive force with respect to the magnetic particles and high dispersibility of the magnetic particles, an acetylacetoxy group is preferable. The resin A may have one kind of these groups or two or more kinds of these groups.

In a case where the resin A contains the repeating unit containing a coordinating group or the repeating unit containing a reactive functional group, the content of the repeating unit expressed in terms of mass with respect to the total mass of the resin A is preferably 10% to 80% by mass, and more preferably 20% to 60% by mass.

In a case where the resin A contains, in addition to a graft chain, a functional group capable of interacting with the magnetic particles, the resin A may contain a functional group capable of interacting with various magnetic particles described above, and the way the functional group is introduced into the resin A is not particularly limited. For example, it is preferable that the resin to be incorporated into the composition contain one or more kinds of repeating units selected from repeating units derived from the monomers represented by the following Formulas (iv) to (vi).

(iv)

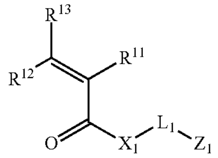

(v)

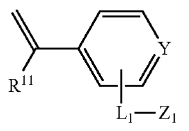

-continued (vi)

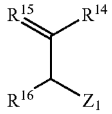

In Formulas (iv) to (vi), $R^{11}$, $R^{12}$, and $R^{13}$ each independently represent a hydrogen atom, a halogen atom (for example, a fluorine atom, a chlorine atom, a bromine atom, or the like), or an alkyl group with a carbon number of 1 to 6 (for example, a methyl group, an ethyl group, a propyl group, or the like).

In Formulas (iv) to (vi), each of $R^{11}$, $R^{12}$, and $R^{13}$ is preferably a hydrogen atom or an alkyl group with a carbon number of 1 to 3, and more preferably a hydrogen atom or a methyl group. Each of $R^{12}$ and $R^{13}$ in Formula (iv) is even more preferably a hydrogen atom.

$X_1$ in Formula (iv) represents an oxygen atom (—O—) or an imino group (—NH—), and is preferably an oxygen atom.

Y in Formula (v) represents a methine group or a nitrogen atom.

$L_1$ in Formulas (iv) to (v) represents a single bond or a divalent linking group. The divalent linking group has the same definition as the divalent linking group represented by L in Formula (i) described above.

$L_1$ is preferably a single bond or a divalent linking group containing an alkylene group or an oxyalkylene structure. The oxyalkylene structure is more preferably an oxyethylene structure or an oxypropylene structure. Furthermore, $L_1$ may contain a polyoxyalkylene structure including two or more repeating oxyalkylene structures. As the polyoxyalkylene structure, a polyoxyethylene structure or a polyoxypropylene structure is preferable. The polyoxyethylene structure is represented by $-(OCH_2CH_2)n-$. n is preferably an integer of 2 or more, and more preferably an integer of 2 to 10.

In Formulas (iv) to (vi), $Z_1$ represents a functional group that is capable of interacting with the magnetic particles as well in addition to the graft chain. $Z_1$ is preferably a carboxylic acid group or a tertiary amino group, and more preferably a carboxylic acid group.

In Formula (vi), $R^{14}$, $R^{15}$, and $R^{16}$ each independently represent a hydrogen atom, a halogen atom (for example, a fluorine atom, a chlorine atom, a bromine atom, or the like), an alkyl group with a carbon number of 1 to 6 (for example, a methyl group, an ethyl group, a propyl group, or the like), $-Z_1$, or $L_1$-$Z_1$. Here, $L_1$ and $Z_1$ have the same definitions as $L_1$ and $Z_1$ described above, and preferable examples thereof are also the same. Each of $R^{14}$, $R^{15}$, and $R^{16}$ is preferably a hydrogen atom or an alkyl group with a carbon number of 1 to 3, and more preferably a hydrogen atom.

As the monomer represented by Formula (iv), a compound is preferable in which $R^{11}$, $R^{12}$ and $R^{13}$ each independently represent a hydrogen atom or a methyl group, $L_1$ is a divalent linking group containing an alkylene group or an oxyalkylene structure, $X_1$ is an oxygen atom or an imino group, and $Z_1$ is a carboxylic acid group.

As the monomer represented by Formula (v), a compound is preferable in which $R^{11}$ is a hydrogen atom or a methyl group, $L_1$ is an alkylene group, $Z_1$ is a carboxylic acid group, and Y is a methine group.

Furthermore, as the monomer represented by Formula (vi), a compound is preferable in which $R^{14}$, $R^{15}$, and $R^{16}$ each independently represent a hydrogen atom or a methyl group, and $Z_1$ is a carboxylic acid group.

Typical examples of the monomers (compounds) represented by Formulas (iv) to (vi) will be shown below.

Examples of the monomers include methacrylic acid, crotonic acid, isocrotonic acid, a reactant of a compound containing an addition-polymerizable double bond and a hydroxyl group in a molecule (for example, 2-hydroxyethyl methacrylate) and a succinic anhydride, a reactant of a compound containing an addition-polymerizable double bond and a hydroxyl group in a molecule and a phthalic anhydride, a reactant of a compound containing an addition-polymerizable double bond and a hydroxyl group in a molecule and a tetrahydroxyphthalic anhydride, a reactant of a compound containing an addition-polymerizable double bond and a hydroxyl group in a molecule and a trimellitic anhydride, a reactant of a compound containing an addition-polymerizable double bond and a hydroxyl group in a molecule and a pyromellitic anhydride, acrylic acid, an acrylic acid dimer, an acrylic acid oligomer, maleic acid, itaconic acid, fumaric acid, 4-vinylbenzoic acid, vinylphenol, 4-hydroxyphenyl methacrylamide, and the like.

In view of interaction with the magnetic particles, temporal stability, and permeability with respect to a developer, the content of the repeating unit containing a functional group capable of interacting with the magnetic particles, the content being expressed in terms of mass, with respect to the total mass of the resin A is preferably 0.05% to 90% by mass, more preferably 1.0% to 80% by mass, and even more preferably 10% to 70% by mass.

(Ethylenically Unsaturated Group)

The resin A may contain an ethylenically unsaturated group.

The ethylenically unsaturated group is not particularly limited, and examples thereof include a (meth)acryloyl group, a vinyl group, a styryl group, and the like. Among these, a (meth)acryloyl group is preferable.

Particularly, the resin A preferably contains a repeating unit that contains an ethylenically unsaturated group on a side chain, and more preferably contains a repeating unit that contains an ethylenically unsaturated group on a side chain and is derived from (meth)acrylate (hereinafter, such a repeating unit will be also called "(meth)acrylic repeating unit containing an ethylenically unsaturated group on a side chain").

The (meth)acrylic repeating unit containing an ethylenically unsaturated group on a side chain is obtained, for example, by causing an addition reaction between a carboxylic acid group in the resin A containing a (meth)acrylic repeating unit containing the carboxylic acid group and an ethylenically unsaturated compound containing a glycidyl group or an alicyclic epoxy group. Reacting the ethylenically unsaturated group (a glycidyl group or an alicyclic epoxy group) introduced in this way makes it possible to obtain a (meth)acrylic repeating unit containing an ethylenically unsaturated group on a side chain.

In a case where the resin A contains the repeating unit containing an ethylenically unsaturated group, the content of the repeating unit expressed in terms of mass with respect to the total mass of the resin A is preferably 30% to 70% by mass, and more preferably 40% to 60% by mass.

(Other Curable Groups)

The resin A may contain other curable groups in addition to the ethylenically unsaturated group.

Examples of those other curable groups include an epoxy group and an oxetanyl group.

Particularly, the resin A preferably contains a repeating unit that contains those other curable groups on a side chain, and more preferably contains a repeating unit that contains those other curable groups on a side chain and is derived from (meth)acrylate (hereinafter, such a repeating unit will be also called "(meth)acrylic repeating unit containing other curable groups on a side chain").

Examples of the (meth)acrylic repeating unit containing other curable groups on a side chain include glycidyl (meth) acrylate.

In a case where the resin A contains the repeating unit containing other curable groups, the content of the repeating unit expressed in terms of mass with respect to the total mass of the resin A is preferably 5% to 50% by mass, and more preferably 10% to 30% by mass.

(Other Repeating Units)

For the purpose of improving various performances such as film forming performance, as long as the effects of the present invention are not impaired, the resin A may further have other repeating units having various functions different from the repeating unit described above.

Examples of those other repeating units include repeating units derived from radically polymerizable compounds selected from acrylonitriles, methacrylonitriles, and the like.

For the resin A, one kind of those other repeating units or two or more kinds of those other repeating units can be used. The content of those other repeating units expressed in terms of mass with respect to the total mass of the resin A is preferably 0% to 80% by mass, and more preferably 10% to 60% by mass.

(Physical Properties of Resin A)

The acid value of the resin A is not particularly limited. For example, the acid value is preferably 0 to 400 mgKOH/g, more preferably 10 to 350 mgKOH/g, even more preferably 30 to 300 mgKOH/g, and particularly preferably in a range of 50 to 200 mgKOH/g.

In a case where the acid value of the resin A is 50 mgKOH/g or more, the sedimentation stability of the magnetic particles can be further improved.

In the present specification, the acid value can be calculated, for example, from the average content of acid groups in a compound. Furthermore, changing the content of the repeating unit containing an acid group in the resin makes it possible to obtain a resin having a desired acid value.

The weight-average molecular weight of the resin A is not particularly limited. For example, the weight-average molecular weight is preferably 3,000 or more, more preferably 4,000 or more, even more preferably 5,000 or more, and particularly preferably 6,000 or more. The upper limit of the weight-average molecular weight is, for example, preferably 300,000 or less, more preferably 200,000 or less, even more preferably 100,000 or less, and particularly preferably 50,000 or less.

The resin A can be synthesized based on a known method.

For specific examples of the resin A, the polymer compounds described in paragraphs 0127 to 0129 of JP2013-249417A can be referred to, and what are described in the paragraphs are incorporated into the present specification.

As the resin A, the graft copolymers in paragraphs 0037 to 0115 of JP2010-106268A (paragraphs 0075 to 0133 of US2011/0124824 corresponding to JP2010-106268A) can also be used, and what are described in the paragraphs can be cited and incorporated into the present specification.

<Alkali-Soluble Resin>

Those other resins may include an alkali-soluble resin.

In the present specification, the alkali-soluble resin means a resin that contains a group (alkali-soluble group, for example, an acid group such as a carboxylic acid group) enhancing alkali solubility and is different from the resin A described above.

Examples of the alkali-soluble resin include a resin containing at least one alkali-soluble group in a molecule. Examples thereof include a polyhydroxystyrene resin, a polysiloxane resin, a (meth)acrylic resin, a (meth)acrylamide resin, a (meth)acrylic/(meth)acrylamide copolymer, an epoxy resin, a polyimide resin, and the like.

Specific examples of the alkali-soluble resin include a copolymer of an unsaturated carboxylic acid and an ethylenically unsaturated compound.

The unsaturated carboxylic acid is not particularly limited, and examples thereof include monocarboxylic acid such as (meth)acrylic acid, crotonic acid, and vinylacetic acid; dicarboxylic acids such as itaconic acid, maleic acid, and fumaric acid or anhydrides of these acids; polyvalent carboxylic acid monoesters such as mono(2-(meth)acryloyloxyethyl)phthalate; and the like.

Examples of copolymerizable ethylenically unsaturated compounds include methyl (meth)acrylate and the like. Furthermore, the compounds described in paragraphs 0027 of JP2010-97210A and paragraphs 0036 and 0037 of JP2015-68893A can also be used, and what are described in the above paragraphs are incorporated into the present specification.

Furthermore, a compound that is a copolymerizable ethylenically unsaturated compound and contains an ethylenically unsaturated group on a side chain may also be used in combination. That is, the alkali-soluble resin may contain a repeating unit containing an ethylenically unsaturated group on a side chain.

As the ethylenically unsaturated group contained on a side chain, a (meth)acrylic acid group is preferable.

The repeating unit containing an ethylenically unsaturated group on a side chain is obtained, for example, by causing an addition reaction between a carboxylic acid group of a (meth)acrylic repeating unit containing the carboxylic acid group and an ethylenically unsaturated compound containing a glycidyl group or an alicyclic epoxy group.

As the alkali-soluble resin, an alkali-soluble resin containing a curable group is also preferable.

Examples of the curable group include an ethylenically unsaturated group (for example, a (meth)acryloyl group, a vinyl group, a styryl group, or the like), a cyclic ether group (for example, an epoxy group, an oxetanyl group, or the like), and the like. However, the curable group is not limited to these.

As the curable group, among these, in view of making it possible to control polymerization by a radical reaction, an ethylenically unsaturated group is preferable, and a (meth) acryloyl group is more preferable.

As the alkali-soluble resin containing a curable group, an alkali-soluble resin having a curable group on a side chain or the like is preferable. Examples of the alkali-soluble resin containing a curable group include DIANAL NR series (manufactured by MITSUBISHI RAYON CO., LTD.), Photomer 6173 (COOH-containing polyurethane acrylic oligomer, manufactured by Diamond Shamrock Co., Ltd.), VISCOAT R-264 and KS Resist 106 (all are manufactured by OSAKA ORGANIC CHEMICAL INDUSTRY LTD.), CYCLOMER P series (for example, ACA230AA) and PLACCEL CF200 series (all are manufactured by Daicel Corporation), Ebecryl 3800 (manufactured by DAICEL-ALLNEX LTD.), and ACRYCURE RD-F8 (manufactured by NIPPON SHOKUBAI CO., LTD.), and the like.

As the alkali-soluble resin, for example, it is possible to use a radical polymer containing a carboxylic acid group on a side chain described in JP1984-44615A (JP-S59-44615A), JP1979-34327B (JP-S54-34327AB), JP1983-12577B (JP-S58-12577B), JP1979-25957B (JP-S54-25957B), JP1979-92723B (JP-S54-92723B), JP1984-53836A (JP-S59-53836A), and JP1984-71048A (JP-S59-71048A); an acetal-modified polyvinyl alcohol-based binder resin containing an alkali-soluble group described in EP993966B, EP1204000B, and JP2001-318463A; polyvinylpyrrolidone; polyethylene oxide; alcohol-soluble nylon, polyether as a reactant of 2,2-bis-(4-hydroxyphenyl)-propane and epichlorohydrin, and the like; the polyimide resin described WO2008/123097A; and the like.

As the alkali-soluble resin, for example, the compounds described in paragraphs 0225 to 0245 of JP2016-75845A can also be used, and what are described in the above paragraphs are incorporated into the present specification.

As the alkali-soluble resin, a polyimide precursor can also be used. The polyimide precursor means a resin obtained by causing an addition polymerization reaction between a compound containing an acid anhydride group and a diamine compound at 40° C. to 100° C.

Specific examples of the polyimide precursor include the compounds described in paragraphs 0011 to 0031 of JP2008-106250A, the compounds described in paragraphs 0022 to 0039 of JP2016-122101A, the compounds described in paragraphs 0061 to 0092 of JP2016-68401A, the resins described in paragraph 0050 of JP2014-137523A, the resins described in paragraph 0058 of JP2015-187676A, the resins described in paragraphs 0012 and 0013 of JP2014-106326A, and the like. What are described in the above paragraphs are incorporated into the present specification.

As the alkali-soluble resin, a [benzyl (meth)acrylate/(meth)acrylic acid/other addition-polymerizable vinyl monomers used if necessary] copolymer and an [allyl(meth) acrylate/(meth)acrylic acid/other addition-polymerizable vinyl monomers used if necessary] copolymer are suitable because these make film hardness, sensitivity, and developability well balanced.

One kind of the aforementioned other addition-polymerizable vinyl monomers may be used alone, or two or more kinds of such monomers may be used in combination.

In view of further improving moisture resistance of a cured film, the aforementioned copolymers preferably have a curable group, and more preferably have an ethylenically unsaturated group such as a (meth)acryloyl group.

For example, monomers have a curable group may be used as the aforementioned other addition-polymerizable vinyl monomers so that the curable group is introduced into the copolymers. In addition, a curable group (preferably an ethylenically unsaturated group such as a (meth)acryloyl group) may be introduced into some or all of one or more kinds of units derived from (meth)acrylic acid and/or one or more kinds of units derived from the aforementioned other addition-polymerizable vinyl monomers in the copolymers.

Examples of the aforementioned other addition-polymerizable vinyl monomers include methyl (meth)acrylate, a styrene-based monomer (such as hydroxystyrene), and an ether dimer.

Examples of the ether dimer include a compound represented by the following General Formula (ED1) and a compound represented by the following General Formula (ED2).

(ED1)

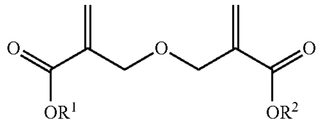

In General Formula (ED1), $R^1$ and $R^2$ each independently represent a hydrogen atom or a hydrocarbon group with a carbon number of 1 to 25.

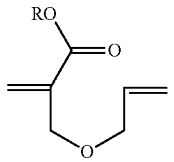

(ED2)

In General Formula (ED2), R represents a hydrogen atom or an organic group with a carbon number of 1 to 30. For specific examples of General Formula (ED2), the description of JP2010-168539A can be referred to.

For specific examples of the ether dimer, for example, paragraph 0317 of JP2013-29760A can be referred to, and what are described in the paragraph are incorporated into the present specification. Only one kind of ether dimer may be used alone, or two or more kinds of ether dimers may be used.

The acid value of the alkali-soluble resin is not particularly limited. Generally, the acid value is preferably 30 to 500 mgKOH/g, and more preferably 50 to 200 mgKOH/g or more.

In a case where the composition contains an alkali-soluble resin, the content of the alkali-soluble resin with respect to the total mass of the composition is preferably 0.1% to 40% by mass, more preferably 0.5% to 30% by mass, and even more preferably 1% to 20% by mass.

In a case where the composition contains an alkali-soluble resin, the content of the alkali-soluble resin with respect to the total solid content of the composition is preferably 0.1% to 40% by mass, more preferably 0.5% to 30% by mass, and even more preferably 1% to 20% by mass.

[Polymerizable Compound]

The composition according to the embodiment of the present invention may contain a polymerizable compound as a component different from the components described above.

The content of the polymerizable compound with respect to the total mass of the composition is preferably 1% to 35% by mass, more preferably 1% to 30% by mass, and even more preferably 3% to 27% by mass.

The content of the polymerizable compound with respect to the total solid content of the composition is preferably 1% to 35% by mass, more preferably 1% to 30% by mass, and even more preferably 3% to 27% by mass.

The molecular weight (or weight-average molecular weight) of the polymerizable compound is not particularly limited, but is preferably 2,000 or less.

<Compound Containing Group Containing Ethylenically Unsaturated Bond>

Examples of the polymerizable compound include a compound containing a group containing an ethylenically unsaturated bond (hereinafter, also simply called "ethylenically unsaturated group").

That is, it is preferable that the composition according to the embodiment of the present invention contain, as a polymerizable compound, a low-molecular-weight compound containing an ethylenically unsaturated group.

The polymerizable compound is preferably a compound containing one or more ethylenically unsaturated bonds, more preferably a compound containing two or more ethylenically unsaturated bonds, even more preferably a compound containing three or more ethylenically unsaturated bonds, and particularly preferably a compound containing five or more ethylenically unsaturated bonds. The upper limit of the number of ethylenically unsaturated bonds is, for example, 15 or less. Examples of the ethylenically unsaturated group include a vinyl group, a (meth)allyl group, a (meth)acryloyl group, and the like.

As the polymerizable compound, for example, it is possible to use the compounds described in paragraph 0050 of JP2008-260927A and paragraph 0040 of JP2015-68893A, and what are described in the paragraphs are incorporated into the present specification.

The polymerizable compound may be in any chemical form such as a monomer, a prepolymer, an oligomer, a mixture of these, and a multimer of these.

The polymerizable compound is preferably a (meth)acrylate compound having 3 to 15 functional groups, and more preferably a (meth)acrylate compound having 3 to 6 functional groups.

As the polymerizable compound, a compound that contains one or more ethylenically unsaturated groups and has a boiling point of 100° C. or higher under normal pressure is also preferable. For example, the compounds described in paragraph 0227 of JP2013-29760A and paragraph 0254 to 0257 of JP2008-292970A can be referred to, and what are described in the paragraphs are incorporated into the present specification.

As the polymerizable compound, dipentaerythritol triacrylate (KAYARAD D-330 as a commercially available product; manufactured by Nippon Kayaku Co., Ltd.), dipentaerythritol tetraacrylate (KAYARAD D-320 as a commercially available product; manufactured by Nippon Kayaku Co., Ltd.), dipentaerythritol penta(meth)acrylate (KAYARAD D-310 as a commercially available product; manufactured by Nippon Kayaku Co., Ltd.), dipentaerythritol hexa(meth)acrylate (KAYARAD DPHA as a commercially available product; manufactured by Nippon Kayaku Co., Ltd., A-DPH-12E; manufactured by SHIN-NAKAMURA CHEMICAL CO, LTD.), and the structure in which these (meth)acryloyl groups are mediated by an ethylene glycol residue or a propylene glycol residue (for example, SR454 and SR499 commercially available from Sartomer Company Inc.) are preferable. These compounds in oligomer types can also be used. Furthermore, NK ESTER A-TMMT (pentaerythritol tetraacrylate, manufactured by SHIN-NAKAMURA CHEMICAL CO, LTD.), KAYARAD RP-1040, KAYARAD DPEA-12LT, KAYARAD DPHA LT, KAYARAD RP-3060, and KAYARAD DPEA-12 (all are trade names, manufactured by Nippon Kayaku Co., Ltd.), and the like may also be used.

The polymerizable compound may have an acid group such as a carboxylic acid group, a sulfonic acid group, or a phosphoric acid group. The polymerizable compound containing an acid group is preferably an ester of an aliphatic polyhydroxy compound and an unsaturated carboxylic acid, more preferably a polymerizable compound obtained by reacting an unreacted hydroxyl group of an aliphatic polyhydroxy compound with a non-aromatic carboxylic anhydride so that an acid group is added, and even more preferably an ester of the aforementioned polymerizable compound having pentaerythritol and/or dipentaerythritol as the aliphatic polyhydroxy compound. Examples of commercially available products thereof include ARONIX TO-2349, M-305, M-510, and M-520 manufactured by TOAGOSEI CO., LTD., and the like.

The acid value of the polymerizable compound containing an acid group is preferably 0.1 to 40 mgKOH/g, and more preferably 5 to 30 mgKOH/g. In a case where the acid value of the polymerizable compound is 0.1 mgKOH/g or more, development and dissolution characteristics are excellent. In case where the acid value is 40 mgKOH/g or less, this is advantageous in terms of manufacturing and/or handling. Furthermore, excellent photopolymerization performance and excellent curing properties are obtained.

As the polymerizable compound, a compound containing a caprolactone structure is also a preferable aspect.

The compound containing a caprolactone structure is not particularly limited as long as the compound contains the caprolactone structure in a molecule. Examples thereof include ε-caprolactone-modified polyfunctional (meth)acrylate obtained by esterifying a polyhydric alcohol, such as trimethylolethane, ditrimethylolethane, trimethylolpropane, ditrimethylolpropane, pentaerythritol, dipentaerythritol, tripentaerythritol, glycerin, diglycerol, or trimethylol melamine, (meth)acrylic acid, and ε-caprolactone. Among these, a compound containing a caprolactone structure represented by the following Formula (Z-1) is preferable.

(Z-1)

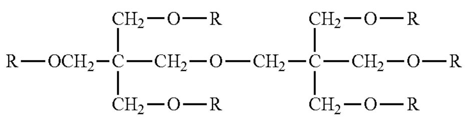

In Formula (Z-1), all six Rs are groups represented by the following Formula (Z-2), or one to five out of six Rs are groups represented by the following Formula (Z-2) and others are groups represented by the following Formula (Z-3).

(Z-2)

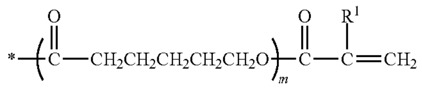

In Formula (Z-2), $R^1$ represents a hydrogen atom or a methyl group, m represents a number of 1 or 2, and "*" represents a bonding site.

(Z-3)

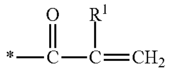

In Formula (Z-3), $R^1$ represents a hydrogen atom or a methyl group, and "*" represents a bonding site.

The polymerizable compound containing a caprolactone structure is commercially available from Nippon Kayaku Co., Ltd., for example, as KAYARAD DPCA series. Examples thereof include DPCA-20 (compound where m in the above Formulas (Z-1) to (Z-3) is 1, the number of groups represented by Formula (Z-2) is 2, and $R^1$'s all represent a hydrogen atom), DPCA-30 (compound where m in the above Formulas (Z-1) to (Z-3) is 1, the number of groups represented by Formula (Z-2) is 3, and $R^1$'s all represent a hydrogen atom), DPCA-60 (compound where m in the above Formulas (Z-1) to (Z-3) is 1, the number of groups represented by Formula (Z-2) is 6, and $R^1$'s all represent a hydrogen atom), DPCA-120 (compound where m in the above Formulas (Z-1) to (Z-3) is 2, the number of groups represented by Formula (Z-2) is 6, and $R^1$'s all represent a hydrogen atom), and the like. Furthermore, examples of commercially available products of the polymerizable compound containing a caprolactone structure include M-350 (trade name) (trimethylolpropane triacrylate) manufactured by TOAGOSEI CO., LTD.

As the polymerizable compound, a compound represented by the following Formula (Z-4) or (Z-5) can also be used.

(Z-4)

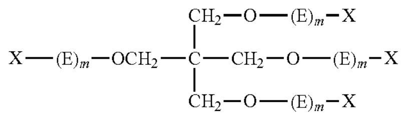

(Z-5)

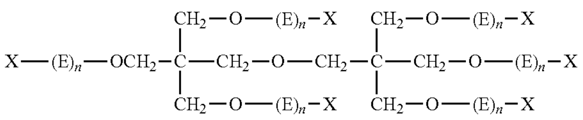

In Formulas (Z-4) and (Z-5), E represents-$((CH_2)_yCH_2O)$— or $((CH_2)_yCH(CH_3)O)$—, y represents an integer of 0 to 10, and X represents a (meth)acryloyl group, a hydrogen atom, or a carboxylic acid group.

In Formula (Z-4), the total number of (meth)acryloyl groups is 3 or 4, m represents an integer of 0 to 10, and the total of m's is an integer of 0 to 40.

In Formula (Z-5), the total number of (meth)acryloyl groups is 5 or 6, n represents an integer of 0 to 10, and the total of n's is an integer of 0 to 60.

In Formula (Z-4), m is preferably an integer of 0 to 6, and more preferably an integer of 0 to 4.

The total of m's is preferably an integer of 2 to 40, more preferably an integer of 2 to 16, and even more preferably an integer of 4 to 8.

In Formula (Z-5), n is preferably an integer of 0 to 6, and more preferably an integer of 0 to 4.

The total of n's is preferably an integer of 3 to 60, more preferably an integer of 3 to 24, and even more preferably an integer of 6 to 12.

In addition, as for —$((CH_2)_yCH_2O)$— or $((CH_2)_yCH(CH_3)O)$— in Formula (Z-4) or Formula (Z-5), it is preferable that the terminal on the oxygen atom side be bonded to X.

One kind of compound represented by Formula (Z-4) or Formula (Z-5) may be used alone, or two or more kinds of such compounds may be used in combination. Especially, it is preferable to employ an aspect in which all of six Xs in Formula (Z-5) represent an acryloyl group or an aspect in which a compound represented by Formula (Z-5) where all of six Xs represent an acryloyl group and a compound represented by Formula (Z-5) where at least one of six Xs represents a hydrogen atom form a mixture. This constitution can further improve developability.

The total content of the compound represented by Formula (Z-4) or Formula (Z-5) in the polymerizable compound is preferably 20% by mass or more, and more preferably 50% by mass or more.

Among the compounds represented by Formula (Z-4) or Formula (Z-5), either or both of a pentaerythritol derivative and a dipentaerythritol derivative are more preferable.

The polymerizable compound may contain a cardo skeleton.

As the polymerizable compound containing a cardo skeleton, a polymerizable compound containing a 9,9-bisarylfluorene skeleton is preferable.

Examples of the polymerizable compound containing a cardo skeleton include, but are not limited to, ONCOAT EX series (manufactured by NAGASE & CO., LTD.), OGSOL (manufactured by Osaka Gas Chemicals Co., Ltd.), and the like.

As the polymerizable compound, a compound containing an isocyanuric acid skeleton as a core is also preferable. Examples of such a polymerizable compound include NK ESTER A-9300 (manufactured by SHIN-NAKAMURA CHEMICAL CO, LTD.).

The content of ethylenically unsaturated groups in the polymerizable compound (the content means a value obtained by dividing the number of ethylenically unsaturated groups in the polymerizable compound by the molecular weight (g/mol) of the polymerizable compound) is preferably 5.0 mmol/g or more. The upper limit of the content is not particularly limited, but is generally 20.0 mmol/g or less.

<Compound Having Epoxy Group and/or Oxetanyl Group>

The polymerizable compound is also preferably a compound having an epoxy group and/or an oxetanyl group.

The polymerizable compound preferably has one or more epoxy groups and/or oxetanyl groups, and more preferably 2 to 10 epoxy groups and/or oxetanyl groups.

Particularly, the polymerizable compound is more preferably curable epoxy compound having an epoxy group (epoxy compound).

In the polymerizable compound, the epoxy group and/or oxetanyl group (preferably epoxy group) may be fused with a cyclic group (such as an alicyclic group). The cyclic group fused with an epoxy group and/or an oxetanyl group preferably has a carbon number of 5 to 15. In addition, in the above cyclic group, the portion other than the fused epoxy group and/or oxetanyl group may be monocyclic or polycyclic. One cyclic group may be fused with only one epoxy group or oxetanyl group, or may be fused with two or more epoxy groups and/or oxetanyl groups.

Examples of such a polymerizable compound include a monofunctional or polyfunctional glycidyl ether compound.

The polymerizable compound may be, for example, (poly)alkylene glycol diglycidyl ether.

The polymerizable compound may be a compound containing a caprolactone structure represented by Formula (Z-1) described above in which the group represented by Formula (Z-2) is changed to the following Formula (Z-2E) and the group represented by Formula (Z-3) is changed to a group represented by Formula (Z-3E).

(Z-2E)

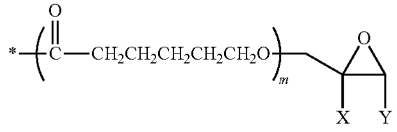

(Z-3E)

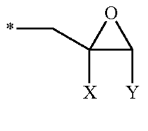

In Formula (Z-2E), m represents the number 1 or 2, X and Y each independently represent a hydrogen atom or a substituent (preferably an alkyl group preferably having a carbon number of 1 to 3), and "*" represents a bonding site.

In Formula (Z-3E), X and Y each independently represent a hydrogen atom or a substituent (preferably an alkyl group preferably having a carbon number of 1 to 3), and represents a bonding site.

The polymerizable compound may be a compound represented by Formula (Z-4) described above in which X is changed to represent a group represented by Formula (Z-3E) or a hydrogen atom.

In Formula (Z-4) modified in this way, the total number of groups represented by formula (Z-3E) is 2 to 4.

The polymerizable compound may be a compound represented by Formula (Z-5) described above in which X is changed to represent a group represented by Formula (Z-3E) or a hydrogen atom.

In Formula (Z-5) modified in this way, the total number of groups represented by Formula (Z-3E) is 2 to 6 (preferably 5 or 6).

The polymerizable compound may be a compound having a structure to which N pieces of cyclic groups fused with an epoxy group and/or an oxetanyl group are bonded via a linking group.

N is an integer of 2 or more, preferably an integer of 2 to 6, and more preferably 2. In the linking group, the total number of atoms other than hydrogen atoms is preferably 1 to 20 and more preferably 2 to 6. In a case where N is 2, examples of the linking group include an alkyleneoxycarbonyl group.

Examples of commercially available products of the polymerizable compound include polyfunctional aliphatic glycidyl ether compounds such as DENACOL EX-212L, EX-214L, EX-216L, EX-321L, and EX-850L (all are manufactured by Nagase ChemteX Corporation.) Although these are low-chlorine products, EX-212, EX-214, EX-216, EX-321, EX-614, EX-850, and the like that are not low-chlorine products can also be used.

Furthermore, as a commercially available product, CELLOXIDE 2021P (manufactured by Daicel Corporation, a polyfunctional epoxy monomer) can also be used.

The composition may contain, as polymerizable compounds, both the compound containing a group containing an ethylenically unsaturated bond and a compound having an epoxy group and/or an oxetanyl group. In this case, the mass ratio of the contents thereof (content of "compound containing a group containing an ethylenically unsaturated bond"/content of "compound having an epoxy group and/or an oxetanyl group") is preferably 10/90 to 90/10, more preferably 20/80 to 80/20, and even more preferably 30/70 to 70/30.

[Curing Accelerator]

The composition may contain a curing accelerator.

Particularly, in a case where the composition contains a compound having an epoxy group and/or an oxetanyl group as a polymerizable compound, it is preferable that the composition contain a curing accelerator.

Examples of the curing accelerator include triphenylphosphine, methyltributylphosphonium dimethylphosphate, trisorthotolylphosphine, and a boron trifluoride amine complex. Examples of the curing accelerator also include imidazole-based curing accelerators such as 2-methylimidazole (trade name; 2MZ), 2-undecylimidazole (trade name; C11-Z), 2-heptadecylimidazole (trade name; C17Z), 1,2-dimethylimidazole (trade name; 1.2 DMZ), 2-ethyl-4-methylimidazole (trade name; 2E4MZ), 2-phenylimidazole (trade name; 2PZ), 2-phenyl-4-methylimidazole (trade name; 2P4MZ), 1-benzyl-2-methylimidazole (trade name; 1B2MZ), 1-benzyl-2-phenylimidazole (trade name; 1B2PZ), 1-cyanoethyl-2-methylimidazole (trade name; 2MZ-CN), 1-cyanoethyl-2-undecylimidazole (trade name; C11Z-CN), 1-cyanoethyl-2-phenylimidazolium trimellitate (trade name; 2PZCNS-PW), 2,4-diamino-6-[2'-methylimidazolyl-(1')]-ethyl-s-triazine (trade name; 2MZ-A), 2,4-diamino-6-[2'-undecylimidazolyl-(1')]-ethyl-s-triazine (trade name; C11Z-A), 2,4-diamino-6-[2'-ethyl-4'-methylimidazolyl-(1')]-ethyl-s-triazine (trade name; 2E4MZ-A), 2,4-diamino-6-[2'-methylimidazolyl-(1')]-ethyl-s-triazine isocyanuric acid adduct (trade name; 2MA-OK), 2-phenyl-4,5-dihydroxymethylimidazole (trade name; 2PHZ-PW), 2-phenyl-4-methyl-5-hydroxymethylimidazole (trade name; 2P4MHZ-PW), 1-cyanoethyl-2-phenylimidazole (trade name; 2PZ-CN), 2,4-diamino-6-[2'-methylimidazolyl-(1')]-ethyl-s-triazine (trade name; 2MZA-PW), and 2,4-diamino-6-[2'-methylimidazolyl-(1')]-ethyl-s-triazine isocyanuric acid adduct (trade name: 2MAOK-PW) (all manufactured by SHIKOKU CHEMICALS CORPORATION.) Examples of triarylphosphine-based curing accelerators also include the compounds described in paragraph 0052 of JP2004-43405A. Examples of the phosphorus-based curing accelerators in which triphenylborane is added to triarylphosphine include the compounds described in paragraph 0024 of JP2014-5382A.

The content of the curing accelerator with respect to the total mass of the composition is preferably 0.0002% to 3% by mass, more preferably 0.002% to 2% by mass, and even more preferably 0.02% to 1% by mass.

The content of the curing accelerator with respect to the total solid content of the composition is preferably 0.0002% to 3% by mass, more preferably 0.002% to 2% by mass, and even more preferably 0.02% to 1% by mass.

[Polymerization Initiator]

The composition may contain a polymerization initiator.

As the polymerization initiator, known polymerization initiators can be used without particular limitation. Examples of the polymerization initiator include a photopolymerization initiator, a thermal polymerization initiator, and the like. Among these, a photopolymerization initiator is preferable. As the polymerization initiator, a so-called radical polymerization initiator is preferable.

In a case where the composition contains a polymerization initiator, the content of the polymerization initiator with respect to the total mass of the composition is preferably 0.5% to 15% by mass, more preferably 1.0% to 10% by mass, and even more preferably 1.5% to 8.0% by mass.

In a case where the composition contains a polymerization initiator, the content of the polymerization initiator with respect to the total solid content of the composition is preferably 0.5% to 15% by mass, more preferably 1.0% to 10% by mass, and even more preferably 1.5% to 8.0% by mass.

<Thermal Polymerization Initiator>

Examples of the thermal polymerization initiator include azo compounds such as 2,2'-azobisisobutyronitrile (AIBN), 3-carboxypropionitrile, azobismalenonitrile, and dimethyl-(2,2')-azobis(2-methylpropionate) [V-601] and organic peroxides such as benzoyl peroxide, lauroyl peroxide, and potassium persulfate.

Specific examples of the polymerization initiator include the polymerization initiators described on pages 65 to 148 of "Ultraviolet Curing System" by Kiyomi Kato (published by GL Sciences Inc.: 1989), and the like.

<Photopolymerization Initiator>

The photopolymerization initiator is not particularly limited as long as it can initiate the polymerization of the polymerizable compound. As the photopolymerization initiator, known photopolymerization initiators can be used. As the photopolymerization initiator, for example, a photopolymerization initiator sensitive to light ranging from an ultraviolet region to a visible light region is preferable. Furthermore, the photopolymerization initiator may be an activator that brings a certain action together with a photo-excited sensitizer and generates active radicals or an initiator that initiates cationic polymerization according to the type of polymerizable compound.

In addition, it is preferable that the photopolymerization initiator contain at least one kind of compound having molar absorption coefficient of at least 50 in a range of 300 to 800 nm (more preferably 330 to 500 nm).

Examples of the photopolymerization initiator include halogenated hydrocarbon derivatives (for example, a compound containing a triazine skeleton, a compound containing an oxadiazole skeleton, and the like), acylphosphine compounds such as acylphosphine oxide, hexaarylbiimidazole, oxime compounds such as oxime derivatives, organic peroxides, thio compounds, ketone compounds, aromatic onium salts, aminoacetophenone compounds, hydroxyacetophenone, and the like.

For specific examples of the photopolymerization initiator, for example, paragraphs 0265 to 0268 of JP2013-29760A can be referred to, and what are described in the paragraphs are incorporated into the present specification.

More specifically, as the photopolymerization initiator, for example, the aminoacetophenone-based initiator described in JP1998-291969A (JP-H10-291969A) and the acylphosphine-based initiator described in JP4225898B can also be used.

As hydroxyacetophenone compounds, for example, Omnirad-184, Omnirad-1173, Omnirad-500, Omnirad-2959, and Omnirad-127 (trade names, all manufactured by IGM Resins B.V.) can be used.

As aminoacetophenone compounds, for example, commercially available products, Omnirad-907, Omnirad-369, and Omnirad-379EG (trade names, all manufactured by IGM Resins B.V.), can be used. As aminoacetophenone compounds, it is also possible to use the compound described in JP2009-191179A having an absorption wavelength matched with a long wavelength light source having a wavelength of 365 nm or a wavelength of 405 nm.

As acylphosphine compounds, for example, commercially available products, Omnirad-819 and Omnirad-TPO (trade names, all manufactured by IGM Resins B.V.), can be used.

As the photopolymerization initiator, an oxime ester-based polymerization initiator (oxime compound) is more preferable. Particularly, an oxime compound is preferable because this compound has high sensitivity and high polymerization efficiency and makes it easy to design a high coloring material content in the composition.

Specifically, as the oxime compound, for example, the compound described in JP2001-233842A, the compound described in JP2000-80068A, or the compound described in JP2006-342166A can be used.

Examples of the oxime compound include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1- phenylpropan-1-one, 3-(4-toluenesulfonyloxy)iminobutan-2-one, 2-ethoxycarbonyloxyimino-1-phenylpropan-1-one, and the like.

Examples of the oxime compound also include the compounds described in J. C. S. Perkin II (1979) pp. 1653-1660, J. C. S. Perkin II (1979) pp. 156-162, Journal of Photopolymer Science and Technology (1995) pp. 202-232, and JP2000-66385A, the compounds described in JP2000-80068A, JP2004-534797A, and JP2006-342166A, and the like.

As commercially available products, IRGACURE-OXE01 (manufactured by BASF SE), IRGACURE-OXE02 (manufactured by BASF SE), IRGACURE-OXE03 (manufactured by BASF SE), or IRGACURE-OXE04 (manufactured by BASF SE) is also preferable. In addition, TR-PBG-304 (manufactured by Changzhou Tronly New Electronic Materials Co., Ltd.), ADEKA ARKLS NCI-831 and ADEKA ARKLS NCI-930 (manufactured by ADEKA CORPORATION), or N-1919 (carbazole-oxime ester skeleton-containing photoinitiator (manufactured by ADEKA CORPORATION)) can also be used.

Furthermore, as oxime compounds other than the above, the compound described in JP2009-519904A in which oxime is linked to the N-position of carbazole; the compound described in U.S. Pat. No. 7,626,957B in which a hetero substituent is introduced into a benzophenone moiety; the compounds described in JP2010-15025A and US2009-292039A in which a nitro group is introduced into a dye moiety; the ketoxime compound described in WO2009-131189A; the compound described in U.S. Pat. No. 7,556,910B that contains a triazine skeleton and an oxime skeleton in the same molecule; the compound described in JP2009-221114A that has absorption maximum at 405 nm and has excellent sensitivity to a g-line light source; and the like may also be used.

For example, paragraphs 0274 and 0275 of JP2013-29760A can be referred to, and what are described in the paragraphs are incorporated into the present specification.

Specifically, as the oxime compound, a compound represented by the following Formula (OX-1) is preferable. The aforementioned oxime compound may be an oxime compound in which the N—O bond is an (E) isomer, an oxime compound in which the N—O bond is a (Z) isomer, or an oxime compound in which the N—O bond is a mixture of an (E) isomer and a (Z) isomer.

(OX-1)

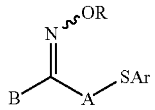

In Formula (OX-1), R and B each independently represent a monovalent substituent, A represents a divalent organic group, and Ar represents an aryl group.

In Formula (OX-1), as the monovalent substituent represented by R, a monovalent non-metal atomic group is preferable.

Examples of the monovalent non-metal atomic group include an alkyl group, an aryl group, an acyl group, an alkoxycarbonyl group, an aryloxycarbonyl group, a heterocyclic group, an alkylthiocarbonyl group, an arylthiocarbonyl group, and the like. Furthermore, these groups may have one or more substituents. In addition, the aforementioned substituents may be further substituted with another substituent.

Examples of the substituent include a halogen atom, an aryloxy group, an alkoxycarbonyl or aryloxycarbonyl group, an acyloxy group, an acyl group, an alkyl group, an aryl group, and the like.

As the monovalent substituent represented by B in Formula (OX-1), an aryl group, a heterocyclic group, an arylcarbonyl group, or a heterocyclic carbonyl group is preferable, and an aryl group or a heterocyclic group is more preferable. These groups may have one or more substituents. Examples of the substituents include the aforementioned substituents.

As the divalent organic group represented by A in Formula (OX-1), an alkylene group with a carbon number of 1 to 12, a cycloalkylene group, or an alkynylene group is preferable. These groups may have one or more substituents. Examples of the substituents include the aforementioned substituents.

As the photopolymerization initiator, an oxime compound containing a fluorine atom can also be used. Specific examples of the oxime compound containing a fluorine atom include the compounds described in JP2010-262028A; compounds 24 and 36 to 40 described in JP2014-500852A; the compound (C-3) described in JP2013-164471A; and the like. What are described in these documents are incorporated into the present specification.

As the photopolymerization initiator, compounds represented by the following General Formulas (1) to (4) can also be used.

(1)

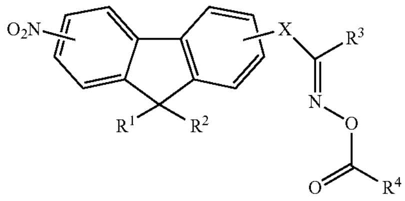

(2)

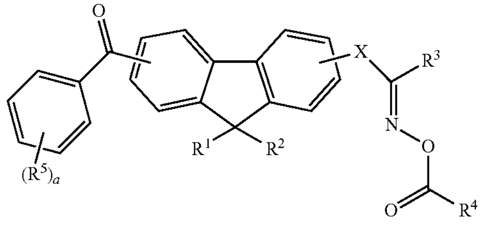

(3)

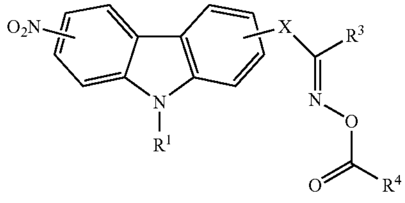

(4)

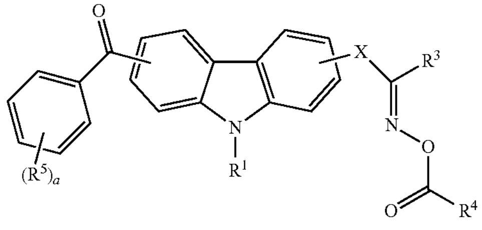

In Formula (1), $R^1$ and $R^2$ each independently represent an alkyl group with a carbon number of 1 to 20, an alicyclic hydrocarbon group with a carbon number of 4 to 20, an aryl group with a carbon number of 6 to 30, or an arylalkyl group with a carbon number of 7 to 30; in a case where $R^1$ and $R^2$ represent phenyl groups, the phenyl groups may be bonded together to form a fluorene group; $R^3$ and $R^4$ each independently represent a hydrogen atom, an alkyl group with a carbon number of 1 to 20, an aryl group with a carbon number of 6 to 30, an arylalkyl group with a carbon number of 7 to 30, or a heterocyclic group with a carbon number of 4 to 20; and X represents a direct bond or a carbonyl group.

In Formula (2), $R^1$, $R^2$, $R^3$, and $R^4$ have the same definitions as $R^1$, $R^2$, $R^3$, and $R^4$ in Formula (1), $R^5$ represents $—R^6$, $—OR^6$, $—SR^6$, $—COR^6$, $—CONR^6R^6$, $—NR^6COR^6$, $—OCOR^6$, $—COOR^6$, $—SCOR^6$, $—OCSR^6$, $—COSR^6$, $—CSOR^6$, —CN, a halogen atom, or a hydroxyl group, $R^6$ represents an alkyl group with a carbon number of 1 to 20, an aryl group with a carbon number of 6 to 30, an arylalkyl group with a carbon number of 7 to 30, or a heterocyclic group with a carbon number of 4 to 20, X represents a direct bond or a carbonyl group, and a represents an integer of 0 to 4.

In Formula (3), $R^1$ represents an alkyl group with a carbon number of 1 to 20, an alicyclic hydrocarbon group with a carbon number of 4 to 20, an aryl group with a carbon number of 6 to 30, or an arylalkyl group with a carbon number of 7 to 30; $R^3$ and $R^4$ each independently represent a hydrogen atom, an alkyl group with a carbon number of 1 to 20, an aryl group with a carbon number of 6 to 30, an arylalkyl group with a carbon number of 7 to 30, or a heterocyclic group with a carbon number of 4 to 20; and X represents a direct bond or a carbonyl group.

In Formula (4), $R^1$, $R^3$, and $R^4$ have the same definitions as $R^1$, $R^3$, and $R^4$ in Formula (3), $R^5$ represents $—R^6$, $—OR^6$, $—SR^6$, $—COR^6$, $—CONR^6R^6$, $—NR^6COR^6$, $—OCOR^6$, $—COOR^6$, $—SCOR^6$, $—OCSR^6$, $—COSR^6$, $—CSOR^6$, —CN, a halogen atom, or a hydroxyl group, $R^6$ represents an alkyl group with a carbon number of 1 to 20, an aryl group with a carbon number of 6 to 30, an arylalkyl group with a carbon number of 7 to 30, or a heterocyclic group with a carbon number of 4 to 20, X represents a direct bond or a carbonyl group, and a represents an integer of 0 to 4.

In the Formulas (1) and (2), each of $R^1$ and $R^2$ is preferably a methyl group, an ethyl group, an n-propyl group, an i-propyl group, a cyclohexyl group, or a phenyl group. $R^3$ is preferably a methyl group, an ethyl group, a phenyl group, a tolyl group, or a xylyl group. $R^4$ is preferably an alkyl group or a phenyl group with a carbon number of 1 to 6. $R^5$ is preferably a methyl group, an ethyl group, a phenyl group, a tolyl group, or a naphthyl group. X is preferably a direct bond.

In the Formulas (3) and (4), $R^1$ is preferably a methyl group, an ethyl group, an n-propyl group, an i-propyl group, a cyclohexyl group, or a phenyl group. $R^3$ is preferably a methyl group, an ethyl group, a phenyl group, a tolyl group, or a xylyl group. $R^4$ is preferably an alkyl group with a carbon number of 1 to 6, or a phenyl group. $R^5$ is preferably a methyl group, an ethyl group, a phenyl group, a tolyl group, or a naphthyl group. X is preferably a direct bond.

Specific examples of the compounds represented by Formulas (1) and (2) include the compounds described in paragraphs 0076 to 0079 of JP2014-137466A. What are described in these documents are incorporated into the present specification.

Specific examples of the oxime compound preferably used in the aforementioned composition will be shown below. Among the following oxime compounds, the oxime compound represented by General Formula (C-13) is more preferable.

Furthermore, as the oxime compound, the compounds described in Table 1 of WO2015/036910A can also be used, and what are described in the document are incorporated into the present specification.

(C-1)

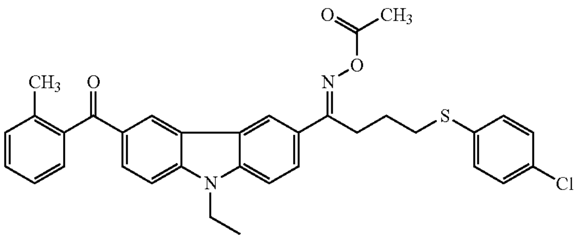

(C-2)

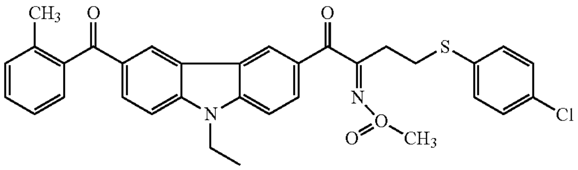

(C-3)

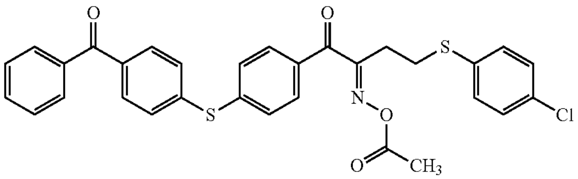

(C-4)

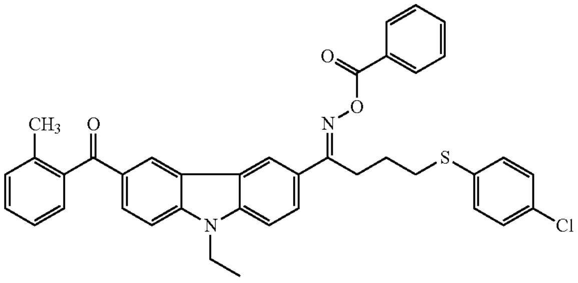

(C-5)

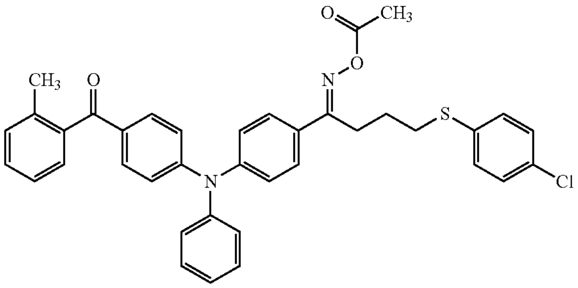

-continued (C-6)

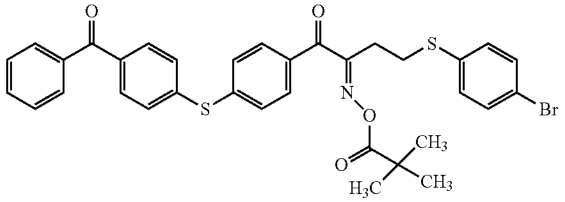

(C-7)

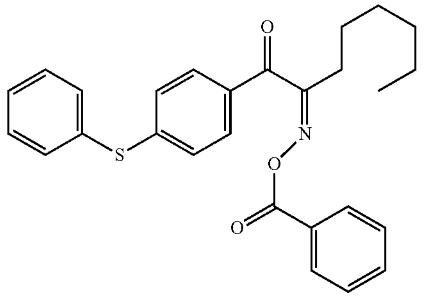

(C-8)

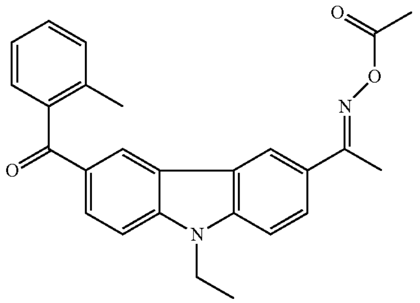

(C-9)

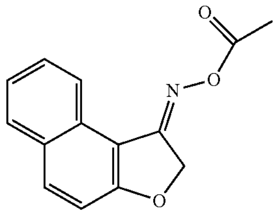

(C-10)

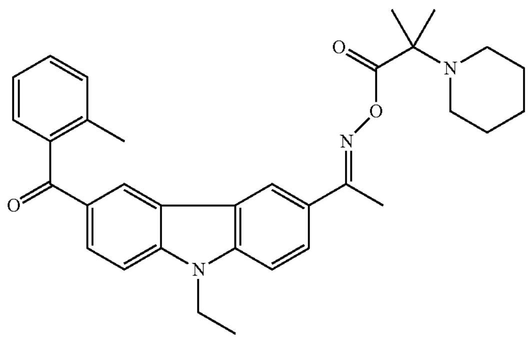

-continued (C-11)

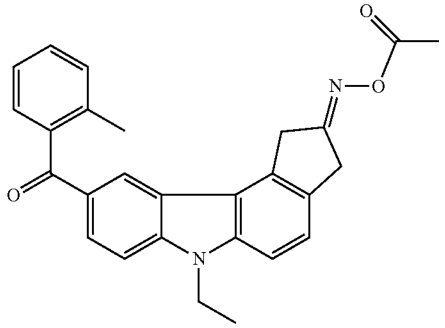

(C-12)

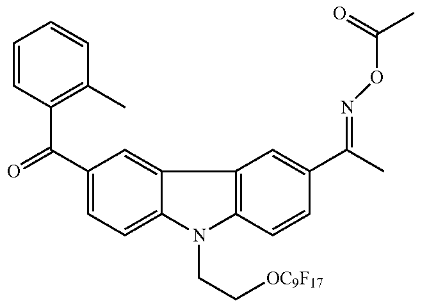

(C-13)

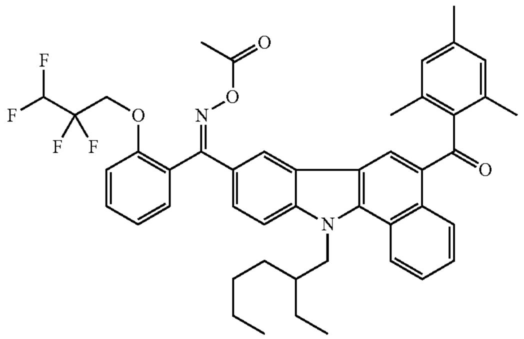

The oxime compound preferably has a maximal absorption wavelength in a wavelength range of 350 to 500 nm, more preferably has a maximal absorption wavelength in a wavelength range of 360 to 480 nm, and even more preferably has a high absorbance at wavelengths of 365 nm and 405 nm.

In view of sensitivity, the molar absorption coefficient of the oxime compound at 365 nm or 405 nm is preferably 1,000 to 300,000, more preferably 2,000 to 300,000, and even more preferably 5,000 to 200,000.

The molar absorption coefficient of a compound can be measured using known methods. For example, it is preferable to measure the molar absorption coefficient by using an ultraviolet-visible spectrophotometer (Cary-5 spectrophotometer manufactured by Varian) and ethyl acetate at a concentration of 0.01 g/L.

If necessary, two or more kinds of photopolymerization initiators may be used in combination.

As the photopolymerization initiator, it is also possible to use the compounds described in paragraph 0052 of JP2008-260927A, paragraphs 0033 to 0037 of JP2010-97210A, and paragraph 0044 of JP2015-68893A, and what are described in the paragraphs are incorporated into the present specification.

[Polymerization Inhibitor]

The composition may contain a polymerization inhibitor.

As the polymerization inhibitor, known polymerization inhibitors can be used without particular limitation. Examples of the polymerization inhibitor include a phenol-based polymerization inhibitor (for example, p-methoxyphenol, 2,5-di-tert-butyl-4-methylphenol, 2,6-di-tert-butyl-4-methylphenol, 4,4'-thiobis(3-methyl-6-t-butylphenol), 2,2'-methylenebis(4-methyl-6-t-butylphenol), 4-methoxynaphthol, or the like); a hydroquinone-based polymerization inhibitor (for example, hydroquinone, 2,6-di-tert-butyl hydroquinone, or the like); a quinone-based polymerization inhibitor (for example, benzoquinone or the like); a free radical-based polymerization inhibitor (for example, a 2,2,6,6-tetramethylpiperidine 1-oxyl free radical, a 4-hydroxy-2,2,6,6-tetramethylpiperidine 1-oxyl free radical, or the like); a nitrobenzene-based polymerization inhibitor (for example, nitrobenzene, 4-nitrotoluene, or the like); a phenothiazine-based polymerization inhibitor (for example, phenothiazine, 2-methoxyphenothiazine, or the like); and the like.

Among these, a phenol-based polymerization inhibitor or a free radical-based polymerization inhibitor is preferable.

The effect of the polymerization inhibitor is marked in a case where the polymerization inhibitor is used together with a resin containing a curable group.

The content of the polymerization inhibitor in the composition is not particularly limited. The content of the polymerization inhibitor with respect to the total mass of the composition is preferably 0.0001% to 0.5% by mass, more preferably 0.0001% to 0.2% by mass, and even more preferably 0.0001% to 0.05% by mass.

The content of the polymerization inhibitor with respect to the total solid content of the composition is preferably 0.0001% to 0.5% by mass, more preferably 0.0001% to 0.2% by mass, and even more preferably 0.0001% to 0.05% by mass.

The ratio of the content of the polymerization inhibitor to the content of the polymerizable compound (particularly, the compound containing a group containing an ethylenically unsaturated bond) in the composition (content of polymerization inhibitor/content of polymerizable compound (mass ratio)) is preferably more than 0.0005, more preferably 0.0006 to 0.02, and even more preferably 0.0006 to 0.005.

[Surfactant]

The composition may contain a surfactant. The surfactant contributes to the improvement of the coating properties of the composition.

In a case where the composition contains a surfactant, the content of the surfactant with respect to the total mass of the composition is preferably 0.001% to 2.0% by mass, more preferably 0.005% to 0.5% by mass, and even more preferably 0.01% to 0.1% by mass.

The content of the surfactant with respect to the total solid content of the composition is preferably 0.001% to 2.0% by mass, more preferably 0.005% to 0.5% by mass, and even more preferably 0.01% to 0.1% by mass.

Examples of the surfactant include a fluorine-based surfactant, a nonionic surfactant, a cationic surfactant, an anionic surfactant, a silicone-based surfactant, and the like.

For example, in a case where the composition contains a fluorine-based surfactant, the liquid properties (particularly, fluidity) of the composition are further improved. That is, in a case where a film is formed using the composition containing a fluorine-based surfactant, the interfacial tension between the surface to be coated and the coating liquid is reduced, and the wettability with respect to the surface to be coated is improved, which improves the coating properties with respect to the surface to be coated. Therefore, it is effective to use the composition containing a fluorine-based surfactant, because then a film having a uniform thickness with small thickness unevenness is more suitably formed even in a case where a thin film of about several m is formed using a small amount of liquid.

The fluorine content in the fluorine-based surfactant is preferably 3% to 40% by mass, more preferably 5% to 30% by mass, and even more preferably 7% to 25% by mass. The fluorine-based surfactant with a fluorine content in this range is effective for achieving thickness uniformity of a coating film and/or saving liquid, and has excellent solubility in the composition.

Examples of the fluorine-based surfactant include MEGAFACE F171, MEGAFACE F172, MEGAFACE F173, MEGAFACE F176, MEGAFACE F177, MEGAFACE F141, MEGAFACE F142, MEGAFACE F143, MEGAFACE F144, MEGAFACE R30, MEGAFACE F437, MEGAFACE F475, MEGAFACE F479, MEGAFACE F482, MEGAFACE F554, and MEGAFACE F780 (all are manufactured by DIC Corporation); FLUORAD FC430, FLUORAD FC431, and FLUORAD FC171 (all are manufactured by Sumitomo 3M Limited), SURFLON S-382, SURFLON SC-101, SURFLON SC-103, SURFLON SC-104, SURFLON SC-105, SURFLON SC1068, SURFLON SC-381, SURFLON SC-383, SURFLON S393, and SURFLON KH-40 (manufactured by AGC Inc.), PF636, PF656, PF6320, PF6520, and PF7002 (manufactured by OMNOVA Solutions Inc.), and the like.

A block polymer can also be used as the fluorine-based surfactant, and specific examples thereof include the compounds described in JP2011-89090A.

Examples of the silicone-based surfactant include KF6007 (manufactured by Shin-Etsu Chemical Co., Ltd.)

[Solvent]

The composition may contain a solvent.

Examples of the solvent include water and an organic solvent. As the solvent, an organic solvent is preferable.

In view of coating properties, the boiling point of the solvent is preferably 100° C. to 400° C., more preferably 150° C. to 300° C., and even more preferably 170° C. to 250° C. In the present specification, unless otherwise specified, the boiling point means a standard boiling point.

Examples of the organic solvent include acetone, methyl ethyl ketone, cyclohexane, ethyl acetate, ethylene dichloride, tetrahydrofuran, toluene, ethylene glycol monomethyl ether, ethylene glycol monoethyl ether, ethylene glycol dimethyl ether, propylene glycol monomethyl ether, propylene glycol monoethyl ether, acetylacetone, cyclohexanone, cyclopentanone, diacetone alcohol, ethylene glycol monomethyl ether acetate, ethylene glycol ethyl ether acetate, ethylene glycol monoisopropyl ether, ethylene glycol monobutyl ether acetate, 1,4-butanedioldiacetate, 3-methoxypropanol, methoxy methoxyethanol, diethylene glycol monomethyl ether, diethylene glycol monoethyl ether, diethylene glycol dimethyl ether, diethylene glycol diethyl ether, propylene glycol monomethyl ether acetate, propylene glycol monoethyl ether acetate, 3-methoxypropyl acetate, N,N-dimethylformamide, dimethyl sulfoxide, γ-butyrolactone, ethyl acetate, butyl acetate, methyl lactate, N-methyl-2-pyrrolidone, ethyl lactate, and the like. However, the organic solvent is not limited to these.

In a case where the composition contains a solvent, in view of further improving the effects of the present invention, the content of the solvent with respect to the total mass of the composition is preferably 1% to 60% by mass, more preferably 1% to 40% by mass, and even more preferably 1% to 25% by mass.

It is also preferable that the composition substantially do not contain a solvent. For the composition, "substantially do not contain a solvent" may mean that the content of the solvent with respect to the total mass of the composition is less than 1% by mass. For example, the content of the solvent is preferably 0% by mass or more and less than 1% by mass, more preferably 0% to 0.5% by mass, and even more preferably 0% to 0.1% by mass.

The concentration of solid contents of the composition is preferably 20% to 100% by mass, more preferably 40% to 100% by mass, and even more preferably 75% to 100% by mass.

[Other Optional Components]

The composition may further contain other optional components in addition to the aforementioned components. Examples thereof include magnetic particles other than the aforementioned magnetic particles, a sensitizer, a co-sensitizer, a crosslinking agent (curing agent), a curing accelerator, a thermosetting accelerator, a plasticizer, a diluent, an oil sensitizing agent, a rubber component, and the like. If necessary, known additives, such as an adhesion facilitator and other aids (for example, an antifoaming agent, a flame retardant, a leveling agent, a peeling accelerator, an antioxidant, a fragrance, a surface tension adjuster, a chain transfer agent, and the like) may be further added to a substrate surface.

[Physical Properties of Composition]

In view of further improving sedimentation stability of the magnetic particles, the viscosity of the composition at 23° C. and a shear rate of 0.1 (1/s) is preferably 1 to 1,000,000 Pa·s, more preferably 10 to 50,000 Pa·s, and even more preferably 50 to 10,000 Pa·s. In view of further improving sedimentation stability of the magnetic particles, the viscosity of the composition at 23° C. and a shear rate of 1,000 (1/s) is preferably 100 Pa·s or less, more preferably 50 Pa·s or less, and even more preferably 10 Pa·s or less. The lower limit of the viscosity at a shear rate of 1,000 (1/s) is preferably 0.001 Pa·s or more.

The viscosity of the composition at 23° C. is obtained by measuring viscosity at 23° C. by using MCR-102 (manufactured by Anton Paar GmbH) while increasing the shear rate from 0.1/s to 1,000/s.

[Manufacturing Method of Composition]

The composition can be prepared by mixing together the components described above by a known mixing method (for example, a mixing method using a stirrer, a homogenizer, a high-pressure emulsifier, a wet pulverizer, a wet disperser, or the like).

In preparing the composition according to the aspect of the present invention, the components may be mixed together at once, or the components may be dissolved or dispersed one by one in a solvent and then sequentially mixed together. Furthermore, the order of adding components and working conditions at the time of mixing are not particularly limited. For example, in a case where two or more kinds of other resins are used, the resins may be mixed together at once, or each kind of resin may be mixed in batches.

[Magnetic Particle-Containing Film]

The magnetic particle-containing film according to an embodiment of the present invention is formed of the aforementioned composition according to the embodiment of the present invention.

In view of further improving magnetic permeability, the film thickness of the magnetic particle-containing film is preferably 1 to 10,000 μm, more preferably 10 to 1,000 μm, and even more preferably 15 to 800 μm.

The magnetic particle-containing film is suitably used as electronic components such as an antenna and an inductor installed in an electronic communication device and the like.

[Manufacturing Method of Magnetic Particle-Containing Film]

The magnetic particle-containing film according to the embodiment of the present invention is obtained, for example, by curing the aforementioned composition.

The manufacturing method of the magnetic particle-containing film is not particularly limited, but preferably includes the following steps.

Composition Layer Forming Step

Curing Step

<Composition Layer Forming Step>

In the composition layer forming step, the composition is applied to a substrate (support) or the like such that a layer of the composition (composition layer) is formed. As the substrate, for example, a wiring board having an antenna portion or an inductor portion and the like can be used.

As a method for applying the composition to the substrate, various coating methods such as a slit coating method, an inkjet method, a spin coating method, a cast coating method, a roll coating method, and a screen printing method can be used. The film thickness of the composition layer is preferably 1 to 10,000 μm, more preferably 10 to 1,000 μm, and even more preferably 15 to 800 μm. The composition layer applied to the substrate may be heated (pre-baked). The pre-baking is performed, for example, using a hot plate, an oven, or the like at a temperature of 50° C. to 140° C. for 10 to 1,800 seconds. Particularly, it is preferable to perform pre-baking in a case where the composition contains a solvent.

<Curing Step>

The curing step is not particularly limited as long as the composition layer can be cured, and examples thereof include a heating treatment of heating the composition layer, an exposure treatment of irradiating the composition layer with an actinic ray or radiation, and the like.

In a case where the heating treatment is performed, for example, the heating treatment can be performed continuously or in batch by using heating means such as a hot plate, a convection oven (hot air circulation-type dryer), or a high-frequency heater.

The heating temperature during the heating treatment is preferably 120° C. to 260° C., and more preferably 150° C. to 240° C. The heating time is not particularly limited, but is preferably 10 to 1,800 seconds.

Note that pre-baking in the composition layer forming step may serve as the heating treatment in the curing step.

In a case where the exposure treatment is performed, the method of irradiating the composition layer with an actinic ray or radiation is not particularly limited. It is preferable to irradiate the composition layer through a photomask having a patterned opening portion.

The exposure is preferably performed by irradiation with radiation. As the radiation that can be used for exposure, an ultraviolet ray such as g-line, h-line, or i-line is preferable, and a high-pressure mercury lamp is preferable as a light source. The irradiation intensity is preferably 5 to 1,500 $mJ/cm^2$, and more preferably 10 to 1,000 $mJ/cm^2$.

In a case where the composition contains a thermal polymerization initiator, the composition layer may be heated in the above exposure treatment. The heating temperature is not particularly limited, but is preferably 80° C. to 250° C. The heating time is not particularly limited, but is preferably 30 to 300 seconds.

In a case where the composition layer is heated in the exposure treatment, the heating may serve as a post-heating step which will be described later. In other words, in a case where the composition layer is heated in the exposure treatment, the manufacturing method of the magnetic particle-containing film may not include a post-heating step.

<Development Step>

In a case where the exposure treatment is performed in the curing step, the manufacturing method may further include a development step.

The development step is a step of developing the exposed composition layer so as to form a magnetic particle-containing film. By this step, the composition layer in a portion not being irradiated with light in the exposure treatment is eluted, and only the photo-cured portion remains. In this way, a patterned magnetic particle-containing film is obtained.

Although the type of developer used in the development step is not particularly limited, it is desirable to use an alkali developer that does not damage the circuit or the like.

The development temperature is, for example, 20° C. to 30° C.

The development time is, for example, 20 to 90 seconds. In recent years, in order to more thoroughly remove residues, sometimes the development has been performed for 120 to 180 seconds. Furthermore, in order to further improve the residue removability, sometimes a step of shaking off the developer every 60 seconds and supplying a new developer is repeated several times.

As the alkali developer, an alkaline aqueous solution is preferable which is prepared by dissolving an alkaline compound in water at a concentration of 0.001% to 10% by mass (preferably 0.01% to 5% by mass).

Examples of the alkaline compound include sodium hydroxide, potassium hydroxide, sodium carbonate, sodium silicate, sodium metasilicate, aqueous ammonia, ethylamine, diethylamine, dimethylethanolamine, tetramethylammonium hydroxide, tetraethylammonium hydroxide, tetrapropylammonium hydroxide, tetrabutylammonium hydroxide, benzyltrimethylammonium hydroxide, choline, pyrrole, piperidine, 1,8-diazabicyclo[5.4.0]-7-undecene, and the like (among these, an organic alkali is preferable).

In a case where an alkali developer is used, generally, a rinsing treatment using water is performed after development.

<Post-Baking>

In a case where the exposure treatment is performed in the curing step, it is preferable to perform the heating treatment (post-baking) after the curing step. The post-baking is a heating treatment for completion of curing. In a case where the development step is performed, it is preferable to perform the post-baking after the development step. The heating temperature is preferably 240° C. or lower, and more preferably 220° C. or lower. The lower limit of the heating temperature is not particularly limited. However, considering an efficient and effective treatment, the heating temperature is preferably 50° C. or higher, and more preferably 100° C. or higher. The heating time is not particularly limited, but is preferably 10 to 1,800 seconds.

The post-baking can be performed continuously or in batch by using heating means such as a hot plate, a convection oven (hot air circulation-type dryer), or a high-frequency heater.

It is preferable that the aforementioned post-baking be performed in an atmosphere with a low oxygen concentration. The oxygen concentration is preferably 19% by volume or less, more preferably 15% by volume or less, even more preferably 10% by volume or less, particularly preferably 7% by volume or less, and most preferably 3% by volume or less. The lower limit of the oxygen concentration is not particularly limited, but is practically 10 ppm by volume or more.

Instead of post-baking by heating described above, ultraviolet (UV) irradiation may be performed to complete curing.

In this case, it is preferable that the composition further contain a UV curing agent. The UV curing agent is preferably a UV curing agent that can be cured at a wavelength shorter than 365 nm, which is the exposure wavelength of the polymerization initiator added for the lithography process by ordinary i-line exposure. Examples of the UV curing agent include Ciba IRGACURE 2959 (trade name). In a case where UV irradiation is performed, it is preferable that the composition layer be a material that is cured at a wavelength of 340 nm or less. The lower limit of the wavelength is not particularly limited, but is 220 nm or more in general. The exposure amount of UV irradiation is preferably 100 to 5,000 mJ, more preferably 300 to 4,000 mJ, and even more preferably 800 to 3,500 mJ. In order to more effectively cure the composition layer at a low temperature, it is preferable that this UV curing step be performed after the exposure treatment. As the exposure light source, it is preferable to use an ozoneless mercury lamp.

[Electronic Component]

The electronic component according to an embodiment of the present invention includes the aforementioned magnetic particle-containing film according to the embodiment of the present invention. That is, the electronic component according to the embodiment of the present invention may include the magnetic particle-containing film as a part of the component. Examples of electronic component include an inductor and an antenna. As the electronic component, an electronic component having a known structure can be used.

EXAMPLES

Hereinafter, the present invention will be more specifically described based on examples. The materials, amounts and proportions of the materials used, details and procedures of treatments, and the like described in the following examples can be appropriately changed as long as the gist of the present invention is maintained. Therefore, the scope of the present invention is not limited to the following specific examples.

In the following description, unless otherwise specified, "%" means "% by mass", and "parts" means "parts by mass".

[Various Components Used for Preparing Composition]

To make the composition, the components described in Table 1 were prepared. The components described in Table 1 are summarized below.

[Magnetic Particles]

P-1; 80% Ni-4Mo PF-5F (manufactured by Epson Atmix Corporation), particle diameter (average primary particle diameter): 4 μm, Ni content: 80%, aspect ratio: 1 to 2

P-2; 80% Ni-4Mo PF-15F (manufactured by Epson Atmix Corporation), particle diameter: 8 μm, Ni content: 80%, aspect ratio: 1 to 2

P-3; 80% Ni-4Mo WA13 (manufactured by Epson Atmix Corporation), particle diameter: 12.5 μm, Ni content: 80%, aspect ratio: 1 to 2

P-4; particles manufactured by performing mechanochemical treatment on 80% Ni-4Mo WA13, particle diameter: 12.5 μm, Ni content: 80%, aspect ratio: 3 to 4

P-5; particles manufactured by performing mechanochemical treatment on 80% Ni-4Mo WA13, particle diameter: 12.5 μm, Ni content: 80%, aspect ratio: 5 to 6

P-6; particles manufactured by performing mechanochemical treatment on 80% Ni-4Mo WA13, particle diameter: 12.5 μm, Ni content: 80%, aspect ratio: 7 or more and less than 8

P-7; KUAMET-CT5-25 um (manufactured by Epson Atmix Corporation), particle diameter: 15 μm, Co content: 81%, aspect ratio: 1 to 2

P-8; KUAMET-CT5-38 um (manufactured by Epson Atmix Corporation), particle diameter: 20 μm, Co content: 81%, aspect ratio: 1 to 2

P-9; KUAMET-CT5-53 um (manufactured by Epson Atmix Corporation), particle diameter: 25 μm, Co content: 81%, aspect ratio: 1 to 2

P-10; particles containing elements of Co: 70%, Fe: 15%, Si: 9%, Cr: 4%, B: 2% and manufactured by water atomization method, particle diameter: 15 μm, Co content: 70%, aspect ratio: 1 to 2

P-11; particles containing elements of Co: 60%, Fe: 25%, Si: 9%, Cr: 4%, B: 2% and manufactured by water atomization method, particle diameter: 15 μm, Co content: 60%, aspect ratio: 1 to 2

P-12; particles containing elements of Co: 50%, Fe: 35%, Si: 9%, Cr: 4%, B: 2% and manufactured by water atomization method, particle diameter: 15 μm, Co content: 50%, aspect ratio: 1 to 2

P-13; particles containing elements of Co: 90%, Si: 4%, Cr: 4%, B: 2% and manufactured by water atomization method, particle diameter: 15 μm, Co content: 90%, aspect ratio: 1 to 2

P-14; particles containing elements of Ni: 80%, Fe: 19%, Mo: 1% and manufactured by water atomization method, particle diameter: 12.5 μm, Ni content: 80%, aspect ratio: 1 to 2

P-15; particles containing elements of Ni: 80%, Fe: 10%, Mo: 10% and manufactured by water atomization method, particle diameter: 12.5 μm, Ni content: 80%, aspect ratio: 1 to 2

P-16; particles containing elements of Ni: 80%, Mo: 1%, Fe: 5% and manufactured by water atomization method, particle diameter: 12.5 μm, Ni content: 80%, aspect ratio: 1 to 2

P-17; particles containing elements of Co: 40%, Fe: 45%, Si: 9%, Cr: 4%, B: 2% and manufactured by water atomization method, particle diameter: 15 μm, Co content: 40%, aspect ratio: 1 to 2

P-18; particles manufactured by performing mechanochemical treatment on 80% Ni-4Mo WA13, particle diameter: 12.5 μm, Ni content: 80%, aspect ratio: 8 to 9

P-19; particles containing elements of Ni: 40%, Fe: 55%, Mo: 5% and manufactured by water atomization method, particle diameter: 12.5 μm, Ni content: 40%, aspect ratio: 1 to 2

P-20; AW2-08 PF-3F (manufactured by Epson Atmix Corporation), particle diameter: 3 μm, Ni, Co content: 0%, aspect ratio: 1 to 2

All the magnetic particles were particles substantially consisting of only metal atoms.

The particle diameter (average primary particle diameter) of the magnetic particles was measured by the method described in the specification.

Among the magnetic particles described above, P-1 to P-16 also correspond to "magnetic particles X having an aspect ratio less than 8" described above.

[Rheology Control Agent or Other Resins]

D-1; trade name "BYK-P105" (manufactured by BYK-Chemie GmbH.), polymer of low-molecular-weight unsaturated carboxylic acid, acid value 365 mgKOH/g, concentration of solid contents 100%

D-2; trade name "ANTI-TERRA-204" (manufactured by BYK-Chemie GmbH.), solution of polyaminoamide polycarboxylate, amine value 37 mgKOH/g, acid value 41 mgKOH/g, concentration of solid contents 52%

D-3; trade name "Talen VA-705B" (manufactured by Kyoeisha Chemical Co., Ltd.), higher fatty acid amide, concentration of solid contents 100%

D-4; trade name "FLOWNON RCM-230AF" (manufactured by Kyoeisha Chemical Co., Ltd.), higher fatty acid amide, concentration of solid contents 10%

D-5; the following compound (weight-average molecular weight 10,000, amine value 50 mgKOH/g, acid value 50 mgKOH/g, concentration of solid contents 30%

D-6; the following compound (weight-average molecular weight 25,000, acid value 100 mgKOH/g), concentration of solid contents 30%

D-7; the following compound (weight-average molecular weight 10,000, acid value 40 mgKOH/g), concentration of solid contents 30%

D-1 and D-3 are rheology control agents, and D-2 and D-4 are solutions containing a rheology control agent (solid content).

D-5 to D-7 are solutions containing other resins (solid content) that do not correspond to the rheology control agent.

In the following compounds shown for D-5 to D-7, the numerical values attached to each repeating unit represent mass ratio.

D-5

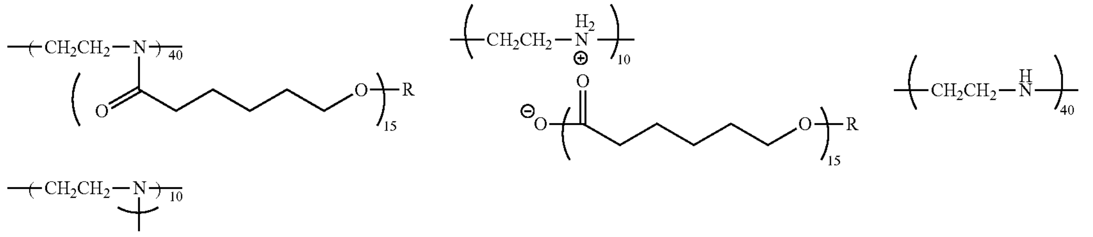

-continued

D-6

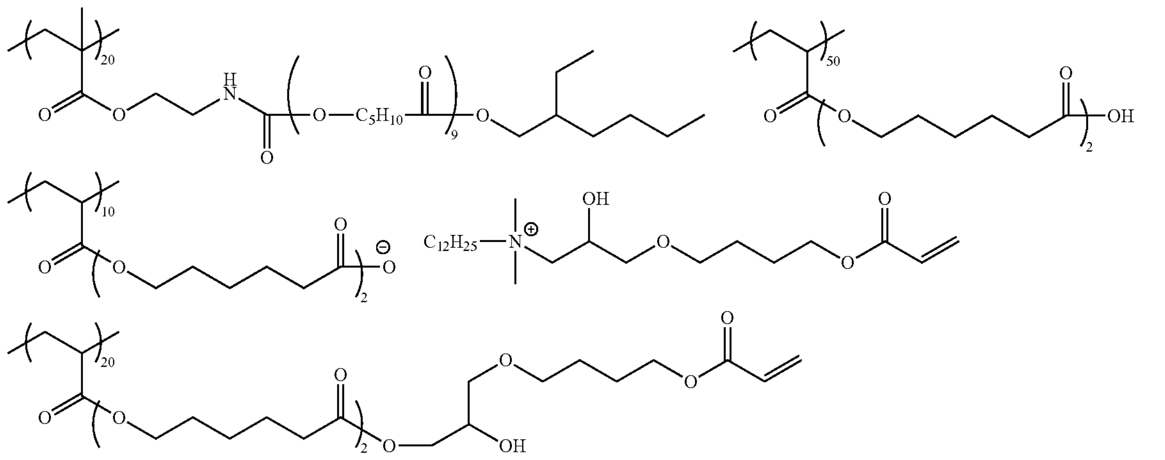

D-7

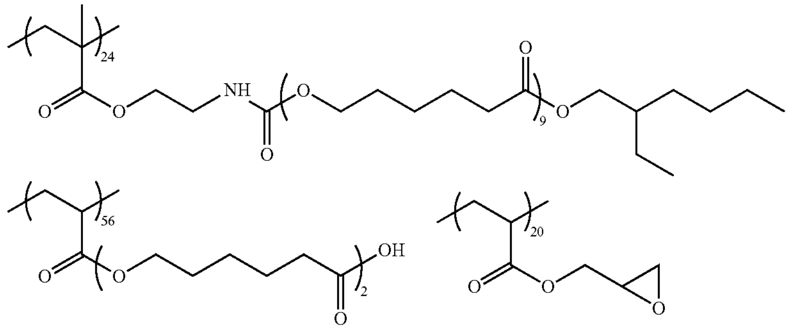

R = •CO$^{n}C_7H_{15}$•H

[Polymerizable Compound]

M-1; CELLOXIDE 2021P (manufactured by Daicel Corporation), 3',4'-epoxycyclohexylmethyl 3,4-epoxycyclohexane carboxylate M-2; DENACOL EX-411 (manufactured by Nagase ChemteX Corporation.), pentaerythritol polyglycidyl ether M-3; KAYARAD RP-1040 (manufactured by Nippon Kayaku Co., Ltd.), the following compound M-4; A-TMMT (manufactured by TOAGOSEI CO., LTD.), pentaerythritol tetraacrylate

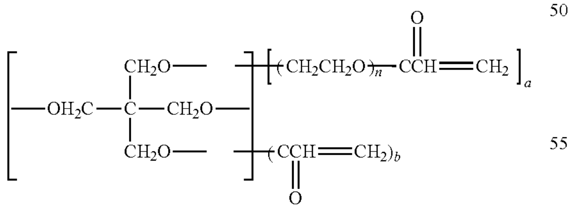

a + b = 4, $\bar{n}$ = 4

[Additive (Curing Accelerator or Polymerization Initiator)]

A-1: triphenylphosphine (manufactured by TOKYO CHEMICAL INDUSTRY CO., LTD.), curing accelerator A-2; HISHICOLIN PX-4MP (manufactured by Nippon Chemical Industrial CO., LTD.), methyltributylphosphonium dimethylphosphate, curing accelerator A-3; IRGACURE-OXE03 (manufactured by BASF SE), photopolymerization initiator A-4; Omnirad-369 (manufactured by IGM Resins B.V.), photopolymerization initiator

[Surfactant]

Sur-1; MEGAFACE F-781F (manufactured by DIC Corporation), fluorine-based surfactant Sur-2; KF6001 (manufactured by Shin-Etsu Chemical Co., Ltd.), silicone-based surfactant

[Solvent]

S-1; propylene glycol monomethyl ether acetate (PGMEA)

S-2: 1,4-butanedioldiacetate (1,4-BDDA)

Preparation of Compositions of Examples and Comparative Examples

The components shown in Table 1 except for solvents were mixed together so that the compositional ratio (based on mass) shown in Table 1 was achieved, and the mixture was put in an airtight container made of polytetrafluoroethylene (PTFE). Thereafter, solvents were added thereto so that the compositional ratio (based on mass) shown in Table 1 was achieved, and the container was then sealed, followed by dispersion for 2 hours at 50 G by using RAM (low-frequency resonance acoustic mixer) manufactured by Resodyn Acoustic Mixers, Inc., thereby preparing compositions of examples and comparative examples.

[Evaluation Test]

[Sedimentation Stability]

A sample bottle made of glass (cylindrical bottle having a diameter of 23 mm and a height of 35 mm) was filled with 3 mL of the composition obtained as above, sealed, and then left to stand at 25° C. for 30 days.

Thereafter, the composition in the sample bottle was visually observed, and a distance d1 between the gas-liquid interface and the interface between a transparent region and an opaque region and a distance d2 between the gas-liquid interface and the bottom surface of the sample bottle were measured.

Subsequently, the same sample bottle was stirred at 3,300 r/min for 30 seconds by using a shaker Se-08 manufactured by TAITEC CORPORATION, and then left to stand at 25° C. for 12 hours. Thereafter, the composition in the sample bottle was visually observed, and a distance d'1 between the gas-liquid interface and the interface between a transparent region and an opaque region and a distance d'2 between the gas-liquid interface and the bottom surface of the sample bottle were measured.

By using the distance d1, the distance d2, the distance d'1, and the distance d'2, sedimentation stability was evaluated based on the following standard. In a case where a sample is graded 2 based on the following standard, it was determined that the sample has excellent sedimentation stability. The results are shown in Table 1.

3: $0 \leq d1/d2 \leq 0.1$ and $0 \leq d'1/d'2 \leq 0.1$

2: $0.1 < d1/d2 \leq 0.3$ and $0 \leq d'1/d'2 \leq 0.1$

1:$0.3 < d1/d2$ or $0.1 \leq d'1/d'2$

[Magnetic Isotropy of Magnetic Particle-Containing Film]

By using an applicator, each composition was applied onto a Si wafer (film thickness: 100 μm) such that the formed magnetic particle-containing film have a film thickness of 100 μm, thereby forming a composition layer. Then, the composition layer was heated at 100° C. for 10 minutes and then further heated 230° C. for 10 minutes in a case where the applied composition did not contain a photopolymerization initiator, thereby obtaining a magnetic particle-containing film. In a case where the applied composition was a composition containing a photopolymerization initiator, the composition layer was subjected to an exposure treatment with a proximity exposure machine under the conditions of 1,000 $mJ/cm^2$ and heated at 230° C. for 10 minutes, thereby obtaining a magnetic particle-containing film.

Hereinafter, the Si wafer with the magnetic particle-containing film will be also simply called substrate.

One substrate obtained as above was cut into pieces of 1 cm×2.8 cm, thereby obtaining a substrate A which was cut such that the major axis thereof was in the application direction of the applicator and a substrate B which was cut such that the minor axis was in the application direction of the applicator. Subsequently, by using PER-01 (manufactured by KEYCOM Corp., high-frequency magnetic permeability measurement device), magnetic permeability was measured at 100 MHz to obtain the relative magnetic permeability μ'A and μ'B of the magnetic particle-containing film on each substrate, and the value of "μ'A/μ'B" was determined.

μ'A is the magnetic permeability measured using the substrate A, and μ'B is the magnetic permeability measured using the substrate B.

The same procedure was further repeated 9 times, and the preparation of a substrate and the measurement of magnetic permeability were performed 10 times for each composition. The number n (n is an integer of 0 to 10) of substrates satisfying $0.9 < \mu'A/\mu'B < 1.1$ was evaluated according to the following standard.

In a case where a magnetic particle-containing film met the following standard "2", it was determined that the magnetic isotropy of the magnetic particle-containing film is excellent. The results are shown in Table 1.

2: $n \leq 3$

1: $3 < n$

[Chemical Resistance of Magnetic Particle-Containing Film]

By using an applicator, each composition was applied onto a Si wafer (film thickness: 100 μm) such that the formed magnetic particle-containing film have a film thickness of 100 μm, thereby forming a composition layer. Then, the composition layer was heated at 100° C. for 10 minutes and then further heated 230° C. for 10 minutes in a case where the applied composition did not contain a photopolymerization initiator, thereby obtaining a magnetic particle-containing film. In a case where the applied composition was a composition containing a photopolymerization initiator, the composition layer was subjected to an exposure treatment with a proximity exposure machine under the conditions of 1,000 $mJ/cm^2$ and heated at 230° C. for 10 minutes, thereby obtaining a magnetic particle-containing film.

Hereinafter, the Si wafer with the magnetic particle-containing film will be also simply called substrate.

The obtained magnetic particle-containing film was cut into pieces of 1 cm×2.8 cm just as the substrate. Then, by using PER-01, magnetic permeability was measured at 100 MHz, thereby obtaining a relative magnetic permeability μ'X of the magnetic particle-containing film on the substrate.

Subsequently, the same substrate was immersed in a 10% aqueous hydrochloric acid solution at 25° C. for 30 minutes, and then a relative magnetic permeability μ'Y of the magnetic particle-containing film was obtained in the same manner as described above.

The rate of change Δμ' before and after the immersion in a 10% aqueous hydrochloric acid solution was determined by the following formula and evaluated according to the following standard.

In a case where a magnetic particle-containing film met the following standard "2" or a higher standard, it was determined that the chemical resistance of the magnetic particle-containing film is excellent. The results are shown in Table 1.

$$\Delta\mu'(\%) = |\mu'Y - \mu'X| / \mu'X \times 100 \quad \text{Formula:}$$

3: $\Delta\mu' < 5\%$

2: $5\% \leq \Delta\mu' < 10\%$

1: $10\% \leq \Delta\mu'$

[Result]

The following table shows the formulation of each composition and the results of evaluation tests performed on each composition.

The value described in the column of "Amount" represents the mass ratio (% by mass) of the component to the total mass of the composition.

TABLE 1

| | Formulation of composition | | | | | | | | | | | | Evaluation | | |
|---|---|---|---|---|---|---|---|---|---|---|---|---|---|---|---|
| | Magnetic particles | | Rheology control agent and other resins | | Polymerizable compound | | Additive | | Surfactant | | Solvent | | Temporal | Chemical | |
| | Type | Amount | Type | Amount | Type | Amount | Type | Amount | Type | Amount | Type | Amount | stability | resistance | Isotropy |
| Example 1 | P-1 | 85.00 | D-1 | 5.00 | M-1 | 10.00 | | | | | | | 3 | 2 | 2 |
| Example 2 | P-2 | 85.00 | D-1 | 5.00 | M-1 | 10.00 | | | | | | | 3 | 3 | 2 |
| Example 3 | P-3 | 85.00 | D-1 | 5.00 | M-1 | 10.00 | | | | | | | 3 | 3 | 2 |
| Example 4 | P-4 | 85.00 | D-1 | 5.00 | M-1 | 10.00 | | | | | | | 3 | 3 | 2 |
| Example 5 | P-5 | 85.00 | D-1 | 5.00 | M-1 | 10.00 | | | | | | | 3 | 3 | 2 |
| Example 6 | P-6 | 85.00 | D-1 | 5.00 | M-1 | 10.00 | | | | | | | 3 | 3 | 2 |
| Example 7 | P-7 | 85.00 | D-1 | 5.00 | M-1 | 10.00 | | | | | | | 3 | 2 | 2 |
| Example 8 | P-8 | 85.00 | D-1 | 5.00 | M-1 | 10.00 | | | | | | | 3 | 3 | 2 |
| Example 9 | P-9 | 85.00 | D-1 | 5.00 | M-1 | 10.00 | | | | | | | 3 | 3 | 2 |
| Example 10 | P-10 | 85.00 | D-1 | 5.00 | M-1 | 10.00 | | | | | | | 3 | 2 | 2 |
| Example 11 | P-11 | 85.00 | D-1 | 5.00 | M-1 | 10.00 | | | | | | | 2 | 2 | 2 |
| Example 12 | P-12 | 85.00 | D-1 | 5.00 | M-1 | 10.00 | | | | | | | 2 | 2 | 2 |
| Example 13 | P-13 | 85.00 | D-1 | 5.00 | M-1 | 10.00 | | | | | | | 3 | 3 | 2 |
| Example 14 | P-14 | 85.00 | D-1 | 5.00 | M-1 | 10.00 | | | | | | | 3 | 3 | 2 |
| Example 15 | P-15 | 85.00 | D-1 | 5.00 | M-1 | 10.00 | | | | | | | 3 | 3 | 2 |
| Example 16 | P-16 | 85.00 | D-1 | 5.00 | M-1 | 10.00 | | | | | | | 3 | 3 | 2 |
| Example 17 | P-1 | 21.30 | D-1 | 5.00 | M-1 | 10.00 | | | | | | | 3 | 3 | 2 |
| | P-3 | 63.70 | | | | | | | | | | | | | |
| Example 18 | P-1 | 42.50 | D-1 | 5.00 | M-1 | 10.00 | | | | | | | 3 | 3 | 2 |
| | P-3 | 42.50 | | | | | | | | | | | | | |
| Example 19 | P-1 | 63.70 | D-1 | 5.00 | M-1 | 10.00 | | | | | | | 3 | 2 | 2 |
| | P-3 | 21.30 | | | | | | | | | | | | | |
| Example 20 | P-1 | 42.50 | D-1 | 5.00 | M-1 | 10.00 | | | | | | | 3 | 3 | 2 |
| | P-6 | 42.50 | | | | | | | | | | | | | |
| Example 21 | P-1 | 42.50 | D-1 | 5.00 | M-1 | 10.00 | | | | | | | 3 | 2 | 2 |
| | P-7 | 42.50 | | | | | | | | | | | | | |
| Example 22 | P-1 | 28.40 | D-1 | 5.00 | M-1 | 10.00 | | | | | | | 3 | 2 | 2 |
| | P-3 | 28.30 | | | | | | | | | | | | | |
| | P-7 | 28.30 | | | | | | | | | | | | | |
| Example 23 | P-10 | 28.40 | D-1 | 5.00 | M-1 | 10.00 | | | | | | | 3 | 2 | 2 |
| | P-11 | 28.30 | | | | | | | | | | | | | |
| | P-12 | 28.30 | | | | | | | | | | | | | |
| Example 24 | P-3 | 72.30 | D-2 | 16.67 | M-1 | 8.50 | | | | | S-1 | 2.53 | 3 | 3 | 2 |
| Example 25 | P-3 | 68.00 | D-3 | 1.36 | M-1 | 10.40 | | | | | S-1 | 20.24 | 3 | 3 | 2 |
| Example 26 | P-3 | 73.90 | D-4 | 14.79 | M-1 | 11.31 | | | | | | | 3 | 3 | 2 |
| Example 27 | P-3 | 72.30 | D-1 | 3.54 | M-1 | 8.50 | | | | | S-1 | 14.95 | 3 | 3 | 2 |
| | | | D-3 | 0.71 | | | | | | | | | | | |
| Example 28 | P-3 | 72.30 | D-3 | 1.08 | M-1 | 8.50 | | | | | S-1 | 14.51 | 3 | 3 | 2 |
| | | | D-4 | 3.61 | | | | | | | | | | | |
| Example 29 | P-3 | 72.30 | D-3 | 0.72 | M-1 | 8.50 | | | | | S-1 | 11.25 | 3 | 3 | 2 |
| | | | D-4 | 7.23 | | | | | | | | | | | |
| Example 30 | P-3 | 72.30 | D-3 | 0.36 | M-1 | 8.50 | | | | | S-1 | 8.00 | 3 | 3 | 2 |
| | | | D-4 | 10.84 | | | | | | | | | | | |
| Example 31 | P-3 | 78.29 | D-1 | 4.69 | M-1 | 9.20 | | | | | | | 3 | 3 | 2 |
| | | | D-5 | 7.82 | | | | | | | | | | | |
| Example 32 | P-3 | 78.29 | D-1 | 4.69 | M-1 | 9.20 | | | | | | | 3 | 3 | 2 |
| | | | D-6 | 7.82 | | | | | | | | | | | |
| Example 33 | P-3 | 78.29 | D-1 | 4.69 | M-1 | 9.20 | | | | | | | 3 | 3 | 2 |
| | | | D-7 | 7.82 | | | | | | | | | | | |

TABLE 2

| | Formulation of composition | | | | | | | | | | | | Evaluation | | |
|---|---|---|---|---|---|---|---|---|---|---|---|---|---|---|---|
| | Magnetic particles | | Rheology control agent and other resins | | Polymerizable compound | | Additive | | Surfactant | | Solvent | | Temporal | Chemical | |
| | Type | Amount | Type | Amount | Type | Amount | Type | Amount | Type | Amount | Type | Amount | stability | resistance | Isotropy |
| Example 34 | P-3 | 85.00 | D-1 | 5.00 | M-2 | 10.00 | | | | | | | 3 | 3 | 2 |
| Example 35 | P-3 | 80.30 | D-1 | 4.70 | M-3 | 10.00 | A-3 | 5.00 | | | | | 3 | 2 | 2 |
| Example 36 | P-3 | 80.30 | D-1 | 4.70 | M-4 | 10.00 | A-3 | 5.00 | | | | | 3 | 2 | 2 |
| Example 37 | P-3 | 85.00 | D-1 | 5.00 | M-1 | 7.50 | | | | | | | 3 | 3 | 2 |
| | | | | | M-2 | 2.50 | | | | | | | | | |
| Example 38 | P-3 | 85.00 | D-1 | 5.00 | M-1 | 5.00 | | | | | | | 3 | 3 | 2 |
| | | | | | M-2 | 5.00 | | | | | | | | | |

TABLE 2-continued

| | Formulation of composition | | | | | | | | | | | | Evaluation | | |
|---|---|---|---|---|---|---|---|---|---|---|---|---|---|---|---|
| | Magnetic particles | | Rheology control agent and other resins | | Polymerizable compound | | Additive | | Surfactant | | Solvent | | Temporal | Chemical | |
| | Type | Amount | Type | Amount | Type | Amount | Type | Amount | Type | Amount | Type | Amount | stability | resistance | Isotropy |
| Example 39 | P-3 | 85.00 | D-1 | 5.00 | M-1 | 2.50 | | | | | | | 3 | 3 | 2 |
| | | | | | M-2 | 7.50 | | | | | | | | | |
| Example 40 | P-3 | 80.30 | D-1 | 4.70 | M-3 | 7.50 | A-3 | 5.00 | | | | | 3 | 2 | 2 |
| | | | | | M-4 | 2.50 | | | | | | | | | |
| Example 41 | P-3 | 80.30 | D-1 | 4.70 | M-3 | 5.00 | A-3 | 5.00 | | | | | 3 | 2 | 2 |
| | | | | | M-4 | 5.00 | | | | | | | | | |
| Example 42 | P-3 | 80.30 | D-1 | 4.70 | M-3 | 2.50 | A-3 | 5.00 | | | | | 3 | 2 | 2 |
| | | | | | M-4 | 7.50 | | | | | | | | | |
| Example 43 | P-3 | 80.30 | D-1 | 4.70 | M-1 | 5.00 | A-3 | 5.00 | | | | | 3 | 3 | 2 |
| | | | | | M-4 | 5.00 | | | | | | | | | |
| Example 44 | P-3 | 84.06 | D-1 | 4.94 | M-2 | 10.00 | A-1 | 1.00 | | | | | 3 | 3 | 2 |
| Example 45 | P-3 | 84.06 | D-1 | 4.94 | M-2 | 10.00 | A-2 | 1.00 | | | | | 3 | 3 | 2 |
| Example 46 | P-3 | 84.06 | D-1 | 4.94 | M-2 | 10.00 | A-1 | 0.50 | | | | | 3 | 3 | 2 |
| | | | | | | | A-2 | 0.50 | | | | | | | |
| Example 47 | P-3 | 80.30 | D-1 | 4.70 | M-3 | 10.00 | A-4 | 5.00 | | | | | 3 | 2 | 2 |
| Example 48 | P-3 | 80.30 | D-1 | 4.70 | M-3 | 10.00 | A-3 | 2.50 | | | | | 3 | 2 | 2 |
| | | | | | | | A-4 | 2.50 | | | | | | | |
| Example 49 | P-3 | 80.30 | D-1 | 4.70 | M-1 | 5.00 | A-2 | 1.00 | | | | | 3 | 3 | 2 |
| | | | | | M-4 | 5.00 | A-3 | 4.00 | | | | | | | |
| Example 50 | P-3 | 84.97 | D-1 | 5.00 | M-1 | 10.00 | | | Sur-1 | 0.03 | | | 3 | 3 | 2 |
| Example 51 | P-3 | 84.95 | D-1 | 5.00 | M-1 | 10.00 | | | Sur-2 | 0.05 | | | 3 | 3 | 2 |
| Example 52 | P-3 | 84.97 | D-1 | 5.00 | M-1 | 10.00 | | | Sur-1 | 0.02 | | | 3 | 3 | 2 |
| | | | | | | | | | Sur-2 | 0.02 | | | | | |
| Example 53 | P-3 | 68.00 | D-3 | 1.36 | M-1 | 8.00 | | | | | S-1 | 22.64 | 3 | 3 | 2 |
| Example 54 | P-3 | 59.50 | D-3 | 1.19 | M-1 | 7.00 | | | | | S-1 | 32.31 | 2 | 3 | 2 |
| Example 55 | P-3 | 51.00 | D-3 | 1.53 | M-1 | 6.00 | | | | | S-1 | 41.47 | 2 | 3 | 2 |
| Example 56 | P-3 | 42.50 | D-3 | 2.13 | M-1 | 5.00 | | | | | S-1 | 50.37 | 2 | 3 | 2 |
| Example 57 | P-3 | 59.50 | D-3 | 1.19 | M-1 | 7.00 | | | | | S-2 | 32.31 | 2 | 3 | 2 |
| Example 58 | P-3 | 59.50 | D-3 | 1.19 | M-1 | 7.00 | | | | | S-1 | 24.23 | 2 | 3 | 2 |
| | | | | | | | | | | | S-2 | 8.08 | | | |
| Example 59 | P-3 | 59.49 | D-3 | 1.19 | M-1 | 7.00 | | | | | S-1 | 16.16 | 2 | 3 | 2 |
| | | | | | | | | | | | S-2 | 16.16 | | | |
| Example 60 | P-3 | 59.50 | D-3 | 1.19 | M-1 | 7.00 | | | | | S-1 | 8.08 | 2 | 3 | 2 |
| | | | | | | | | | | | S-2 | 24.23 | | | |
| Example 61 | P-3 | 85.00 | D-1 | 5.00 | M-1 | 10.00 | | | | | | | 3 | 3 | 2 |
| Example 62 | P-3 | 70.00 | D-1 | 10.50 | M-1 | 19.50 | | | | | | | 3 | 3 | 2 |
| Example 63 | P-3 | 50.00 | D-1 | 25.00 | M-1 | 25.00 | | | | | | | 3 | 3 | 2 |
| Comparative Example 1 | P-17 | 73.90 | D-4 | 14.79 | M-1 | 11.31 | | | | | | | 1 | 1 | 2 |
| Comparative Example 2 | P-18 | 76.01 | D-5 | 14.99 | M-1 | 9.00 | | | | | | | 3 | 3 | 1 |
| Comparative Example 3 | P-19 | 73.90 | D-4 | 14.79 | M-1 | 11.31 | | | | | | | 1 | 1 | 2 |
| Comparative Example 4 | P-20 | 73.90 | D-4 | 14.79 | M-1 | 11.31 | | | | | | | 1 | 1 | 2 |
| Comparative Example 5 | P-1 | 73.90 | D-5 | 14.79 | M-1 | 11.31 | | | | | | | 1 | 2 | 2 |

As is evident from Table 1, it has been confirmed that the composition according to the embodiment of the present invention excellent temporal stability, and that using the composition according to the present invention makes it possible to form a magnetic particle-containing film having excellent magnetic isotropy. It has been confirmed that the chemical resistance of the magnetic particle-containing film is also excellent.

It has been confirmed that in a case where the magnetic particles contain Ni atoms as specific atoms, and the magnetic particles have a particle diameter of 5 μm or more, the effects of the present invention are further improved (refer to the comparison of results of Examples 1 to 3, and the like).

It has been confirmed that in a case where the magnetic particles contain Co atoms as specific atoms, and the magnetic particles have a particle diameter of 20 μm or more, the effects of the present invention are further improved (refer to the comparison of results of Examples 7 to 9, and the like).

It has been confirmed that in view of further improving the effects of the present invention, the content of the specific atoms with respect to the total mass of metal atoms is preferably 70% by mass or more, and more preferably 85% by mass or more (refer to the comparison of results of Examples 7 and 10 to 13, and the like).

It has been confirmed that in a case where the magnetic particles contain Ni atoms as specific atoms, the effects of the present invention are further improved (refer to the comparison of results of Examples 3 and 7, and the like. Generally, in all the examples, the larger the particle diameter of the magnetic particle is, the better the effects of the present invention tend to be. On the other hand, in Example 3 using magnetic particles P-3 having a smaller particle diameter and containing Ni atoms, the effects of the present invention are further improved, compared to Example 7 using P-7 having a larger particle diameter and containing Co atoms.)

It has been confirmed that in a case where the concentration of solid contents of the composition is 75% by mass or more, the effects of the present invention are further improved (refer to the comparison of the results of Examples 25 and 53 to 60, and the like).

It has been confirmed that in a case where the composition contains an epoxy compound (curable epoxy compound) as a polymerizable compound, the effects of the present invention are further improved (refer to the comparison of results of Examples 37 to 43, and the like).

What is claimed is:

1. A composition comprising:

magnetic particles; and a rheology control agent, wherein a content of the magnetic particles having an aspect ratio less than 8 is 25% by mass or more with respect to a total mass of the magnetic particles, the magnetic particles contain metal atoms, the metal atoms contain one or more kinds specific atoms selected from the group consisting of Ni atoms and Co atoms, a content of the specific atoms is 50% by mass or more with respect to a total mass of the metal atoms, and a particle diameter of the magnetic particles is 20 μm or more.

2. The composition according to claim 1, wherein the specific atoms are the Ni atoms.

3. The composition according to claim 2, wherein the content of the specific atoms is 70% by mass or more with respect to the total mass of the metal atoms.

4. The composition according to claim 2, wherein the rheology control agent is an organic rheology control agent.

5. The composition according to claim 2, wherein the rheology control agent is one or more kinds of substances selected from the group consisting of a polycarboxylic acid, a polycarboxylic anhydride, and an amide wax.

6. The composition according to claim 2, further comprising:

a curable epoxy compound as a polymerizable compound.

7. The composition according to claim 1, wherein the content of the specific atoms is 70% by mass or more with respect to the total mass of the metal atoms.

8. The composition according to claim 1, wherein the rheology control agent is an organic rheology control agent.

9. The composition according to claim 1, wherein the rheology control agent is one or more kinds of substances selected from the group consisting of a polycarboxylic acid, a polycarboxylic anhydride, and an amide wax.

10. The composition according to claim 1, further comprising:

a curable epoxy compound as a polymerizable compound.

11. The composition according to claim 1, wherein a content of Fe atoms is 0% to 25% by mass with respect to the total mass of metal atoms.

12. A magnetic particle-containing film formed of the composition according to claim 1.

13. An electronic component comprising:

the magnetic particle-containing film according to claim 12.

14. The electronic component according to claim 13, wherein the electronic component is used as an inductor.

15. The electronic component according to claim 13, wherein the electronic component is used as an antenna.

16. A magnetic particle-containing film formed of the composition according to claim 2.

17. An electronic component comprising:

the magnetic particle-containing film according to claim 16.

18. The electronic component according to claim 17, wherein the electronic component is used as an inductor.

19. The electronic component according to claim 17, wherein the electronic component is used as an antenna.

* * * * *